(12) United States Patent
Stanford et al.

(10) Patent No.: US 7,920,539 B2
(45) Date of Patent: Apr. 5, 2011

(54) COMMUNICATION SYSTEM AND METHOD

(75) Inventors: Thomas Stanford, Escondido, CA (US); Scott Hoeptner, El Cajon, CA (US)

(73) Assignee: HM Electronics, Inc., Poway, CA (US)

( * ) Notice: Subject to any disclaimer, the term of this patent is extended or adjusted under 35 U.S.C. 154(b) by 1092 days.

(21) Appl. No.: 10/928,476

(22) Filed: Aug. 26, 2004

(65) Prior Publication Data
US 2006/0045063 A1   Mar. 2, 2006

(51) Int. Cl.
*H04J 3/00* (2006.01)
(52) U.S. Cl. ........ 370/345; 370/276; 370/277; 370/280; 370/294; 370/310; 455/7; 455/11.1; 455/422.1
(58) Field of Classification Search .......................... None
See application file for complete search history.

(56) References Cited

U.S. PATENT DOCUMENTS

| | | | | |
|---|---|---|---|---|
| 5,241,701 A | * | 8/1993 | Andoh | 455/272 |
| 5,321,848 A | * | 6/1994 | Miyahira et al. | 455/66.1 |
| 6,044,268 A | * | 3/2000 | Haartsen | 370/294 |
| 6,437,743 B1 | * | 8/2002 | Mintz et al. | 342/463 |
| 6,965,868 B1 | * | 11/2005 | Bednarek | 705/9 |
| 6,973,437 B1 | * | 12/2005 | Olewicz et al. | 705/15 |
| 2004/0116071 A1 | * | 6/2004 | Hall | 455/3.05 |
| 2005/0099291 A1 | * | 5/2005 | Landau | 340/539.13 |
| 2005/0212685 A1 | * | 9/2005 | Gordon | 340/825.19 |
| 2006/0041482 A1 | * | 2/2006 | Awiszus et al. | 705/26 |

* cited by examiner

*Primary Examiner* — Patrick N Edouard
*Assistant Examiner* — Matthew W Genack
(74) *Attorney, Agent, or Firm* — Bernard L. Kleinke; Duckor Spradling Metzger & Wynne

(57) ABSTRACT

A system and method is disclosed for allowing communications between a base station and a group of mobile transceivers in a communications network used for a merchant facility.

75 Claims, 37 Drawing Sheets

COMMUNICATION SYSTEM AND METHOD

FIELD OF THE INVENTION

The present invention relates in general to a communication system and method. It more particularly relates to such a system and method for use as a communication system by a commercial establishment such as a quick service restaurant, bank or other merchant.

BACKGROUND ART

There is no admission that the background art discussed in this section legally constitutes prior art.

Commercial establishments, such as quick service restaurants, banks, coffee shops or similar locations provide service by enabling people to drive their automobile or other vehicle or walk up to a communication service point without requiring them to leave the vehicle or enter the building to perform a transaction. Conventionally, a speaker and microphone are located at the service point so that the customer can communicate with service people inside the building using these devices.

There have been a variety of such systems. For example, reference may be made to the following U.S. patents, which are incorporated herein by reference in their entirety:

U.S. Pat. No. 5,512,891 DRIVE-UP STATION VEHICLE DETECTION SYSTEM AND METHOD OF USING SAME;
U.S. Pat. No. 5,305,132 OPTICAL WAVELENGTH COMMUNICATION SYSTEM AND METHOD OF USING SAME;
U.S. Pat. No. 5,253,095 FULL DUPLEX COMMUNICATION SYSTEM AND METHOD OF USING SAME;
U.S. Pat. No. 5,203,017 METHOD AND APPARATUS FOR ESTABLISHING WIRELESS COMMUNICATION WITH MULTIPLE CUSTOMER STATIONS;
U.S. Pat. No. 4,882,770 WIRELESS OPTICAL COMMUNICATION SYSTEM;
U.S. Pat. No. 5,590,407 DRIVE THROUGH WIRELESS ORDER TAKING SYSTEM;
U.S. Pat. No. 6,067,294 WIRELESS COMMUNICATION SYSTEM AND WIRELESS COMMUNICATION APPARATUS; AND
U.S. Pat. No. 6,044,268 SYSTEM AND METHOD FOR PROVIDING INTERCOM AND MULTIPLE VOICE CHANNELS IN A PRIVATE TELEPHONE SYSTEM

In the past, the communications between the service point and the service personnel located in a building have been accomplished by hard-wired half-duplex intercom systems. A service person was required to walk to an intercom station and press a button to talk to the customer and then release the button to hear the customer. This arrangement prevented the service person from moving around the work area to multi-task while still talking to the customer. Moreover, the customer could not talk to the service person when the service person was talking, thereby all too frequently causing confusion and not always completing a transaction accurately. In addition, other service personnel could not listen to the conversation unless they happened to be near the intercom station.

In order to enable the personnel to have more freedom of movement during conversations with customers, a wireless half duplex analog communication system was successfully implemented. The speaker and microphone at the service point were hard wired to a base station inside the building. The service personnel wear or otherwise carry small mobile transceivers and headsets to communicate to the base station and thus to the customer. This arrangement enabled the service person to multi-task, while talking and allowed others to listen in on the conversation so they could help with the service function. This implementation still required the service person to press a button to talk and release the button to hear. Also, even though several service persons were wearing transceivers and listening, only one person could talk at a time or radio interference could prevent all communications under some circumstances.

For the purpose of facilitating the communication, a wireless full-duplex analog communication system was introduced. This full duplex system uses separate transmit and receive radio frequencies and antennas so that full-duplex conversations were possible. The base station transmits on frequency F1 while the mobile units received on frequency F1. Conversely, the mobile transceivers transmit on F2 and the base station receives on F2. This full duplex system enabled transmissions by only one mobile transceiver at a time to prevent radio frequency interference but enabled full duplex communications between the base and the customer to achieve an improved level of accuracy in the communications.

To provide the ability to have more than one mobile unit transmit simultaneously, several base station receivers were used. Within the base station, received audio signals were combined to provide the intercom function between all mobile transceivers. The base station used one transmitter to re-transmit all audio to all mobile transceivers to produce the intercom function where all service personnel could hear all conversations. Thus, the system successfully provided full duplex communication as well as enabling the capability to have two or more service personnel talk simultaneously. Moreover, if the business using this full duplex communication system had more than one service point, separate base stations and frequencies were used to service all lanes of traffic.

BRIEF DESCRIPTION OF THE DRAWINGS

The following is a brief description of the drawings.

DETAILED DESCRIPTION OF CERTAIN EMBODIMENTS OF THE INVENTION

Figure 1:
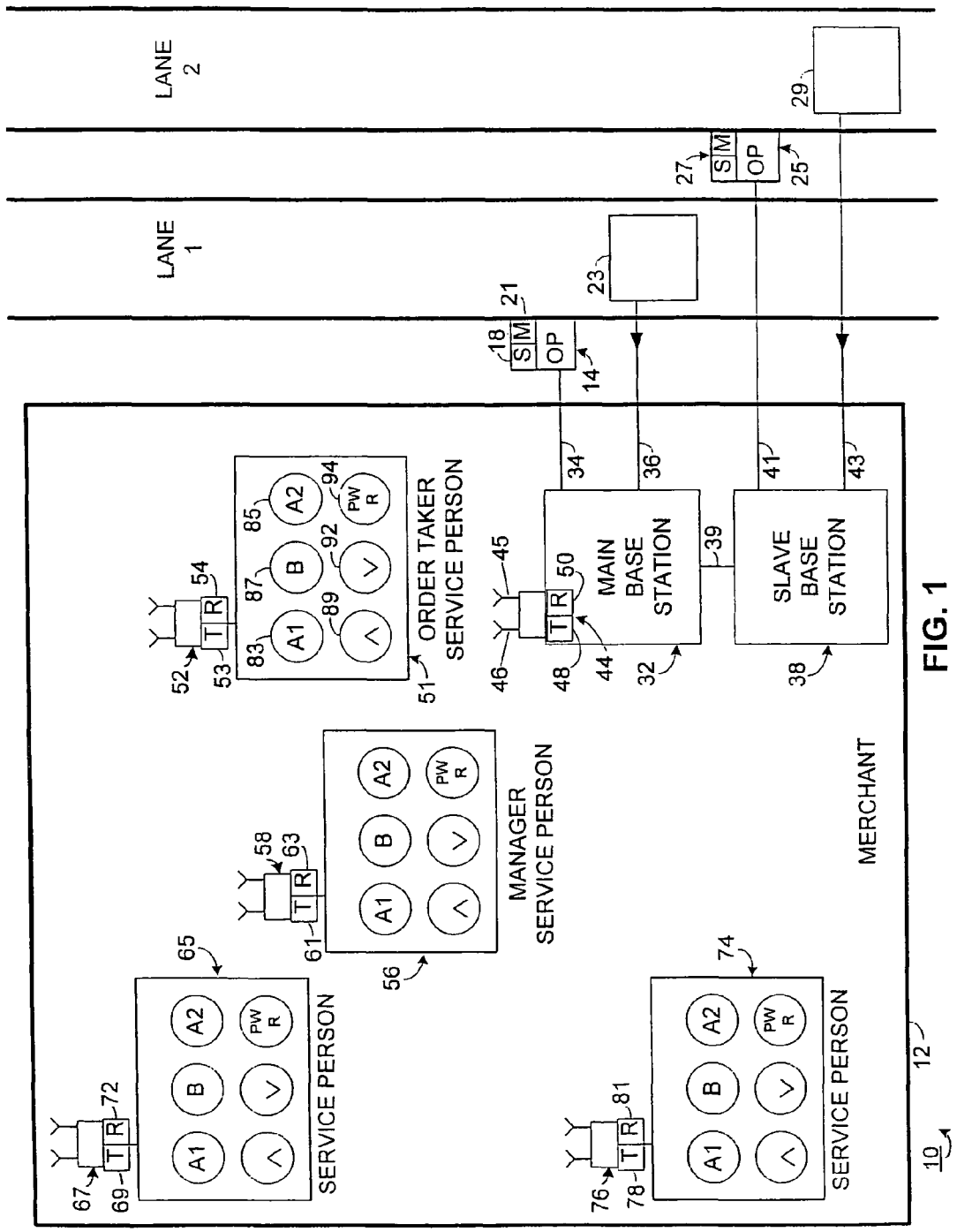
FIG. 1 is a block diagram of a wireless communication system, which is constructed according to an embodiment of the invention.

The detailed description is arranged according to the following outline:

| Heading | Paragraph |
|---|---|
| General System Description | 0032 |
| Main Base Station | 0043 |
| Master-Slave Interface | 0059 |
| Base Transceiver | 0060 |
| Base Radio Transceiver Interface | 0072 |
| Mobile Transceiver | 0073 |
| A1 Button | 00100 |
| B Button | 00101 |
| A2 Button | 00102 |
| Mobile Transceiver Confirmation Tones | 00103 |
| Voice Prompts in Mobile Transceivers | 00104 |
| Mobile Transceiver Hands-Free Mode | 00108 |
| Base Transceiver Operation | 00117 |
| Base Transceiver Normal Operation | 00122 |
| Base Audio Traffic Flow | 00128 |
| Air Link Protocol And Speech Codec | 00152 |
| Serial Data Channel | 00156 |
| Data Flow Control | 00164 |
| Base and Mobile Registration | 00171 |
| Lane 1 Customer Beep | 00173 |
| Lane 2 Customer Beep | 00179 |
| Dual Lane | 00194 |
| Customer Detect | 00198 |
| Message Repeater | 00200 |
| Speed Team Operation | 00202 |
| Dual Lane | 00211 |
| Recording Messages | 00224 |
| Play Message | 00231 |
| Voice Activated Attenuator | 00249 |
| Automatic Volume Control | 00251 |
| Base Audio Main Board Indicators | 00255 |
| Configuration | 00262 |
| Base Transceiver Board | 00286 |

According to certain disclosed embodiments of the invention, there is provided a system and method for establishing a service point communication link between a service point used by a customer and a base station. A wireless communication link is established between the base station and a service person using a mobile transceiver to link with the service point communication link to enable the customer and the service person to communicate for initiating a transaction. A wireless communication link is established between the base station and another service person using another mobile transceiver to link with the communication link between the customer and the service person so that the service person and the customer can communicate with one another.

According to yet another embodiment of the invention, there is provided a system and method for establishing a service point communication link between a service point used by a customer and a base station. A wireless communication link is established between the base station and a service person using a mobile transceiver to link with the service point communication link to enable the customer and the service person to communicate for initializing a transaction. A wireless independent communication link is established between at least two other service people using other mobile transceivers to enable the other service people to communicate with one another independently of the communication between the service person and the customer.

According to yet another embodiment of the invention, an intercom communication system and method enables the establishment of a service point communication link between a service point used by a customer and a base station. A wireless communication link is established between the base station and a service person using a mobile transceiver to link with the service point communication link to enable the customer and the service person to communicate for initiating a transaction. A wireless communication link is established between the base station and another service person using another mobile transceiver to enable another service person to broadcast a communication to other service people independently of the communication between the customer and the service person. Broadcast communication links are established between the base station and other service person mobile transceivers to enable another service person to communicate simultaneously with the other service people.

According to the disclosed embodiments of the invention, by using a time division duplex (TDD) full-duplex arrangement, communications can be carried out on a single radio frequency with a single antenna, thereby reducing cost, hardware complexity and interference. If the TDD switch rate is sufficiently fast as compared to human perception, then there is a perception of simultaneous transmit and receive.

According to the disclosed embodiments, in using time division multiple access (TDMA) only one radio frequency may be used to handle multiple simultaneous transmissions using only a similar amount of hardware as a conventional half-duplex radio system. TDMA combined with TDD enables multiple simultaneous transmissions and full duplex communications for all transmissions without the need for multiple receivers and antennas on a single radio frequency.

Moreover, the digital system according to the embodiments of the invention enables communications employing a single base station radio to accommodate a plurality of service lanes. The digital system of the disclosed embodiments can route signals to a specific mobile transceiver unit that all other units do not hear. The digital system of the disclosed embodiments allows a private connection between two mobile transceiver units that is isolated from the intercom network. By use of digital communications, substantially any number of messages can be routed by a large variety of ways without changing hardware.

According to the disclosed embodiments, there can also be full duplex digital data communications simultaneous with voice data between the base station and any mobile transceiver unit. Either the base station or the mobile units can initiate data connections. This data path can facilitate control functions between the base station and mobile units in a large variety of ways or act as simply a conduit through which data can travel in a full-duplex mode of operation between a terminal connected at the mobile transceiver unit to another terminal connected at the base station.

According to the disclosed embodiments, one result of being able to send data signals with the voice signals allows the following scenario when using customer detection. When a customer is detected at the service point, a detection signal causes the base station to transmit a data signal to at least one mobile unit and causes it to go into the transmit or talk mode. Then when the customer leaves the service point and the customer detection indicates no customer, the base station transmits a data signal to the mobile unit to stop transmitting and return to listen mode. In this scenario, the service person may not be required to press any buttons to establish and break communications with the service point. This operation may be substantially or even fully automatic and requires little or no physical action from the service person.

With a digital system according to the disclosed embodiments of the invention, the voice and/or data transmissions may be encrypted for security to prevent (or at least reduce the possibility of) unauthorized listening. The disclosed digital systems may also include frequency hopping spread-spectrum, or direct-sequence spread-spectrum to prevent or to at least greatly reduce interference and further secure the radio link.

General System Description

Referring now to FIG. 1, there is shown a wireless communication system 10, which is constructed in accordance with an embodiment of the invention. The system 10 may be employed in a merchant facility such as a merchant building 12 having two service lanes 1 and 2. A service point 14 is disposed in lane 1, and includes a speaker 18 and a microphone 21. A customer detector or sensor 23 such as a loop detector is disposed in lane 1 for detecting the presence of customers (not shown) for the system 10.

A similar service point 25 includes a speaker/microphone 27 in lane 2. A customer detector or sensor 29 is similar to the sensor 23.

A main base station 32 receives communication from the service point 14 via a cable 34, and it receives a customer present signal from the sensor 23 via a cable 36. A slave base station 38 is coupled to the main base station 32 via a cable 39 for communication there between. A cable 41 provides audio communication between the service point 25 and slave base station 38. A cable 43 provides a customer present signal in lane 2 via a cable 43.

A radio transceiver 44 is shared by the main and slave base stations and is located in the main base station 32. The transceiver may receive signals via a pair of antennas 45 and 46. The transceiver 44 includes a transmitter 48 and a receiver 50.

The pair of antennas 45 and 46 may be employed for signal diversity. However, it is to be understood that a single antenna may also be employed.

A service person mobile transceiver 51 is carried or worn by a service person in the merchant building 12 to facilitate communications with a customer (not shown) at the service points 14 and 25. A pair of antennas generally indicated at 52 for the transceiver 51 may be used with a transmitter 53 and a receiver 54 for the transceiver 51, and provides diversity as hereinafter described in greater detail. It should be understood that in FIG. 1 the pair of antennas are shown diagrammatically as connected individually to the transmitter 53 and to the receiver 54; however, either one of the antennas may be selected and used for either the transmitter or the receiver.

In use, once a customer in lane 1, for example, moves opposite the customer detector 23 and the service point 14, a customer can communicate via the speaker 18 and the microphone 21 to the service person mobile transceiver 51. In this regard, a communication link is established between the service point 14 and the main base station 32, and a wireless communication link is established between the base station 32 and the service person mobile transceiver 51. Thus, the service person can communicate with the customer at the service point 14 to execute a transaction.

A manager service person mobile transceiver 56 is similarly equipped with a pair of antennas generally indicated at 58, a transmitter 61 and a receiver 63 to establish a communication link with the base stations so that the manager service person can communicate with both the service person and the customer.

A similar service person mobile transceiver 65 is equipped with a pair of antennas generally indicated at 67, a transmitter 69 and a receiver 72 to establish a wireless communication link with the base stations to facilitate communications with the other service people.

A like service person mobile transceiver 74 is similar to the mobile transceiver 65, and includes a pair of antennas generally indicated at 76, a transmitter 78 and a receiver 81. As hereinafter described in greater detail, the service people can communicate amongst themselves in a variety of modes of operation.

Each one of the mobile transceivers includes a number of control buttons. Considering now the control buttons for the transceiver 51, which are similar to the control buttons of the other mobile transceivers, an A1 button 83, when actuated, provides an audio communication linked with the service point 14 of lane 1. An A2 button 85, when actuated, provides an audio communication link between the transceiver 51 and the service point 25 of lane 2. A B button 87, when actuated, provides a page audio channel for the mobile transceivers to the exclusion of the service points. A pair of increase and decrease volume buttons 89 and 92 control the volume of the audio signals. A power ON/OFF button 94 is provided to control the power to the transceiver.

Main Base Station

Figure 2:
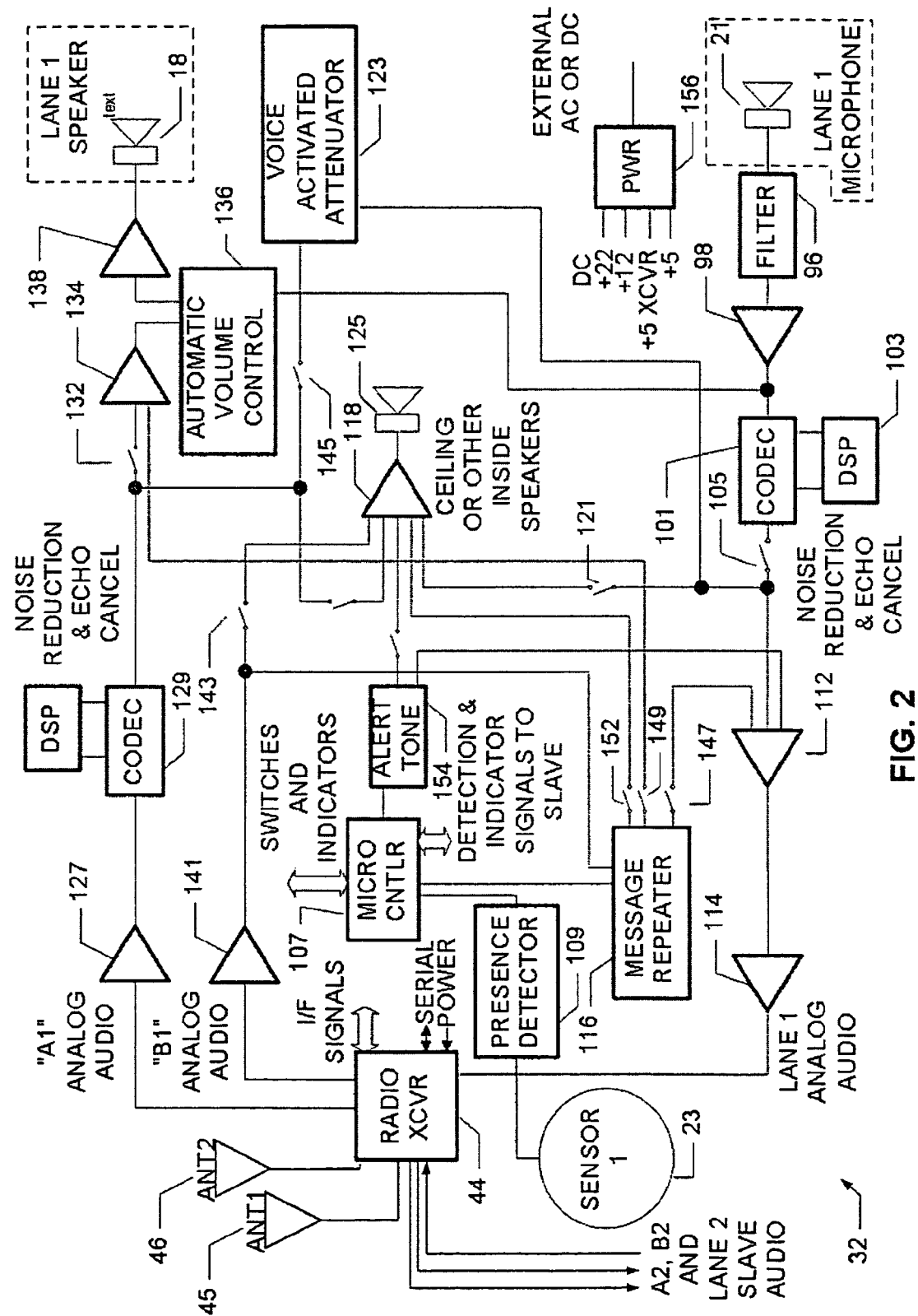
FIG. 2 is a symbolic block diagram of the main base station of the system of FIG. 1.
Figure 3:
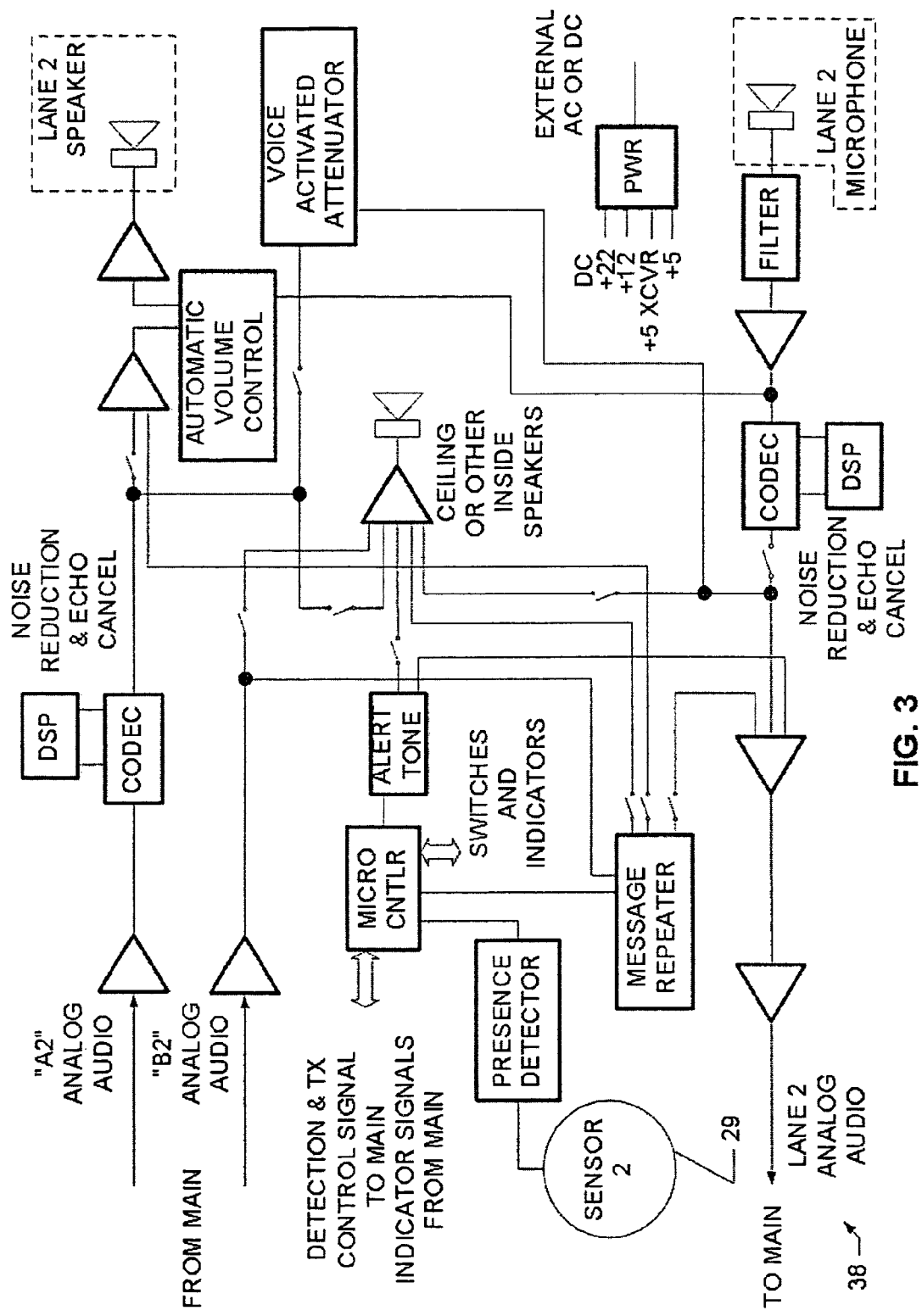
FIG. 3 is a symbolic block diagram of the slave base station of the system of FIG. 1.

According to one embodiment of the invention, the base station shown in FIGS. 2 and 3 may generally comprise the base radio transceiver 44 and two base audio main boards. These block diagrams show a dual lane configuration. One radio transceiver 44 supports two-lane operation in this implementation. It will become apparent to those skilled in the art that other arrangements and configurations may also be employed, such as a fully integrated single board arrangement.

Considering now the base main audio board, the main and slave base stations 32 and 38 have similar base main audio boards and therefore a description of only one will now be presented. Also the interface between the main and slave audio boards will now be described with reference to FIGS. 2 and 3.

Lane 1 microphone 21 is located at the service point 14 (FIG. 1) usually, inside a menu board or a speaker post. This microphone 21 is hardwired to the base station 32 inside the building 12. The microphone signal is initially passed through a combined highpass and lowpass filter 96. The filters eliminate high and low frequency components from the service point. This reduces the noise from vehicles and general background at the service point. After filtering, gain is applied by an amplifier 98 to establish a noise figure and provide enough gain for the following circuits.

After amplification the signal is applied to the noise and echo cancellation analog-to-digital converter (CODEC). A digital signal processor (DSP) 103 and the coder decoder (CODEC) 101, which is an analog-to-digital plus digital-to-analog converter, form the noise and echo cancellation sub-circuit. After processing in this sub-circuit the signal is converted back to analog and passed through analog switch 105.

A microcontroller 107, based on customer detection, controls the analog switch 105. If a customer is present at the service point, the sensor 23 signals the microcontroller 107 via a customer presence detection circuit 109, and the microcontroller closes analog switch 105. After closing analog switch 105, the signal is amplified by a pair of amplifiers 112 and 114 to a level necessary for the base transceiver 44. Amplifier 112 also sums together two other audio sources into the signal path for transmission. The signals may be supplied from a message repeater 116 and the alert tone caused by customer detection. These signals are combined and applied to the radio transceiver 44 for transmission to the various mobile transceivers used by service people.

After closing analog switch 105, the microphone signal is applied to a ceiling speaker amplifier 118 through an analog switch 121 and the voice activated attenuator (VAA) 123. Analog switch 121 is closed by a user controlled switch read by the microcontroller 107. If the microcontroller detects that the user set this switch to on, then the microcontroller 107 closes the analog switch 121 and the microphone signal is heard on a ceiling speaker 125.

The radio transceiver 44 receives signals from the various mobile radio transceivers worn or otherwise carried by the service personnel or service person. The transceiver 44 determines which channel of audio is being received, "A" or "B". "A" audio channel includes the service point and all mobile transceivers. All service people hear everybody. "B" audio channel excludes the service point and includes all mobile transceivers. Only mobile transceivers can hear each other. If the received audio is "A", then the transceiver outputs audio to an amplifier 127 to add the gain necessary for the following circuits. After the amplifier 127, the signal is applied to a noise and echo cancellation sub-circuit generally indicated at 129. The signal is converted to digital and processed. After processing, the signal is converted back to analog and sent to an analog switch 132. Analog switch 132 is closed if the microcontroller 107 receives an "A" control signal from the radio transceiver 44. An amplifier 134 then adds additional gain and the signal is applied to an automatic volume control (AVC) 136. After adjustment by the AVC 136 the signal goes to amplifier 138 and out to the Lane 1 speaker 18 at the service point 14 (FIG. 1). The Lane 1 speaker 18 is located at the service point usually inside the menu board or a speaker post. The speaker is hardwired to the base station 32 via the cable 34 (FIG. 1).

The AVC 136 can adjust the audio level heard at the lane 1 speaker 18 if the ambient noise level at the service point changes. This helps comply with local noise ordinances. The AVC 136 monitors the incoming audio heard by the lane 1 microphone 21 at the amplifier 98. The AVC 136 converts this signal into a voltage representing the average level of the incoming audio. A microcontroller (not shown) in the AVC 136 then adjusts the out going audio level up or down using programming code algorithm decisions based on measuring the incoming average level from the lane 1 microphone 21. If the level at the service point increases, then the out going signal is adjusted up a prescribed amount. If the level drops then the out going signal level is adjusted down a prescribed amount. The number of levels of adjustment and the range depends on implementation. As an example, the present method contemplates using a 128 step digital potentiometer that can adjust over a range of ~25 dB.

If the radio transceiver 44 detects "B" audio, it outputs audio to an amplifier 141 and an analog switch 143. Amplifier 141 provides gain and analog switch 143 is controlled by the microcontroller 107. The microcontroller 107 closes the switch 143 if the user has set an external routing switch to send "B" audio to the ceiling speaker amplifier 118.

The VAA 123 cuts back the in coming audio from the lane 1 microphone 21 if it detects audio on the out going path. An analog switch 145 is closed if the microcontroller 107 detects that the user has selected the VAA function to be used. The amount of cut back may be adjusted by the user. Once set, the cut back may be fixed and may either be on or off. The user may also set the threshold at which the cut back occurs.

The message repeater 116 provides a means to record and playback up to two short messages. These messages can be routed to three locations by means of a set of three analog switches 147, 149 and 152. To record a message, the service person selects record and then talks into the mobile transceiver using "B" channel. When the service person releases the "B" button, the message repeater stores the message and stops the record mode. The service person then selects the desired routing of the message when played back. As indicated more fully in FIGS. 33, 34 and 35, depending on what was selected, analog switch 147, 149 or 152 or any combination can be closed by the microcontroller 107 and the message sent to the mobile transceiver, the ceiling speaker 125 or the lane 1 speaker 18. The message is triggered by input to the microcontroller 107. Customer detection normally triggers the playback. Also an external input to the microcontroller 107 different than customer detection can be connected to an external device and the message repeater triggered. The user can select which input triggers the message.

In the present embodiment, two messages may be recorded. The user may select which message is played and where it is routed. They may be played in consecutive order. However, the messages can be triggered at different times and by different events and routed to different locations independent of each other.

Figure 11:
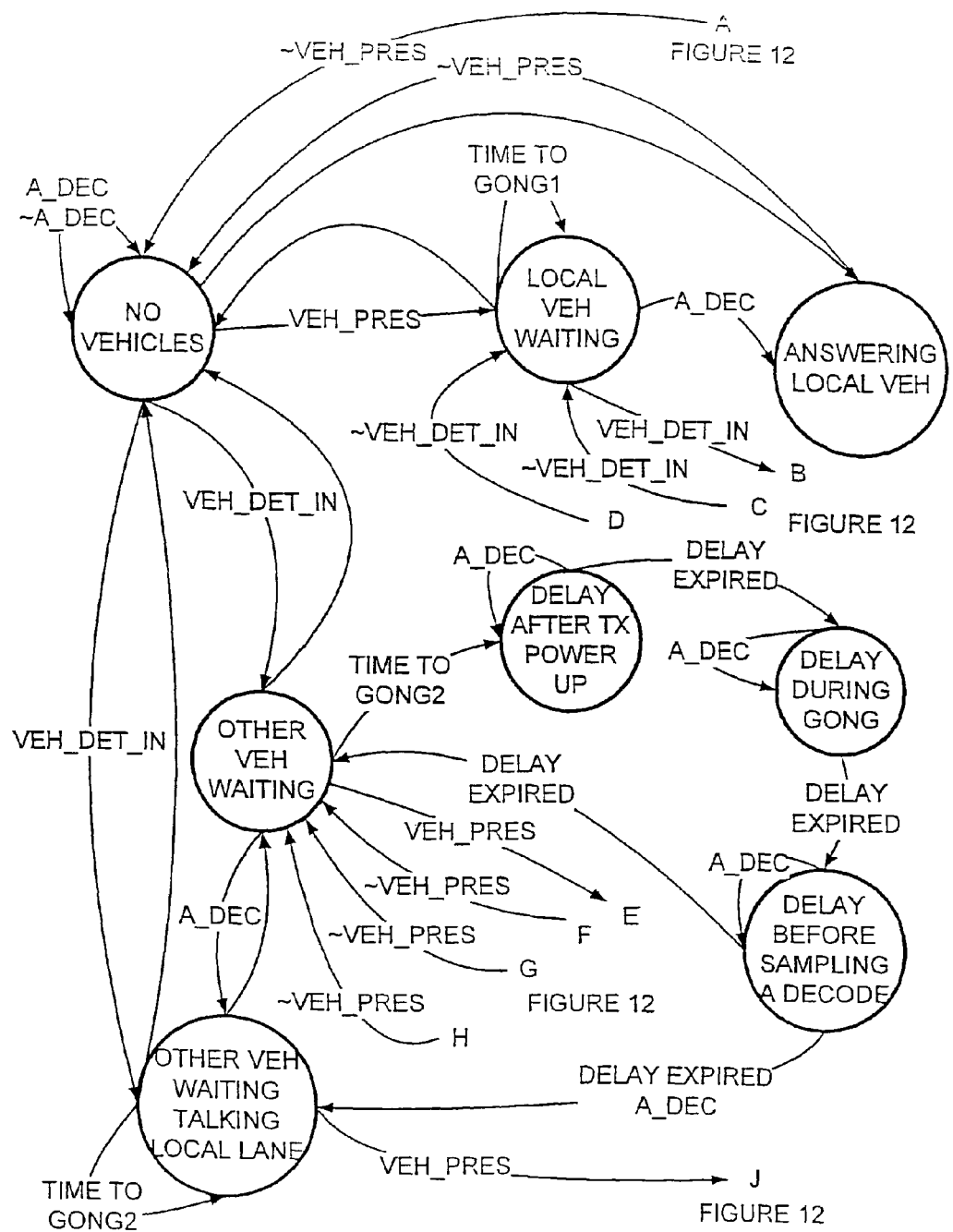
FIGS. 11 and 12 are state diagrams illustrating various receive/transmit states of the base station of FIG. 2.
Figure 12:
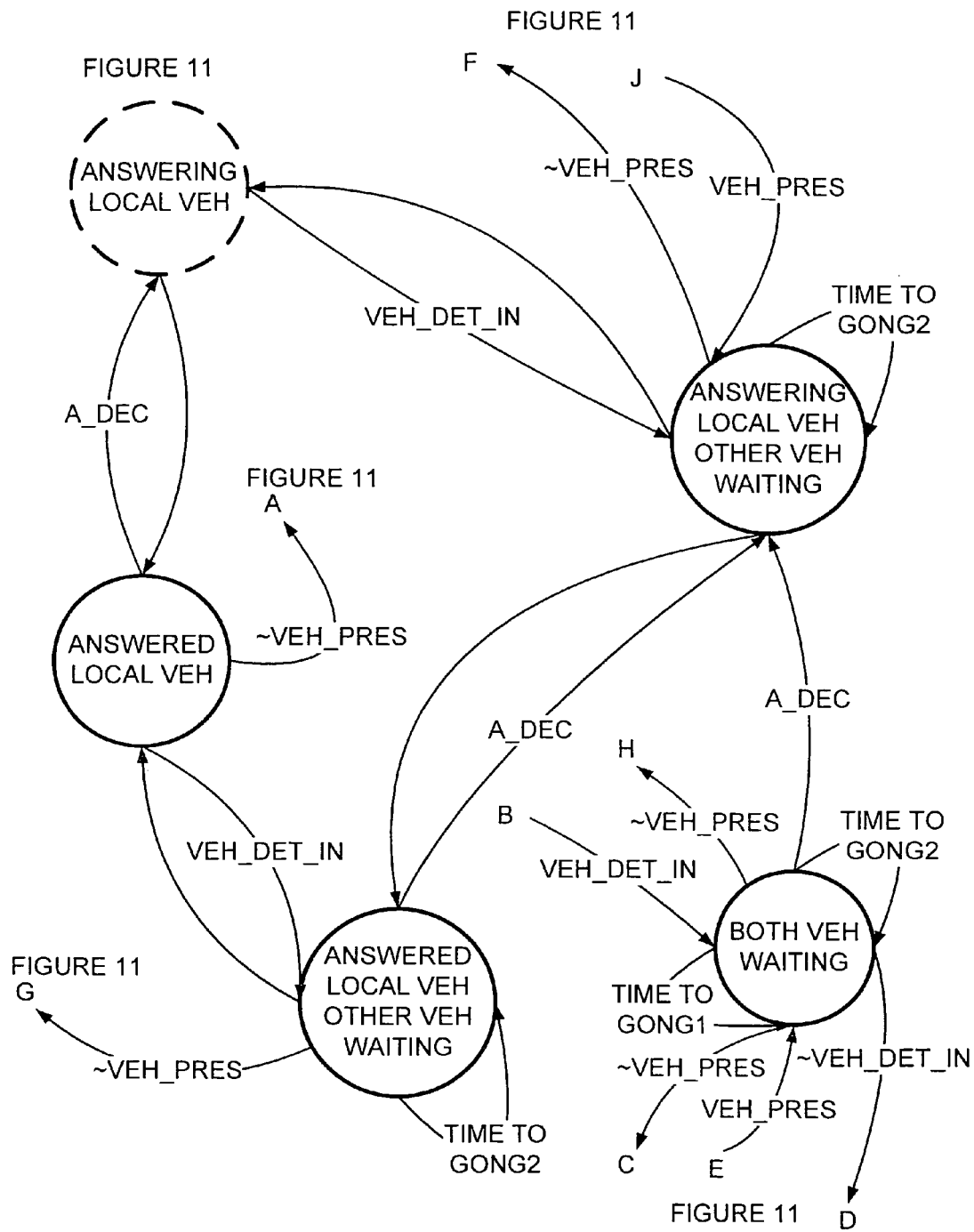
Figure 32:
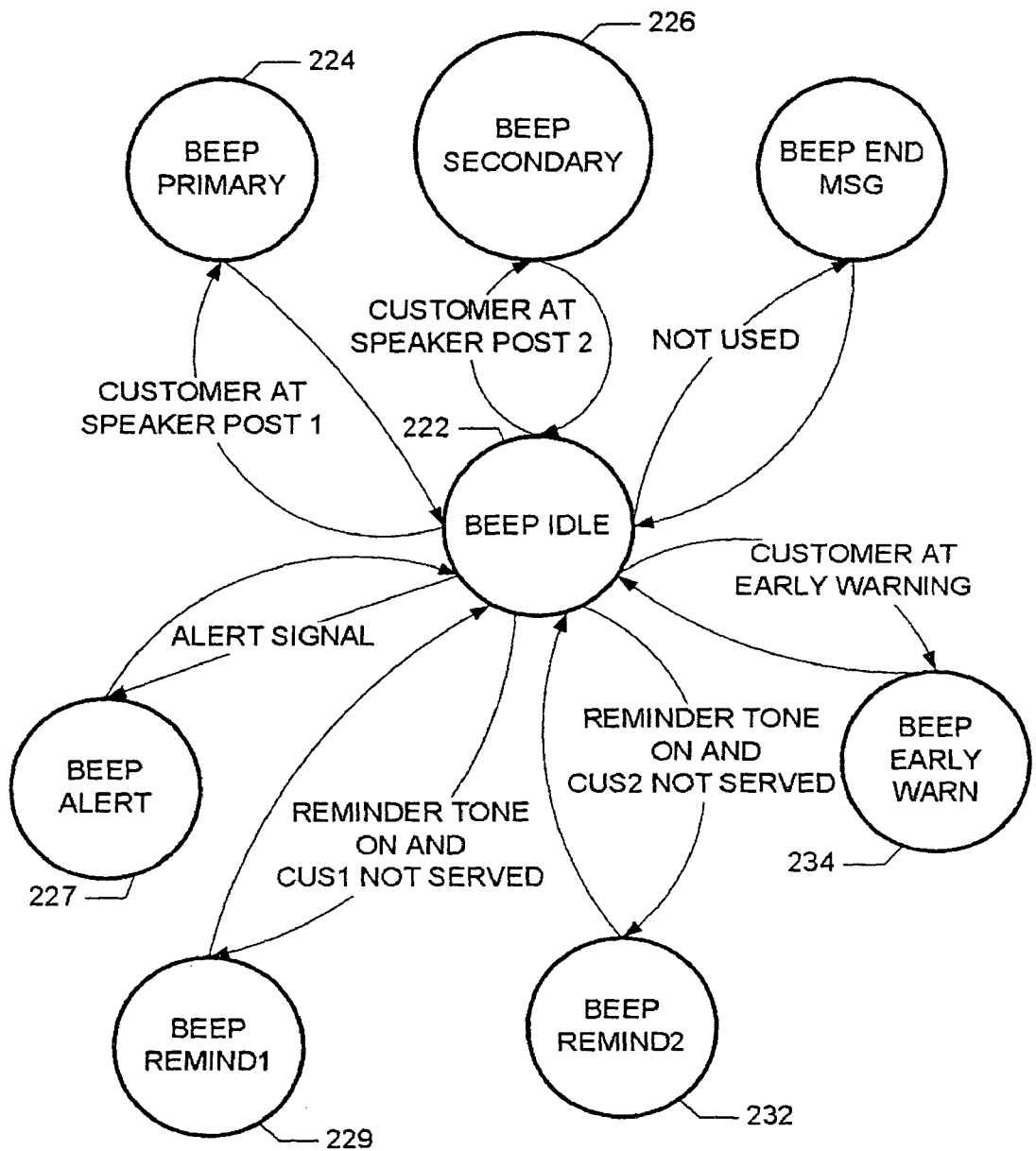
FIGS. 32, 33, 34 and 35 are state diagrams illustrating various operations of the base station of FIG. 2.

An alert tone circuit 154 may generate two distinct tones based on inputs from the microcontroller 107. With reference to FIGS. 11, 12 and 32, the tone trigger event is by customer detection through the microcontroller 107. Customers on lane 1 may produce a gong sound that the mobile transceivers hear, that are listening to lane 1. Detection on lane 2 may cause, for example, a beep sound to be heard by mobile transceivers listening on lane 1. It is the same for the slave base station. There may be a gong sound for lane 2 and a beep sound for lane 1 when listening on lane 2. The alert tone audio level may be user adjusted by means of a potentiometer (not shown). The user may also select whether the customer tone is heard on the ceiling speaker 125 and if they want it to repeat every 4 seconds or other time interval, until a mobile transceiver answers the call by pressing "A," letting the microcontroller 107 know by means of the "A" talk signal from the radio transceiver 44.

A base power supply 156 may employ a standard rectifier (not shown) and filter that produces ~22 volts direct current (VDC) from an external alternating current (AC) input. If direct current (DC) is used then the rectifier passes the DC directly through with a small voltage drop. All other voltages may be derived from the 22VDC by means of linear and switching regulators. Light emitting diode (LED) indicators are provided for the user to see that all voltages are present for troubleshooting purpose.

The microcontroller 107 may control most of the base functionality and interfaces with the radio transceiver 44, the user controls, the message repeater 116, and all the analog switches used to route audio within the base station 32. It also interfaces with indicators, the customer detector 109 and external inputs for the purpose of triggering messages.

Customer detection may be implemented by an external detector or a board plugged into the base station. The microcontroller 107 may accept input from either kind of device. The customer detector 23 used for detection may be buried in the ground at the service point and may be hard wired to the detector. Other type detectors may also be employed. The detector outputs a logic level signal for the microcontroller 107. Interface circuits are used to scale the voltage to that used by the microcontroller 107 and to protect the microcontroller.

Master-Slave Interface

As shown in FIG. 3, the slave base station 38 is similar to a master or main base station 32 except that there is no separate radio transceiver. The connections between the main and slave are as follows:

1. Customer detect input from the slave base station for master alert.
2. Customer detect output to the slave base station for slave alert.
3. A2 Talk, output from the main base station for slave indication.
4. B2 Talk, output from the main base station for slave indication.
5. Car 2, output from the slave base station to the main base station. Slave TX control.
6. Ground
7. TX Audio 2, input from slave base station.
8. Ground
9. RX Audio A2, output to slave base station.
10. RX Audio B2 or B1+B2, output to slave base station.

Base Transceiver

Figure 4:
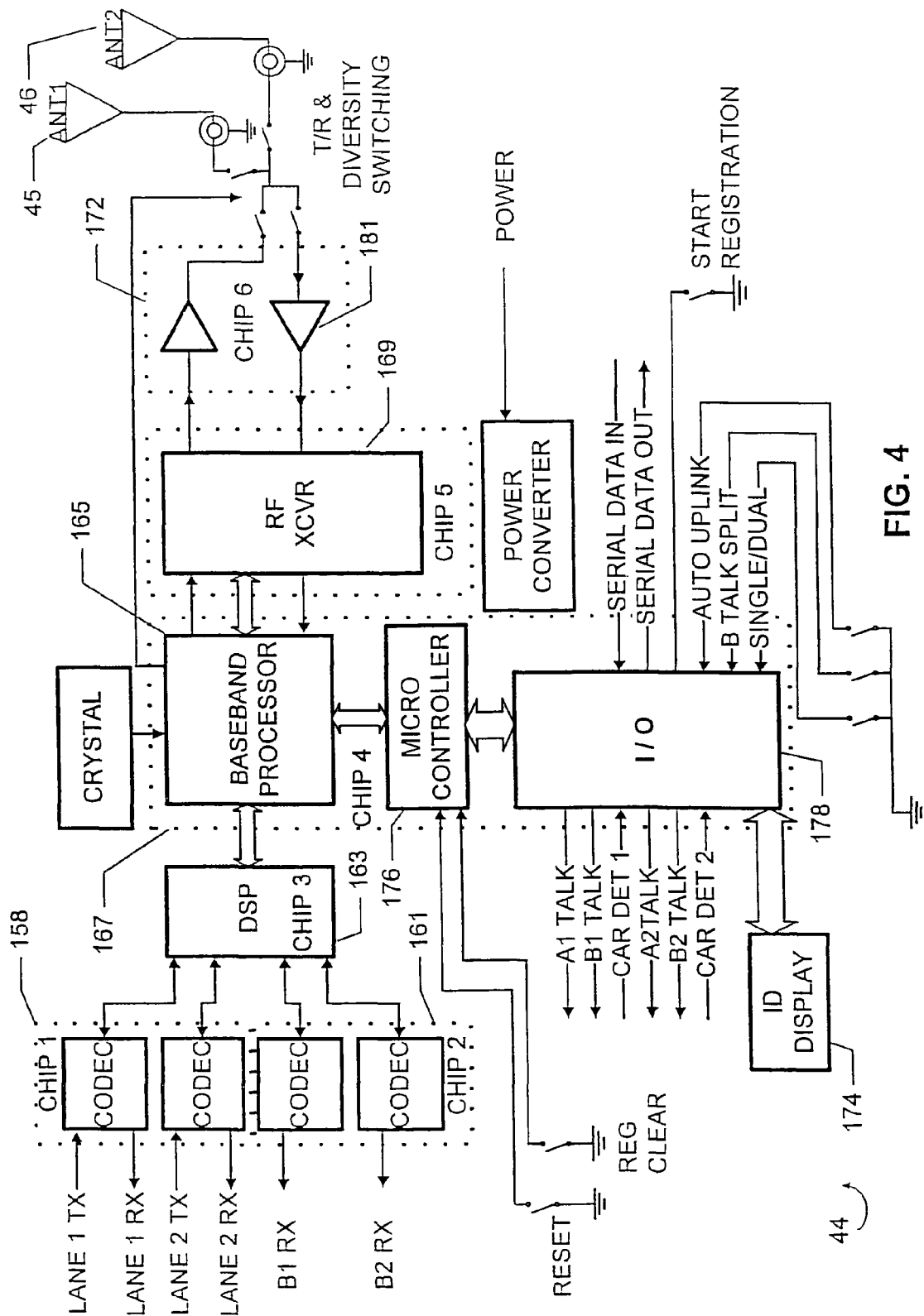
FIG. 4 is a block diagram of a radio transceiver of the base station of FIG. 2.

Considering now the base radio transceiver 44 as shown in FIG. 4, the radio transceiver 44 generally comprises approximately six integrated circuits plus other components. The chips are as follows:

1. CODEC chip 158 that does the A/D (analog-to-digital (A/D) and digital-to-analog (D/A) conversion for "A" channel lane 1 and 2 audio.
2. CODEC chip 161 that does the D to A for the "B" channel lane 1 and 2 audio.
3. DSP chip 163, that converts between linear pulse code modulation (PCM) and adaptive differential pulse code modulation (ADPCM) and routes and mixes audio.
4. Baseband processor 165 forming a part of a chip 167 may contain the radio link layer controller and functional interface and user control support. The chip 167 also supports the serial data interface.
5. Radio Frequency (RF) transceiver 169 may contain all functions necessary to send and receive voice data at radio frequency. In the disclosed embodiment, the 2.4 Giga-Hertz (GHz) Industrial Scientific and Medical (ISM) band, 2.4 GHz to 2.4835 GHz are used.
6. A chip 172 contains the low noise RF amplifier for the receiver and the power amplifier for the transmitter.
7. Other components are used to regulate voltages and provide the transmit-receive (T/R) switching and antenna selection. There is also a seven-segment single digit display 174.

The single radio transceiver 44 may support both the main and slave base stations 32 and 38 (FIGS. 2 and 3). The radio transceiver 44 is installed in the main base station 32 and the cable 39 attached between the main base and the slave base permits slave base audio and controls to be fed to the radio transceiver 44 (FIG. 1).

Audio from either lanes service point microphone is processed by the main or slave base main audio board and is then applied to the transceiver CODEC (chip 158). The signals are shown as lane 1 transmit (TX) (master) and lane 2 (TX) (slave). These analog signals are converted to digital bits by the CODEC chip 158 and fed to the DSP 163. The DSP 163 formats the signals and combines them with any "B" audio as required. The DSP 163 then outputs the signals to the baseband processor 165 for transmission.

The baseband chip 167 implements the protocol used for the system 10 and controls all radio link functions using software and hardware state machines. The baseband chip 167 implements the encryption function. The baseband chip 167 also includes a microcontroller 176 and a microcontroller I/O 178 that implements all interface and user functions for the base radio transceiver 44.

The radio communication link uses, time division multiple access (TDMA), time division duplex (TDD), frequency hopping (FH) and diversity antenna selection. Audio data is sampled and broken down into 10 millisecond chunks and sent at approximately 1.1 mega-bits per second. One time slot burst is approximately 500 microseconds at this rate. At the appropriate time an audio chunk is sent to the RF transceiver 169 for RF transmission. Because of the use of TDMA, the lane 1 TX signal is sent in one time slot and lane 2 TX signal is sent in another time slot. To implement TDD there are also corresponding receive time slots for these two signals. Each time slot is transmitted at a different frequency to implement frequency hopping. The radio link control protocol is conventional.

The RF transceiver 169 takes the high-speed data from baseband chip 167 and uses frequency shift keying (FSK) to modulate it directly onto the RF carrier. The modulated signal is then sent to chip 172 for amplification. After amplification, the high power signal is applied to the correct antenna using the RF switch settings determined in advance by the baseband processor 165. The signal is radiated and then received by the mobile transceivers.

A system service person can talk back to the service point by pressing A1 or A2 on the mobile unit. This sends a signal to the base radio transceiver 44. The signal is received in the appropriate time slot on the antenna selected during preamble. The switches are set to receive and connect the signal to low noise amplifier (LNA) 181 in chip 172.

Chip 172 amplifies the RF signal and establishes the system noise figure for the receiver. The amplified signal is then applied to the RF transceiver 169. The RF transceiver 169 down converts the signal to a 110 MHz IF and demodulates the FSK. The raw data is sent onto the baseband processor 165.

The baseband processor 165 unpacks the data and sends it to the DSP 163 for routing and mixing. The DSP 163 finally sends the audio data to the CODEC 158 for conversion to analog audio. The analog audio is then sent to the base main audio board (either main or slave) to be routed to the service point speaker such as speaker 18 as previously described.

"B" channel audio originates at a mobile transceiver and is received in the appropriate time slot just as described above for the service point audio. The DSP 163 instead routes the audio to CODEC 161 for a D/A conversion so it can be used on the base main audio board for the ceiling speaker 125 (FIG. 2). Otherwise the "B" audio is combined in the DSP 163 with lane audio and sent back for retransmission to all other mobile transceivers so they can hear the service person transmitting on "B". This audio is not routed to the service point.

All audio data is formatted into packets for radio transmission. Each packet contains the actual data and a number of information bits to describe the source and destination. There are also bits to describe whether this is "A" channel or "B" channel information and there are bits for synchronization. Finally there are also bits that are used to check the integrity of the data. All of this combines to allow the radio to route the data to the desired location.

The packet format is used to implement signal diversity for a more robust link. Time, frequency and space diversity are used by this radio transceiver. Time diversity is implemented by sending the same packet in two different time slots. The packet check bits are used to determine which packet is correct. Frequency diversity is implemented by frequency hopping. Each time slot is a different frequency as well as a different time. Space diversity is accomplished by selecting one of the two antennas 45 and 46 (FIG. 1) based on signal strength during packet preamble. This is done during the receive time slot and the selection is held during the next transmit slot.

Base Radio Transceiver Interface

According to the disclosed embodiment, the radio interface generally may comprise the following signals implemented using the microcontroller 176 of the chip 167.

1. A1 Talk, active when receiving "A" channel data from lane 1 mobile transceivers, used for logic and user display
2. B1 Talk, active when receiving "B" channel data from lane 1 mobile transceivers, used for logic and user display
3. Car 1, lane 1 transmit control from base main audio microcontroller 107
4. A2 Talk, active when receiving "A" channel data from lane 2 mobile transceivers, used for logic and user display
5. B2 Talk, active when receiving "B" channel data from lane 2 mobile transceivers, used for logic and user display
6. Car 2, lane 2 transmit control from base main audio microcontroller 107
7. Serial data input, serial data input for transmission along with voice
8. Serial data out, serial data received separated from voice data
9. Start registration, user sets the base to look for new mobile units and logs their information
10. Auto hands-free override, user switch to prevent the use of auto hands-free mode by mobile transceivers
11. B split, user switch to allow independent "B" audio between lanes or common "B" across both lanes
12. Single lane/dual lane select, user switch to select mode of operation
13. ID display, base radio assigns a unique ID to each mobile radio registered, user sees it here during registration process and at power up. This ID is used for addressing serial data and to send audio to a particular unit. Base station rejects any mobile transceiver not registered.

Mobile Transceiver

Figure 5:
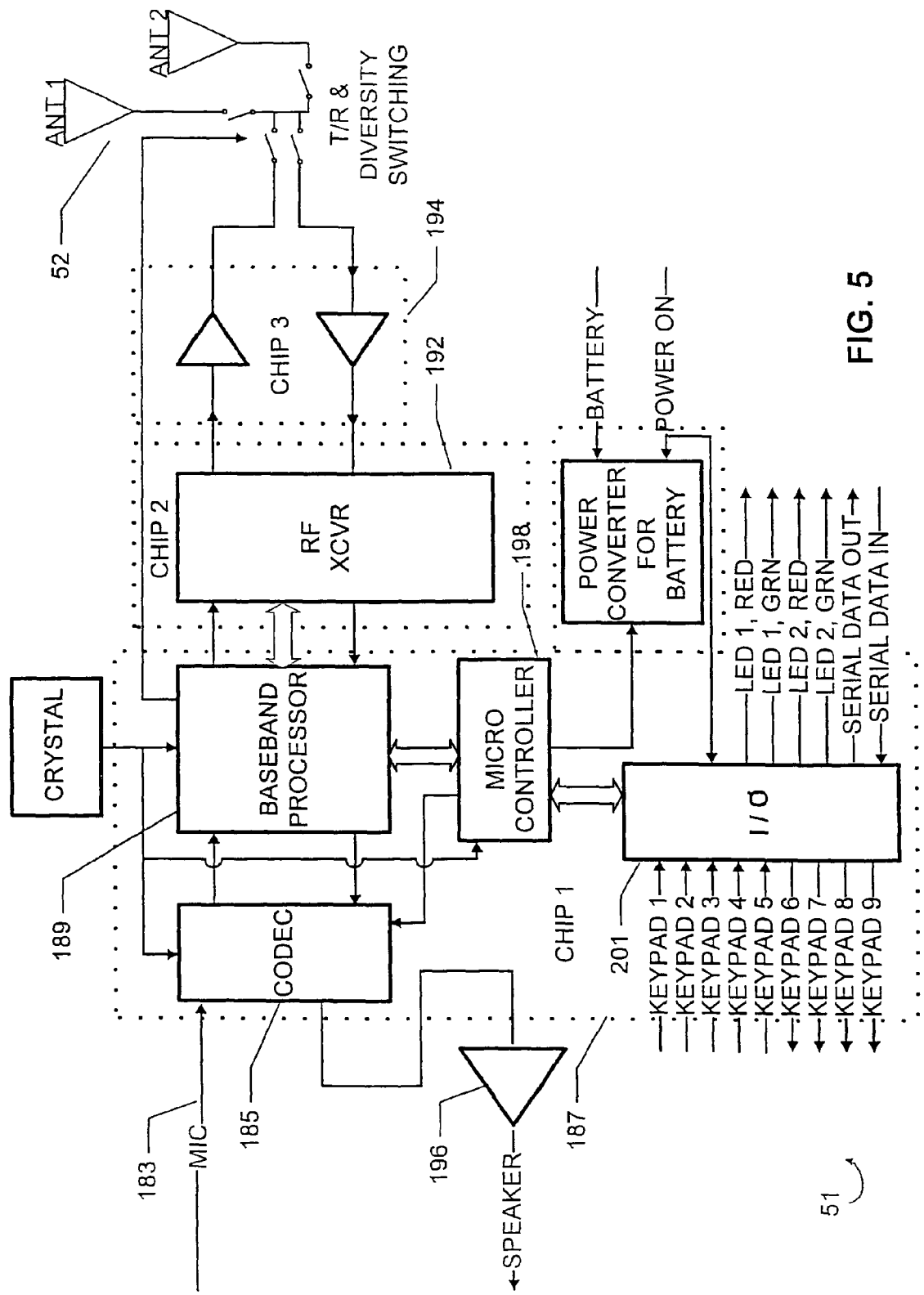
FIG. 5 is a block diagram of a mobile transceiver of FIG. 1.

As shown in FIG. 5, the mobile transceiver such as the transceiver 51 (FIG. 1) may be worn or otherwise carried by the service person to communicate with the base station 32 or 38 and the service point.

The mobile transceiver includes three integrated circuits and some miscellaneous components. Operation of the mobile transceiver is similar to that of the base radio transceiver. The mobile transceiver is used with a headset (not shown) that plugs into the unit. The mobile transceiver could also be integrated with a speaker and microphone as a single unit. Also the mobile transceiver may be battery powered by a single cell lithium-ion battery (not shown). The service person controls are shown in FIG. 1.

Beginning at the microphone input lead 183, the headset audio signal is applied to a CODEC 185 of a chip 187 and converted to digital bits. The audio is sampled and broken down into 10 millisecond chunks of data. Chip 187 formats these chunks into packets for transmission. Details of the packets are as described for the base station radio transceiver 44.

Chip 187 includes a baseband processor 189 that may control all the radio link functions. As with the base station radio transceiver this radio uses TDMA, TDD, FH and diversity antenna selection that matches the base radio transceiver 44.

Once the audio data is formatted, it is sent to the RF transceiver 192 for a burst transmission in the appropriate time slot. The bits are modulated onto the RF carrier using FSK modulation at ~1.1 megabits per second (MBPS).

The signal then proceeds to a chip 194 and is power amplified. The high power signal from this chip 194 is conducted to the proper antenna of the pair of antennas indicated at 52 through the T/R diversity switches. The antennas may be printed on the circuit board and are internal to the mobile transceiver 51, unlike the base station antennas, which may be external.

When a signal is received from the base station, it is conducted into the mobile transceiver through the antenna selected during preamble for best signal strength. The signal proceeds through the switches to the low noise amplifier in chip 194.

The LNA provides gain and establishes the noise figure for the radio receiver. The signal is then conducted to the RF transceiver 192 where it is down converted to 110 MHz intermediate frequency (IF) and demodulated. The demodulated data is now passed to the baseband processor 189 of chip 187.

The baseband processor 189 unpacks the data and strips off the packing bits. The audio data is then sent to the CODEC 185 to perform a D/A back to analog audio. The output of the CODEC 185 is applied to a speaker amplifier 196 to drive the headset speaker (not shown). This amplifier 196 may not provide any voltage gain, only power gain in order to drive a speaker at a high sound pressure level.

Figure 6:
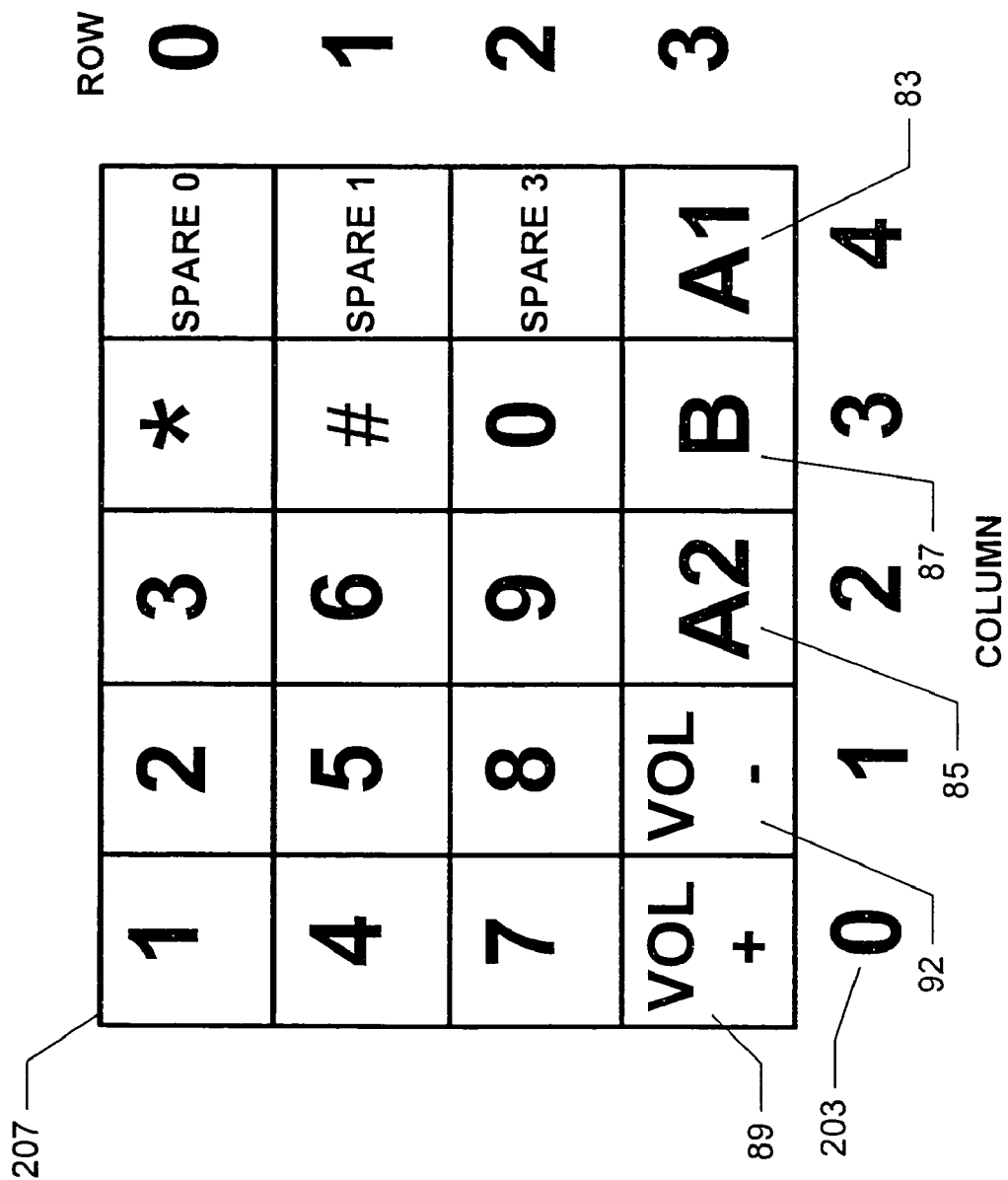
FIG. 6 is a keyboard layout diagram for a mobile unit interface.

Chip 187 includes a microcontroller 198 and a microcontroller I/O 201 that perform the interface for all user functions including switches and indicators. Chip 187 includes nine I/O lines to interface with a keypad of up to 20 keys. FIG. 6 shows a mobile transceiver keypad 203 (a matrix) keypad layout of control buttons. There are four row drivers and 5 column receivers. This creates a matrix of up to 20 possible keys. In addition to the previously described buttons, there are 10 digit numerical buttons generally indicated at 207 for enabling the service person to input the i.d. address of another mobile transceiver to make an intercom call.

There are two LEDs that can be either red or green that are used to show status for the service person. They are used to show power on, base sync, which lane, low battery and out of range. Status is also indicated by voice prompts stored in the baseband flash memory. The same states are indicated by voice playback. For example, low battery is indicated by "Change Battery" and red blinking LED.

Chip 187 also handles the serial data interface to allow data to be sent with the voice data. Voice data may not have to be present to use the data path.

The data path between the mobile transceiver 51 and base transceiver 44 works in the following manner. Either the mobile transceiver or the base station can initiate a data connection. A command is sent to the interface to open a connection to a specific ID address. Once the unit indicates a connection is open, data may be sent at a low bit rate. A high level protocol may be established in the system 10 that connects to these radio transceivers to control data flow and prevent overruns. This may not be implemented in the radio transceivers. The data connection is bi-directional and full duplex. Once the data communications are complete, a command is sent to the interface to close the connection.

Before a mobile transceiver can be used with a base station, it must be registered. A button is pressed on the base transceiver to open the system for registration and then the mobile transceiver is power up in a certain sequence to cause a registration with the base. The base station handshakes, stores data about the mobile transceiver, and assigns an ID to the mobile unit. In the present embodiment, up to 15 mobile transceivers may be registered to a given base.

Figure 7:
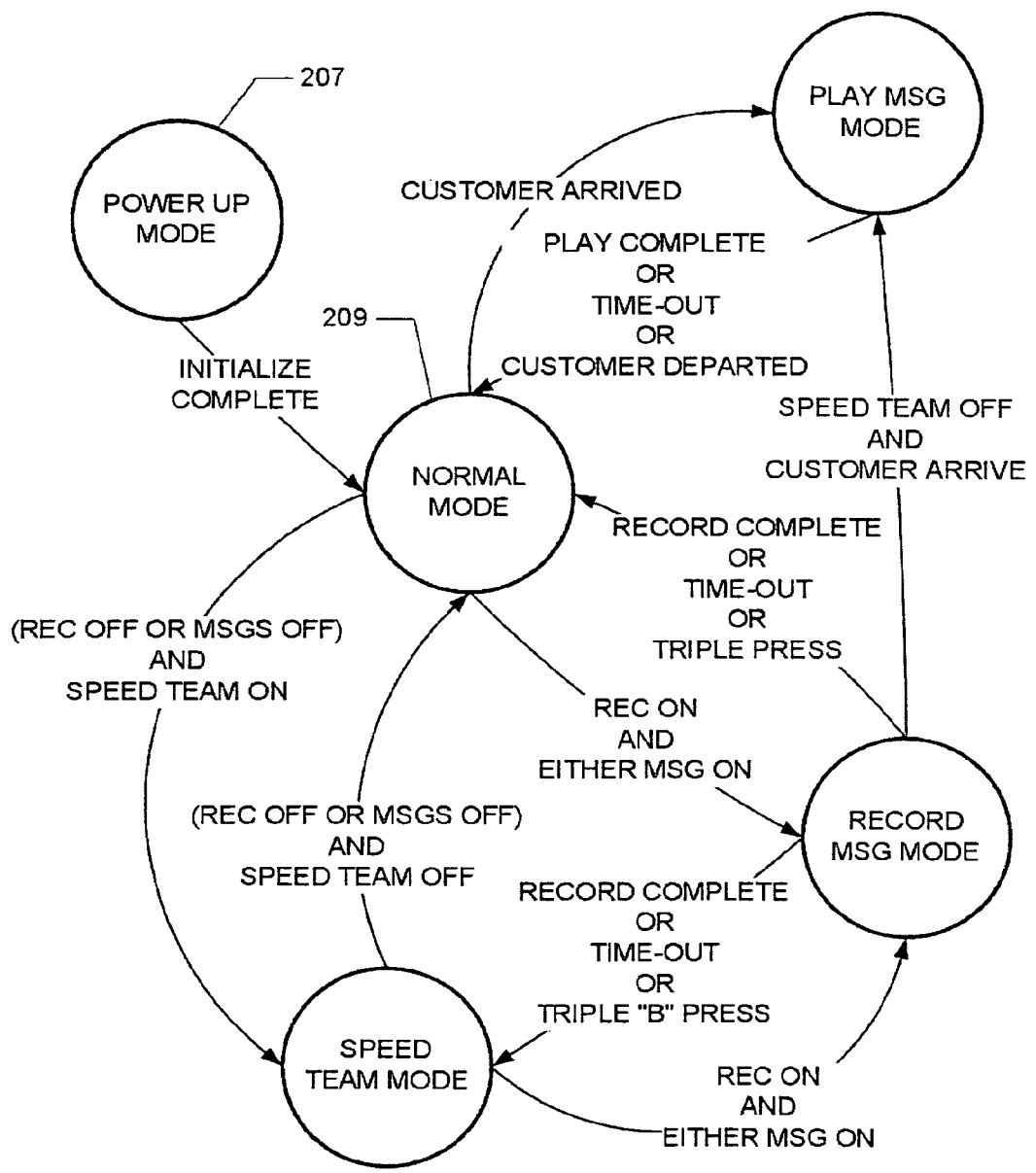
FIG. 7 is a state diagram illustrating various operations of the base station of FIG. 2.

Referring now to FIG. 7, at state 207, the base station may not have a power switch. When power is applied to the audio board, the unit turns on. The power from the audio board supplies power to the base transceiver board and customer detect board. Upon power up, the system 10 initializes all hardware ports, and readies switches. Upon power-up, the system 10 clears RAM. All switches are overridden to allow the message to be heard in the head set and over the ceiling speaker such as the speaker 125, the first three times it plays to the speaker service point. The base transceiver board powers up, reads switches and search for connections. Any optional customer detectors power up and initialize.

When power is removed from the Audio Board, the unit turns off. The audio board may discontinue supplying power to the base transceiver board, and customer detector. When the power is removed, the unit may stop functioning immediately. There may not be a delayed shutdown. There may not be a special sequence of events during shutdown. There may not be values saved to memory before shutdown.

In the normal operation at state 209, as shown in FIGS. 7, 8, 9, and 10, the mobile transceiver "A" button activates the outside speaker audio channel. The mobile transceiver "B" button activates the page audio channel. The A decode may activate the outside speaker audio channel regardless of the condition of the customer present line.

Referring to FIGS. 11 and 12, there is shown state diagrams for various operations of the base station in connection with the relationship between the main base board and the radio transceiver for the base station. The state diagrams include the customer detection alert tones sent to the transceiver. The normal operation may follow the requirements of the receive/transmit state machine diagram in FIGS. 11 and 12. The state diagram of FIGS. 11 and 12 relates to the radio frequency (rf) signal, audio and gong control.

FIGS. 11 and 12 illustrate various representative operations of the base station. The following is a key to the symbols used in FIGS. 11 and 12:

VEH_PRES—Customer present current lane
VEH_DET_IN—Customer present other lane
A_DEC—Signal to talk on current lane
Audio [l]—Inbound audio
Audio [c]—Inbound Calling Audio
Audio [S]—Outside Speaker Audio
Gong [x]—Gong lane x (1-current lane, 2 other lane) CARI turn on Tx
VEH_DET_OUT—Signal to other lane that customer is present in current lane Referring now to FIG. 32, there is shown a state diagram for various operations of the base main audio board "beep" function for the alert tones. These are alert tones when the base stations detect customers at the service points by means of the detectors 23 and 29. A beep idle state 222 transitions to states 224 or 226 when a customer is present. Alert and reminder signals are generated at states 227, 229 and 232. An early warning signal may be generated at state 234.

Figure 33:
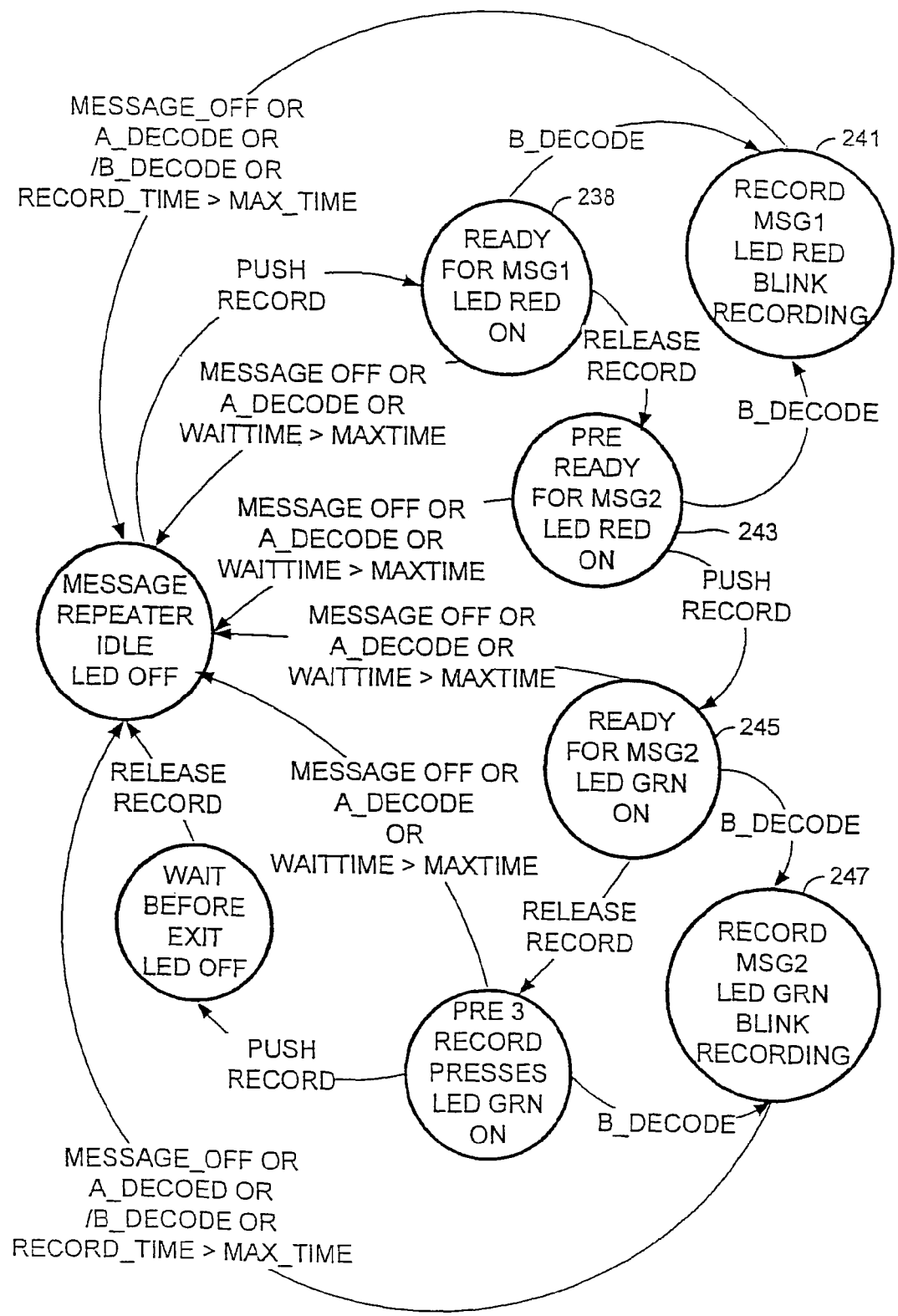

Referring now to FIG. 33, there is shown a state diagram for the base main audio board message repeater record operation. From the idle state 236, a state 238 is entered where a first message may be ready to be recorded. The final message is recorded at state 241. A second message may be recorded at states 243, 245 and 247.

Figure 34:
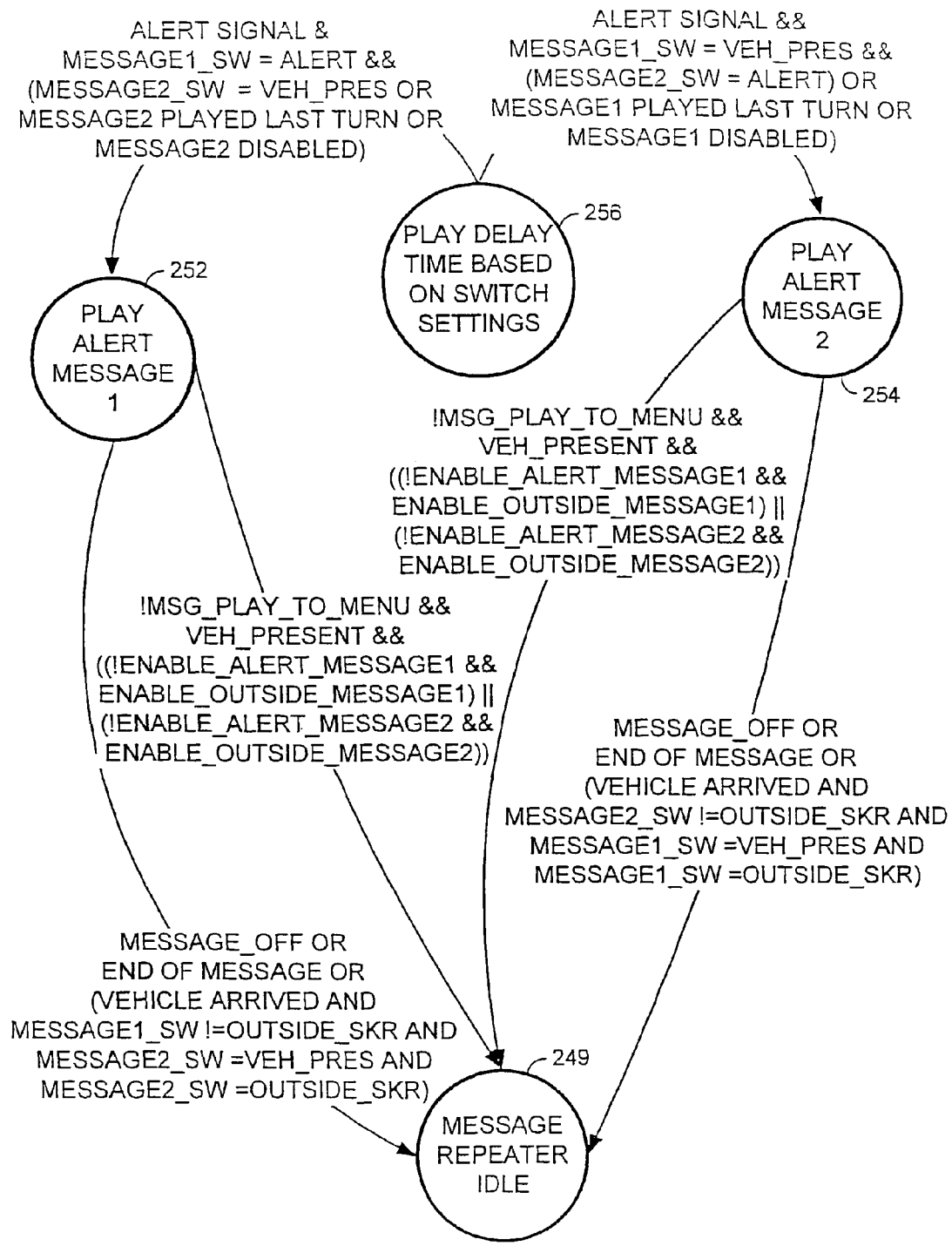
Figure 35:
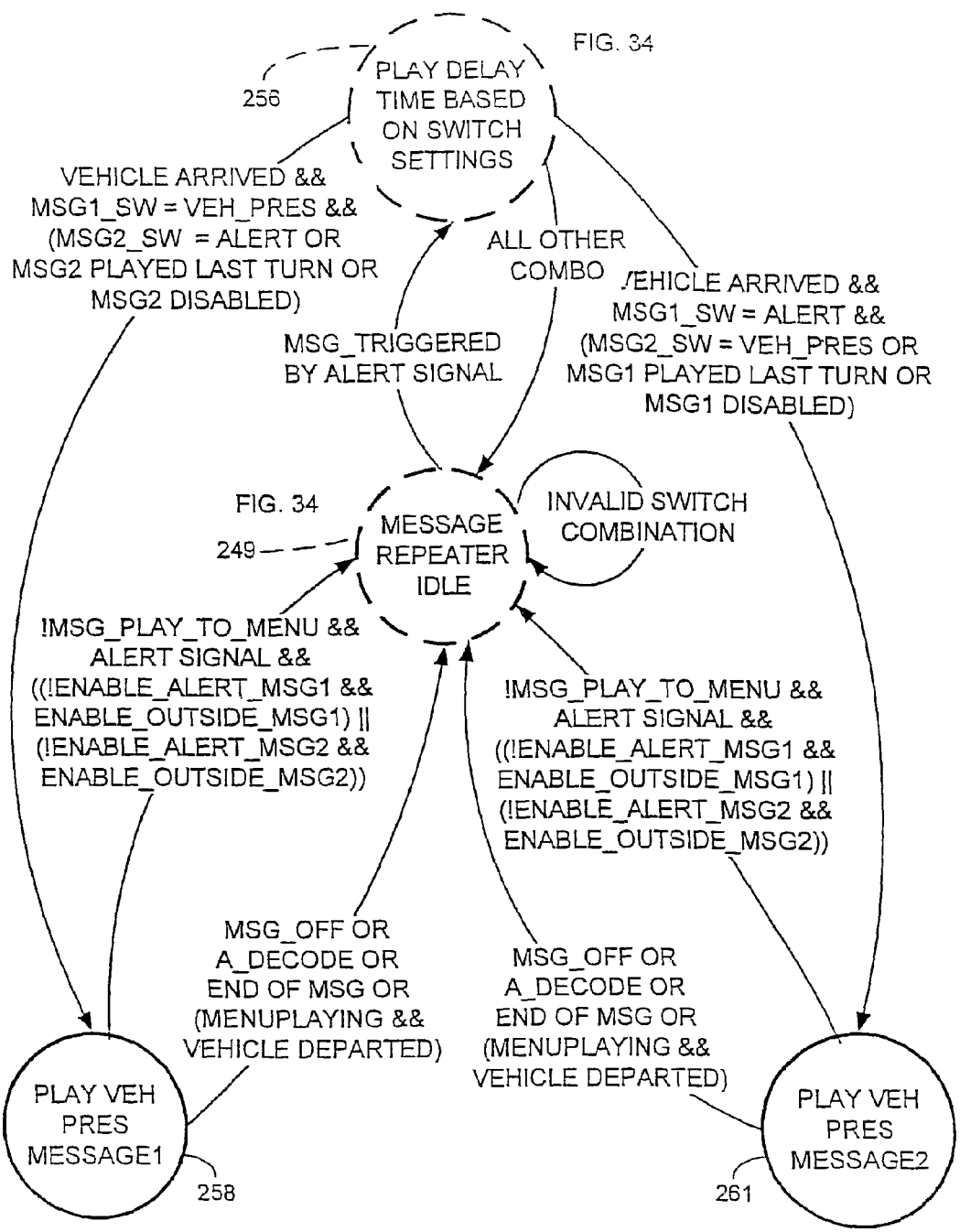

Referring to FIGS. 34 and 35, there is shown another state diagram for the base main audio board message repeater playback operation as it relates to the user switches. The recorded messages may be routed by the user to locations based on customer detection or the alert inputs.

From a message repeater idle state 249, alert messages may be played at states 252 and 254. The delay time of the messages are determined on user switch settings as indicated at state 256. The customer present messages are played at states 258 and 261.

Considering customer processing, if there are two lanes, then two base stations may be used as shown in FIG. 1. One of the base stations such as the main station 32 with the transceiver may be assigned to lane 1 and the other without a transceiver may be assigned to lane 2. In dual service point applications, two base stations may send customer present information between each other. The mobile transceiver may switch lanes to utilize whichever base station has a customer present. If there is only one lane, then only one base station is required, and that base station would be lane 1. Beep selection may follow the process of the state diagram in FIG. 32.

Each mobile transceiver is assigned a specific transmit time slot when the service person selects to transmit. The base station may be used to control and route audio traffic between mobiles and the service point connected to the base station. Any mobile transceiver can talk to the base station at any time as long as there are free time slots. Certain data bits in the voice packets from the mobiles may determine audio traffic routing at the base station. Normally all mobile voice packets may be retransmitted from the base so all other mobiles can hear. This provides the means for intercom communications (referred to as "B" Talk). A mobile service person can also select to have his or her voice packets routed to the service point at the base station as well as be retransmitted. This provides the means for wireless to wired communications (referred to as "A" Talk). Voice audio from the service point at the base will be transmitted to all mobile transceivers along with any mobile packets set for retransmission. In effect the audio sources are "summed" to form a kind of "party line" where everyone hears both sides of all the conversations.

When the service person turns on the mobile transceiver, it may immediately search for its registered base station and establish a downlink without any other service person actions. The unit audio may be muted and may remain in receive only with an active downlink until the service person activates a talk button or the base detects a car. Status may be indicated by audible and visual indications. Refer to state diagrams of FIGS. 8, 9, 10, 36 and 37 for an overall view of the mobile transceiver states and their interaction.

The following table provides a summary of the normal operation of the mobile transceiver firmware. Each description assumes service person is starting from a standby condition using lane 1 (primary service point).

| Signal Line | Use | Hands-free Mode On | Hands-free Mode Off |
|---|---|---|---|
| "A1" | Requests connection to primary service point and all mobiles listen that are connected to service point 1. | Push once to talk. After releasing button talking continues. Pushing and releasing again terminates the uplink. With uplink active receiving a command from the base station when a car leaves discontinues the uplink. No A1, A2 or B button presses for ~10 minutes when uplink is active discontinues uplink. If auto uplink mode is set and a car is detected then the mobile activates an uplink automatically and enters hands free transmit as if A1 were pressed. | Push and hold to talk. Releasing button terminates uplink. |
| "B" | Requests connection to mobile service persons & base main board as "B" audio on base. Not either service point. | Push and hold to talk. Releasing button terminates uplink. Overrides other modes in process (except a manager connection) and does not re-initialize those modes. | Same operation as HF mode |
| "A2" | Requests connection to secondary service point and all mobiles on service point 2 listen. | Push once to talk. After releasing button talking continues. Pushing and releasing again terminates the uplink. With uplink active receiving a command from the base station when a car leaves discontinues the uplink. No A1, A2 or B button presses for about 10 minutes when uplink is active discontinues uplink. If auto uplink mode is set and a car is detected then the mobile activates an uplink automatically and enters hands free transmit as if A2 were pressed. | Push and hold to talk. Releasing terminates uplink. In single lane mode functions in parallel with A1. |
| ∧ ∨ | Service person earpiece audio level. | Changes Volume Up or Down respectively. | Same |
| "ON"/ "OFF" | Turns Unit On and Off Single Button | Turns unit on when pressed. Turns unit off if held for 2 seconds after being on. | Same |

"A1" Button

"A1" button 83 (FIG. 6) activation allows the mobile service person to converse with the customer in lane 1 (service point 1). The unit provides audible and visual indication. The "A1" button 83 is only used for connection to and talking on the primary service point (lane 1).

| Parameter | Conditions |
|---|---|
| PTT Mode single or dual lane mode | If the unit is in the "push-to-talk" mode, the "A1" button when pressed and held may cause the unit to transmit to, and activate the "A1" channel of the base station (service point 1). If the "A1" button is released, the transmission may stop and the RF uplink terminates. |

-continued

| Parameter | Conditions |
|---|---|
| HF Mode | If the unit is in the "hands-free" mode, upon pressing the "A1" button the unit may transmit. After releasing the "A1" button, the unit may continue to transmit. If the "A1" button is pressed and released again, the unit may terminate the uplink to service point 1 on the release event. The uplink may also automatically terminate when the car detect goes false. |
| HF mode + auto uplink | If a mobile is set to this mode, the uplink is automatically established when a car arrives. Otherwise it works exactly as a mobile in HF mode. A mobile set to this mode requires no button presses by service person. |

"B" Button

"B" button activation allows a mobile service person to talk to all other workers within the work area regardless of which service point they have selected. Service point 1 and service point 2 does not hear any "B" channel audio. The "B" button connects with the base station previously registered. All mobile transceivers synchronized to the base may hear the conversation when "B" is depressed; no matter, which service point has been selected by the mobile service person. The "B" audio mode may also be set so that "B" on service point 1 cannot be heard on service point 2 and vice versa.

| Parameter | Conditions |
| --- | --- |
| PTT or HF Modes | The "B" button, when pressed and held may cause the unit to transmit to, and activate the "B" channel of the base station. The "B" button may operate even though another mobile is transmitting on channel "A1" or "A2" (assuming a free time slot is available). Releasing the "B" button terminates the RF uplink. "B" talk is heard no matter which service point had been previously selected with "A1" or "A2" buttons by other MOBILE TRANSCEIVER service persons. Pressing "B" overrides HF/auto uplink for this MOBILE TRANSCEIVER and does not re-initialize after B is finished. "B" mode can also be set on the base so that "B" audio on service point 1 cannot be heard on service point 2 and vice versa. |

"A2" Button

"A2" button 85 (FIG. 6) activation allows the mobile service person to converse with the customer in lane 2 (service point 2). The unit provides audible and visual indication. The "A2" button 85 may only be used for connection to and talking on lane 2 (service point 2). However, when dual lane is turned off, the "A2" button 85 works in parallel with "A1" button 83.

| Parameter | Conditions |
| --- | --- |
| Single Lane Mode | If the base is configured in the single lane mode, activating the "A2" button may parallel the actions of "A1" operation. |
| Dual Lane Mode | If the base is configured for dual lane mode, the mobile transceiver may change the audio connection from service point 1 to service point 2. After that it functions like "A1". If the mobile transceiver is in the "hands-free" mode and transmitting A1 uplink, the mobile transceiver may mute the microphone prior to changing service point. Pressing and releasing the "A2" button may establish an A2 uplink connection to service point 2. The mobile transceiver may receive service point 2 downlink after pressing and releasing the "A2" button. HF mode and auto uplink work the same as A1 but relate to service point 2. |

Mobile Transceiver Confirmation Tones

The mobile transceivers may produce confirmation tones during certain events as described below. These tones may be played into the service person earpiece speaker along with any other audio present.

| Event | Tone |
| --- | --- |
| Pressing keypad 0-9 numbers on Manager mobile | Tone after each key press |
| Manager dial tone | Tone on until next key press or time out |

Voice Prompts in Mobile Transceiver Unit

The mobile transceivers may use voice prompts to indicate function and configuration as described in the following table. These are examples only, as other suitable voice prompts may also be used.

| Trigger Event | Voice Prompt | Comment |
| --- | --- | --- |
| Initial power up | Power On, Mobile 51, Mobile 36, Mobile 65, Mobile 74 | May depend on which ID was previously saved. For example, only one of these prompts may be played at power on. |
| After initial power up, and Sync complete | Lane 1, Ready | May depend on previous saved state |
| After initial power up, and Sync complete | Lane 2, Ready | May depend on previous saved state |
| Battery voltage low | Change Battery | |
| Link lost or cannot establish at power on | Out of Range | |
| Start Registration at power up. Release B | Begin Registration | |
| Completed Registration | Registration Complete | The base may show ID on display. |
| Can't register after 3 tries Power off | Registration Failed Power Off | |
| Change Lane 1 to Lane 2 and sync complete | Lane 2, Ready | Prompt may be same as above |
| Change Lane 2 to Lane 1 and sync complete | Lane 1, Ready | Prompt may be same as above |
| Configure Hands Free On | Hands Free ON | |
| Configure Hands Free Off | Hands Free OFF | |
| Configure Auto Uplink On for Lane 1 | Automatic Handsfree Lane 1 ON | |
| Configure Auto Uplink On for Lane 2 | Automatic Handsfree Lane 2 ON | |

-continued

| Trigger Event | Voice Prompt | Comment |
|---|---|---|
| No time slots, and priority is too low to bump or function not available | System Busy | |
| When select max volume | Maximum Volume | May be no "beep" for this level |

The mobile transceiver micro-controller firmware may retrieve the desired voice phrase from memory and combine it with audio being sent to the mobile transceiver to the mobile transceiver earpiece speaker when a prompt is to be heard. Tone or voice prompts may be audible by the mobile transceiver service person whether or not the mobile transceiver is actually receiving audio from the base link.

The voice data may be stored as individual words in the mobile transceiver memory (not shown). The memory area may accommodate word locations and associated pointer table. Additionally, a phrase pointer table may be allocated that may accommodate possible phrases. Phrases may be no more than five words in length.

Voice data may be changeable and uploadable. A file packed as HEX format may be used for this purpose.

Mobile Transceiver Hands-Free Mode

The following table describes the hands-free operation:

| Parameter | Conditions |
|---|---|
| HF Stop | If the unit is in the "hands-free" mode and the unit is transmitting uplink, the unit may remain in the "hands-free" mode but end the uplink when a valid base command is received when the car detect goes false. |
| HF Timeout | If the unit is in the "hands-free" mode and the unit is transmitting uplink and A1, A2 or B has not been pressed for a predefined number of minutes such as about 10 minutes the mobile unit may stop transmitting uplink with no action required from the base or service person. |
| Hands free + auto uplink | It can be used in either single or dual lane modes. The user of this mobile does not have to do anything to talk with the service point. When car detection goes true the mobile may automatically establish an uplink to the service point and transmit audio without any actions by the service person. When the car detection goes false the base commands the mobile to terminate the uplink and go to receive only. The cycle is repeated every time a car is detected. A fail-safe time out may be implemented to terminate any uplink after some minutes continuous connection. Pressing the opposite lane "A" button does nothing except terminate the link like hands free in a single lane system. Pressing the opposite lane "A" button in a dual lane system only results in a Busy prompt until the button is released. Then link terminates on release like hands free. If the auto uplink enabled mobile has a "B" conversation and a car arrives, then the "B" conversation may be closed down and the "A" conversation may be setup. If an auto uplink mobile is linked and the service person wishes to use "B" then the "B" function may override the auto uplink and it may not be restored when "B" is released. The user of the auto uplink mobile may have to press "A" again to reconnect "handsfree" if necessary. |

Mobile Transceiver Configuration

According to the disclosed embodiment, the mobile transceiver may, for example, be configured by using combinations of button pushes, as explained in the examples in the following tables.

The HF ON mode is as follows:

| Parameter | Conditions |
|---|---|
| Set HF ON Mode | Pressing, for example, the "B" and Λ buttons exclusively while turning on the unit may configure the unit in the HF ON mode. |
| HF ON State Save | The status of this mode may be stored into the NV Memory immediately. |
| HF ON Confirmation | The unit may confirm a change in the mode. |

The HF OFF mode is as follows:

| Parameter | Conditions |
|---|---|
| Set HF OFF Mode | Pressing, for example, the "B" and the "V" buttons exclusively while turning on the unit may configure the unit in the HF OFF mode. |
| HF OFF State Save | The status of this mode may be stored into the NV memory immediately. |
| HF OFF Confirmation | The unit may confirm a change in the mode. |

The auto uplink ON mode for lane 1 is as follows:

| Parameter | Conditions |
|---|---|
| Set Auto uplink lane 1 ON Mode | Pressing, for example, the "A1" and the "Λ" buttons exclusively while turning on the unit may configure the unit in the auto uplink ON mode. Also may, for example, set HF on if not set. |
| ON State Save | The status of this mode may be stored in the base. |
| ON Confirmation | The unit may confirm a change in the mode. |

To prevent service person confusion the base may have a switch setting to disable any auto uplink operation by any mobile transceiver. Moreover, if one mobile transceiver is set to auto uplink and a service person attempts to set a second mobile transceiver to auto uplink on the same lane, it may be denied by the base and voice prompt may be played by the mobile transceiver.

An auto uplink ON Mode for lane 2 is as follows:

| Parameter | Conditions |
|---|---|
| Set Auto uplink lane 2 ON Mode | Pressing, for example, the "A2" and the "Λ" buttons exclusively while turning on the unit may configure the unit in the auto uplink ON mode. Also sets HF on if not set. |
| ON State Save | The status of this mode may be stored in the base. |
| ON Confirmation | The unit may confirm a change in the mode. |

To prevent service person confusion the base station may have a switch setting to disable any auto uplink operation by any mobile transceiver. Moreover, if one mobile transceiver is set to auto uplink and a service person attempts to set a second mobile transceiver to auto uplink on the same lane, it may be denied by the base and voice prompt may be played by the mobile transceiver.

The mobile transceiver may enter the registration mode only after the following sequence of buttons.

| Parameter | Conditions |
|---|---|
| Registration | Pressing, for example, "B" while turning on the unit may cause the mobile transceiver to enter registration mode. After "B" is released the registration process begins. Once registration is complete the unit may save the information. |
| State Save | The mobile transceiver shall save the registration information and use it every time the mobile transceiver is powered up. |
| Confirmation | The unit may confirm registration functions. |

Base Transceiver Operation

The base transceiver 44 provides the means for radio communication between service point 14 or service point 27 at the base station and the mobile units. The transceiver 44 is controls and routes intercom voice traffic between the various mobile units and two base service points. All communications are full duplex.

The base transceiver may support at least 10 uplink and 10 downlink time slots. During poor signal conditions or heavy interference, the base transceiver 32 may support dual slot diversity. If no time slots are available when a mobile transceiver attempts to establish a connection the service person may be alerted.

The base transceiver LED operation is as follows:

| Event | LED Action |
|---|---|
| At initial power up, or all mobile transceivers shut down, or no mobile transceivers detected after a time out. | Blink red |
| After power up and at least one mobile transceiver is detected | Steady green |
| No slots, system busy | Steady Red |
| During registration | Blink green |
| Successful registration | Steady green |

The base transceiver display is used during registration or when a mobile transceiver has been turned on and has made a connection. Mobile ID numbers are written to the display.

The following table shows the various events:

| Event | LED Action |
|---|---|
| When the registration is completed successfully | Show Mobile ID until something else shall use the display |
| A MOBILE TRANSCEIVER has made a connection to the base. | Show Mobile ID until something else shall use the display |
| The Base registration database is full | Show "F" until something else shall use the display |
| The registration has failed | Show "—" until something else shall use the display |
| The base is open for registration | Show "o" (small o) until something else shall use the display |
| The base registration database has been cleared | Show "c" (a small c) until something else shall use the display |
| Any other action | Clear display until something else shall use the display |

Base Transceiver Normal Operation

All mobile transceivers may be capable of receiving voice traffic signals from any source in the network once they are synchronized to and authorized by the base. All links remain mute unless a mobile initiates the "A1", "A2" or "B" talk functions or a car is detected at service point 1 or service point 2.

After power up and during normal operation, the base transceiver may have a means to find new mobile units coming into the network and releasing mobiles leaving the network or powering down. It may be possible to turn on new mobile units at any time and have them recognized by the base transceiver. Such would assume previous registration.

Two logic signals are provided to the transceiver board interface that indicate whether or not a customer is detected at service point 1 or service point 2. The transceiver board immediately un-mutes all mobile downlinks, sends one of two audio alert tones generated by the base main boards to all mobiles connected to service point 1 and/or service point 2, and begins sending audio from the service point 1 and/or service point 2 microphone to all mobiles. The alert tones are summed into the analog audio input signal applied to the transceiver by either of the base main boards.

If a mobile service person presses either the "A1" button 83, "A2" button 85 or "B" talk button 87, a signal is sent to the base transceiver asking for an uplink. Once established, the base transceiver begins reception of audio traffic from the mobile(s) and routes it to the appropriate location defined by "A1", "A2" or "B" functions. A mobile transceiver uplink may be established automatically upon car detection if a mobile transceiver has been set to the hands free+auto uplink mode.

If a mobile service person presses the "A2" button 85, service point 14 is disconnected and the mobile transceiver is reconnected to service point 25. Conversely, if "A1" is pressed service point 25 is disconnected and the mobile is reconnected to service point 14. The "A1" and "A2" buttons function identically except they cause the audio connection to be toggled between service point 14 and service point 25 in dual lane mode. In single lane mode they function in parallel and there is no difference. Pressing the "B" button 87 directs audio only to mobiles and not any service point. As shown in FIG. 2, the base main board may direct "B" audio to a grill speaker also if so configured.

The base transceiver 44 may support two different "B" audio modes when the system is set for dual lane mode. One mode may allow any "B" audio to be heard by all mobile transceiver service persons regardless of which lane they are connected to. The second mode prevents "B" audio from a lane 1 mobile transceiver from being heard by mobile transceiver service persons on lane 2 and vice versa.

Base Audio Traffic Flow

The base transceiver 44 and the base main board control the traffic flow within the base station 32 and the communications network. The transceiver functions are confined to the radio link and traffic routing on the link. All analog audio routing and controls are functions of the base main board.

Referring now to FIGS. 13-27, various different possible traffic flow conditions are supported by the transceiver. These figures of the drawings show a variety of possible signal flows, although many others are possible. The base transceiver may support any combination of mobile transceiver connections between service point 1 and service point 2 even if they are not shown specifically in the following figures but the air connections are limited by available time slots. For example, when using a single service point, one "A" and three "B" connections might be required or four "B" connections in conference could be used.

As indicated in FIGS. 13-27, a mobile transceiver with an active uplink does not receive its own re-transmitted audio back from the base. This prevents or at least greatly inhibits echo for the service person.

One special case may require the use of a "manager mobile transceiver". The "manager mobile transceiver can select to talk to any other mobile transceiver in the network and carry out a private conversation without anyone else able to listen. It uses the base to coordinate this function and uses available time slots. The limitation on air interfaces is still imposed. However, the manager connection may have priority. If a manager requests a connection and at least one slot is available, the base station 32 may terminate any lower priority traffic to make room for the manager connection.

As an example, to make a connection, the manager presses the "#" key (FIG. 6) and hears a dial tone. Then the manager presses the two digit mobile transceiver ID. This is entered via a keypad containing numbers 0-9 unique to the manager mobile transceiver. Using the ID number the base will route a direct one on one full duplex connection between the manager and a desired employee mobile transceiver. Any traffic being sent to the employee mobile transceiver may be terminated in favor of the manager connection if it has lower priority. The employee mobile transceiver may connect with the manager without any ring tone or any action by the employee. The employee mobile transceiver and manager mobile transceiver may only hear each other's audio because no other audio is routed to them during this type of connection. When the manager presses and releases the "#" button, the connection is broken and both mobile transceivers return to the network and function as usual. There is no timeout on a manager connection.

If the manager presses a mobile transceiver ID that does not exist or the mobile transceiver has an "A" connection, then the manager hears a voice prompt and the mobile transceiver shall revert to normal intercom operation.

The system 10 can register more than one manager mobile transceiver, and can support as many manager connections as time slots permit. Connection between two manager mobile transceivers may be permitted. Only the manager mobile transceiver that initiated the call can end the call. Manager mobile transceivers have all the functionality of a service person mobile transceiver when used for normal operations.

Figure 13:
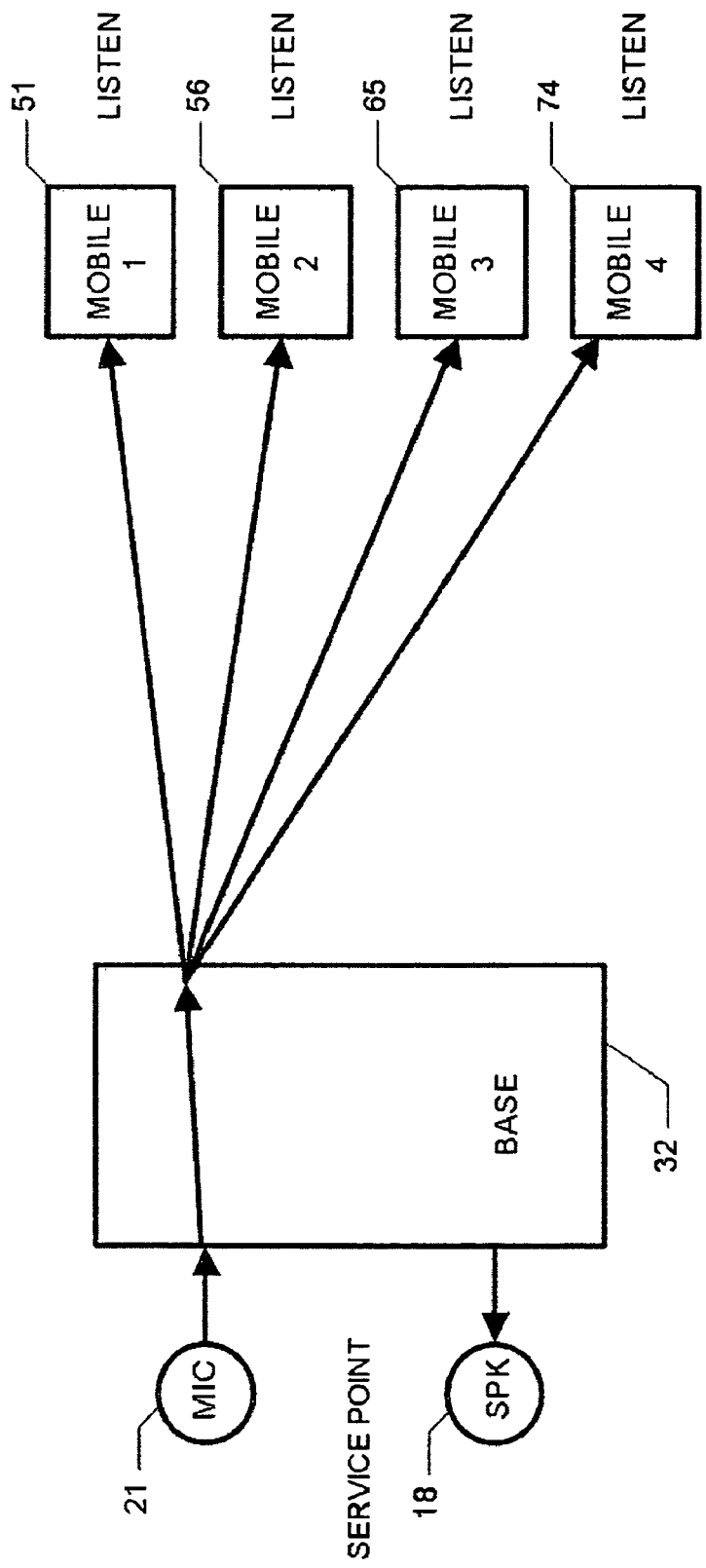
FIGS. 13-27 are block diagrams of various examples of base and base transceiver audio traffic flow operations.
Figure 14:
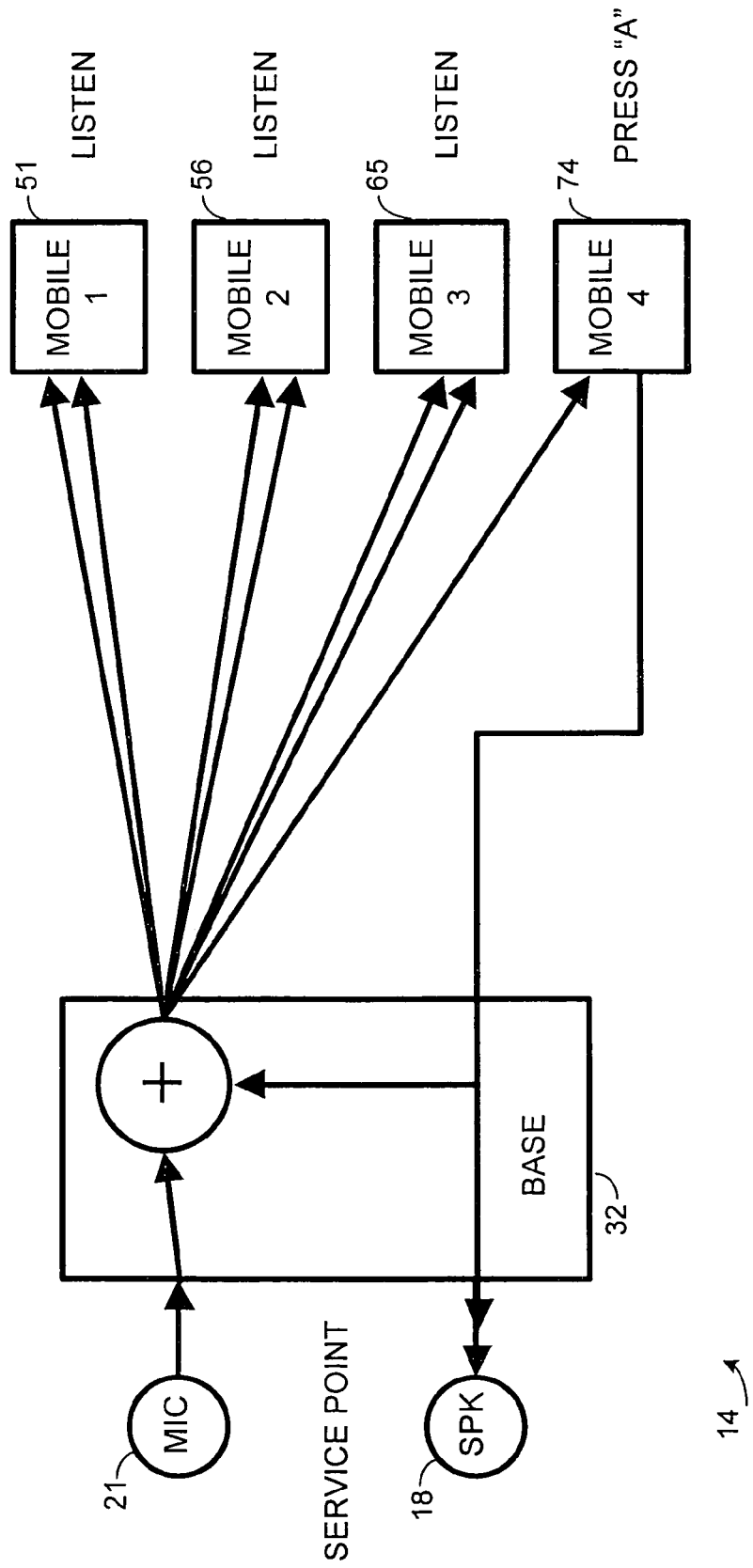

Examples of different audio combinations are shown and described in FIGS. 13-27. Referring now to FIG. 13, the customer arrives and the base station 32 transmits an alert tone and opens the audio link between the service point 14 and all mobile transceivers. Referring to FIG. 14, a basic connection with the mobile transceiver 74, talking to the service point and all other mobiles are enabled to listen. Service point 14 is summed with mobile transceiver 74 audio for all of the listening mobiles.

Figure 15:
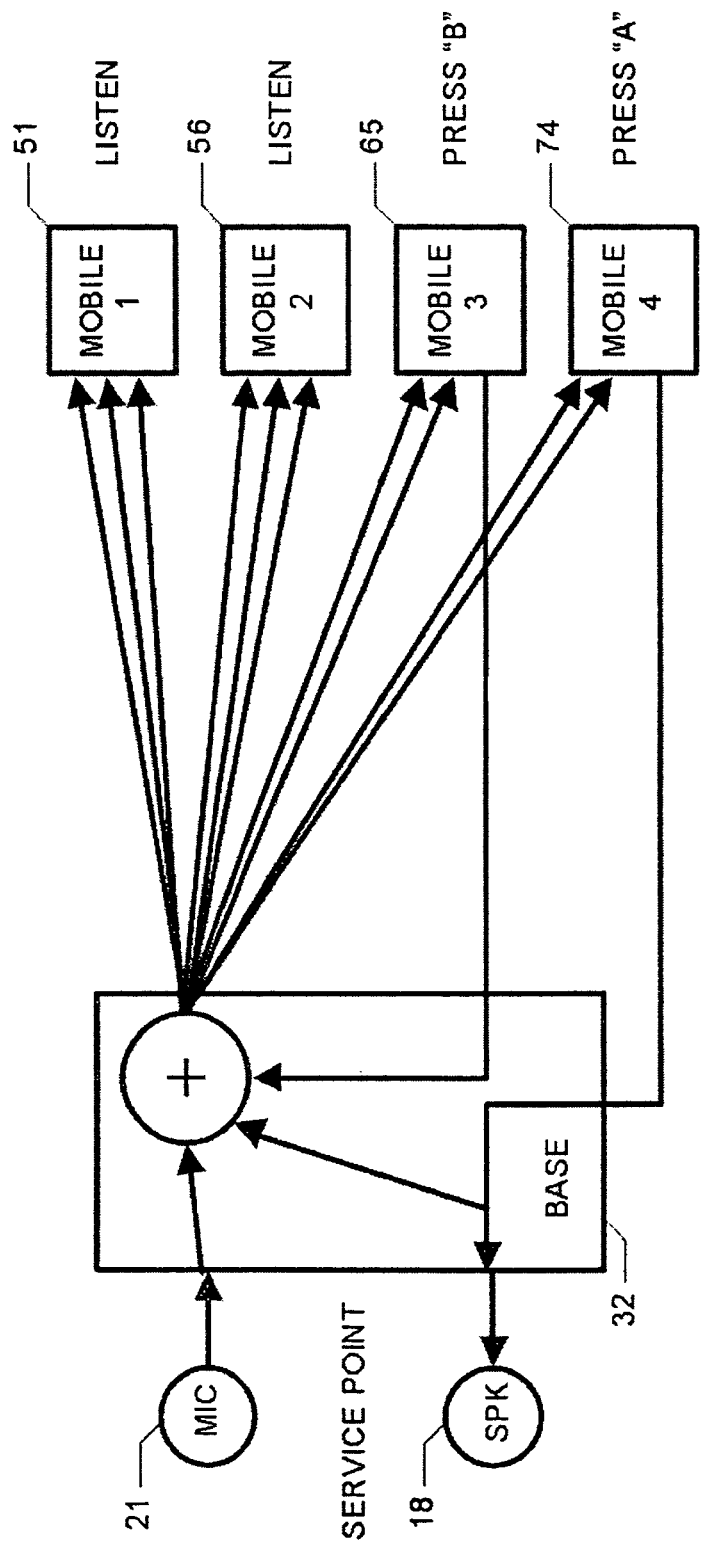

As shown in FIG. 15, the mobile transceiver 65 presses button "B" and asks a question. All other mobiles hear mobile transceiver 74 and mobile transceiver 65 plus in bound service point 14. No "B" audio is routed to the customer. Mobile transceiver 74 is also talking to service point 14.

Figure 16:
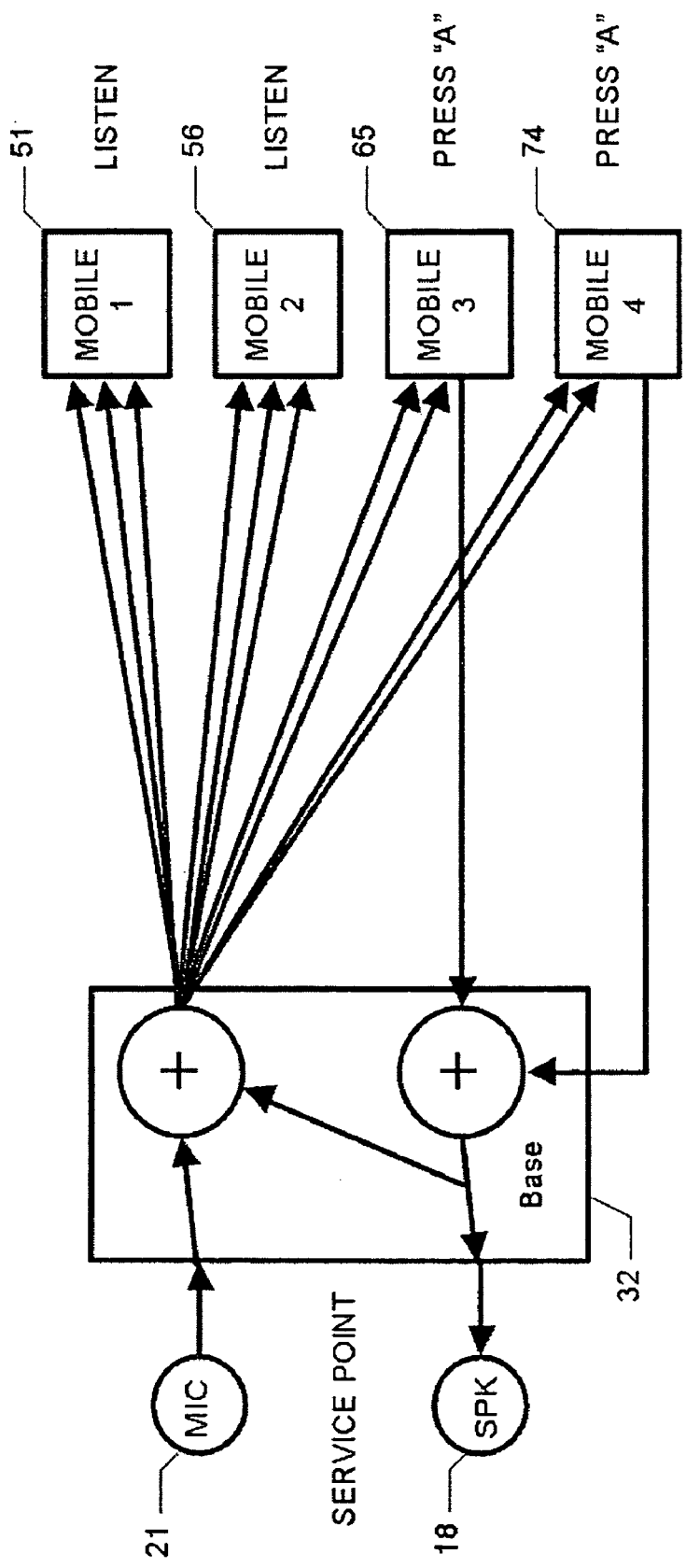

Referring to FIG. 16, the mobile transceiver 74 is talking to the service point 14. The manager on mobile transceiver 65 also says something to the service point 14. Service point 14 and all other mobiles hear everything.

Figure 17:
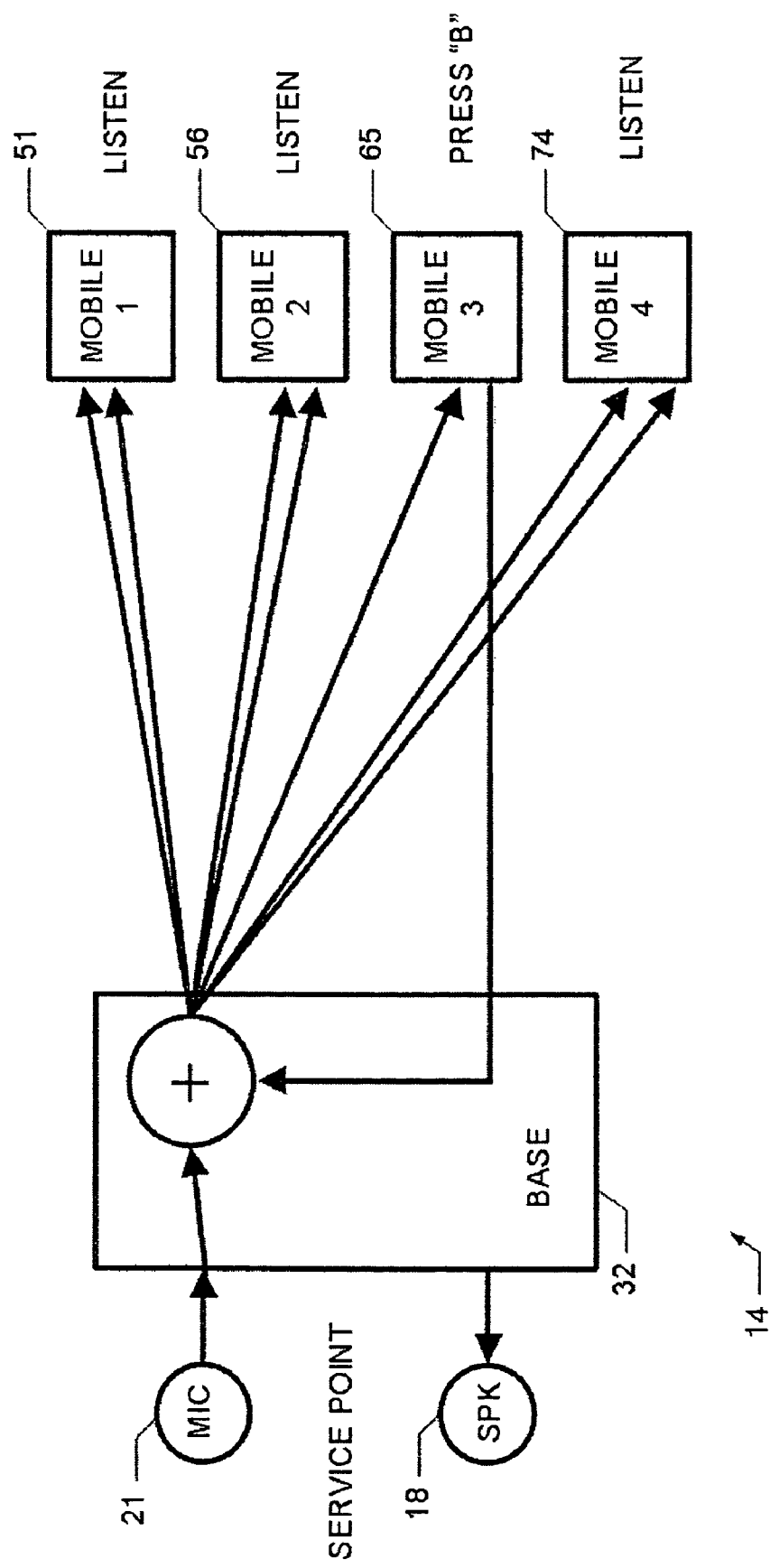

Referring to FIG. 17, the mobile transceiver 65 presses "B" button 87 (FIG. 6) and asks a question. All other mobiles hear mobile transceiver 65 plus in bound service point 14. No "B" audio is routed to the service point 14.

Figure 18:
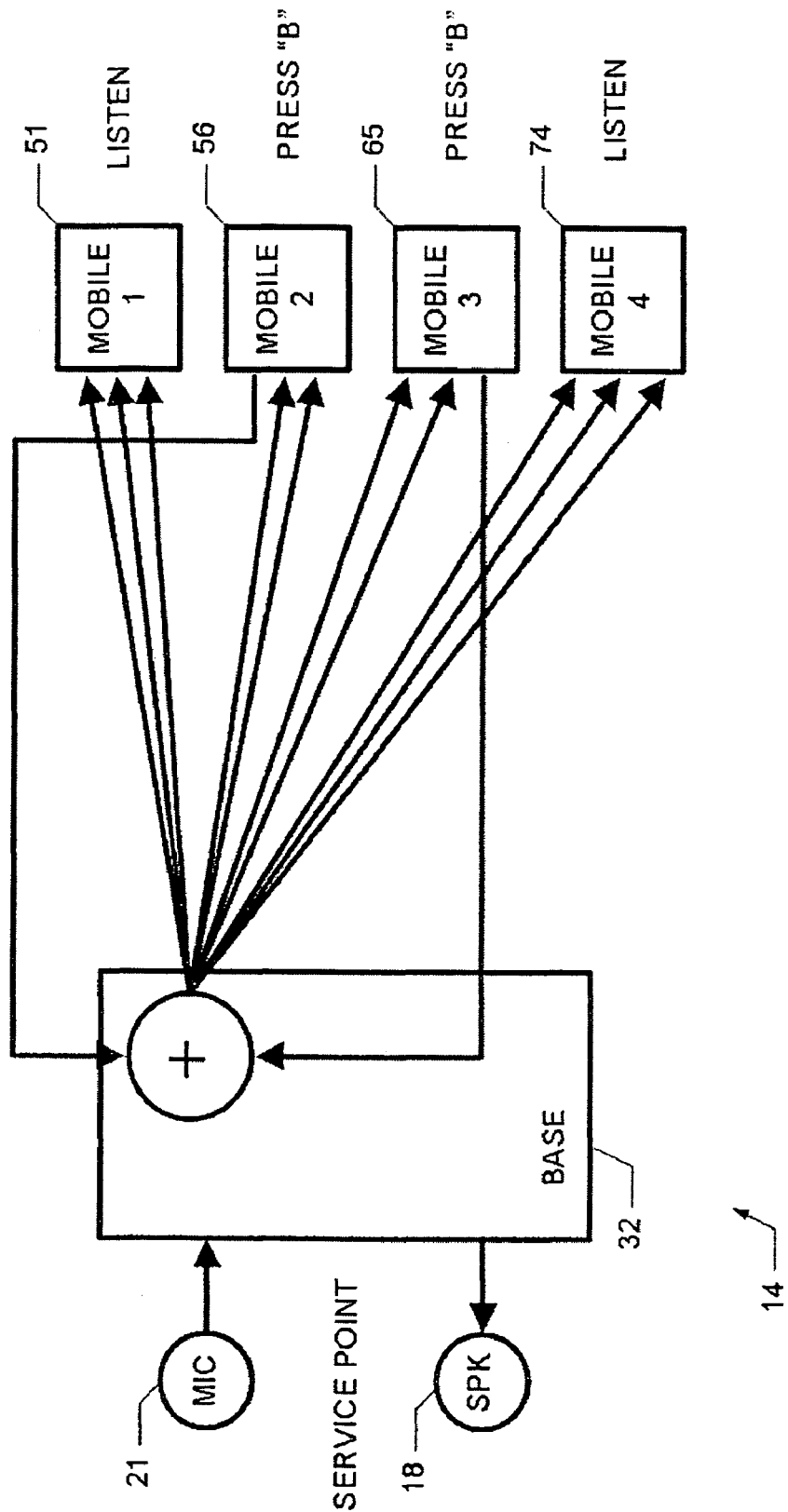

As indicated in FIG. 18, the service point audio is not active. Two transceivers talk on "B." Summing is required for all listening mobile transceivers.

Figure 19:
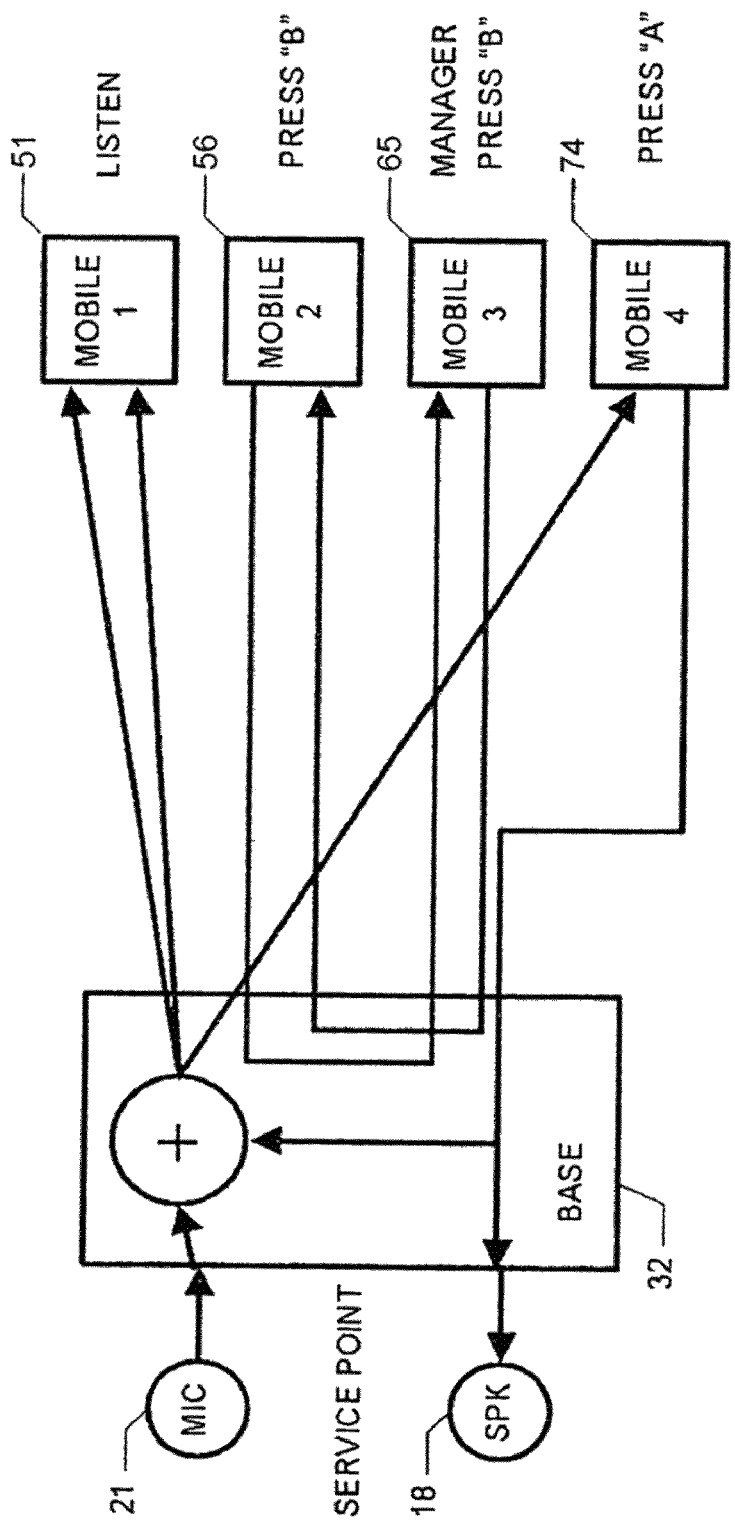

As shown in FIG. 19, the mobile transceiver 74 is talking to the service point 14 and others are listening. The mobile transceiver 65 is a special transceiver that the manager uses. The manager selects transceiver 56 with a keyboard entry. When the base station 32 determines that a manager wants to talk with mobile transceiver 56, it stops traffic to mobile transceiver 56 and routes only mobile transceiver 56 to transceiver 65 separate and independent from all other traffic. When the manager releases the connection, mobile transceivers revert to normal operation.

Figure 20:
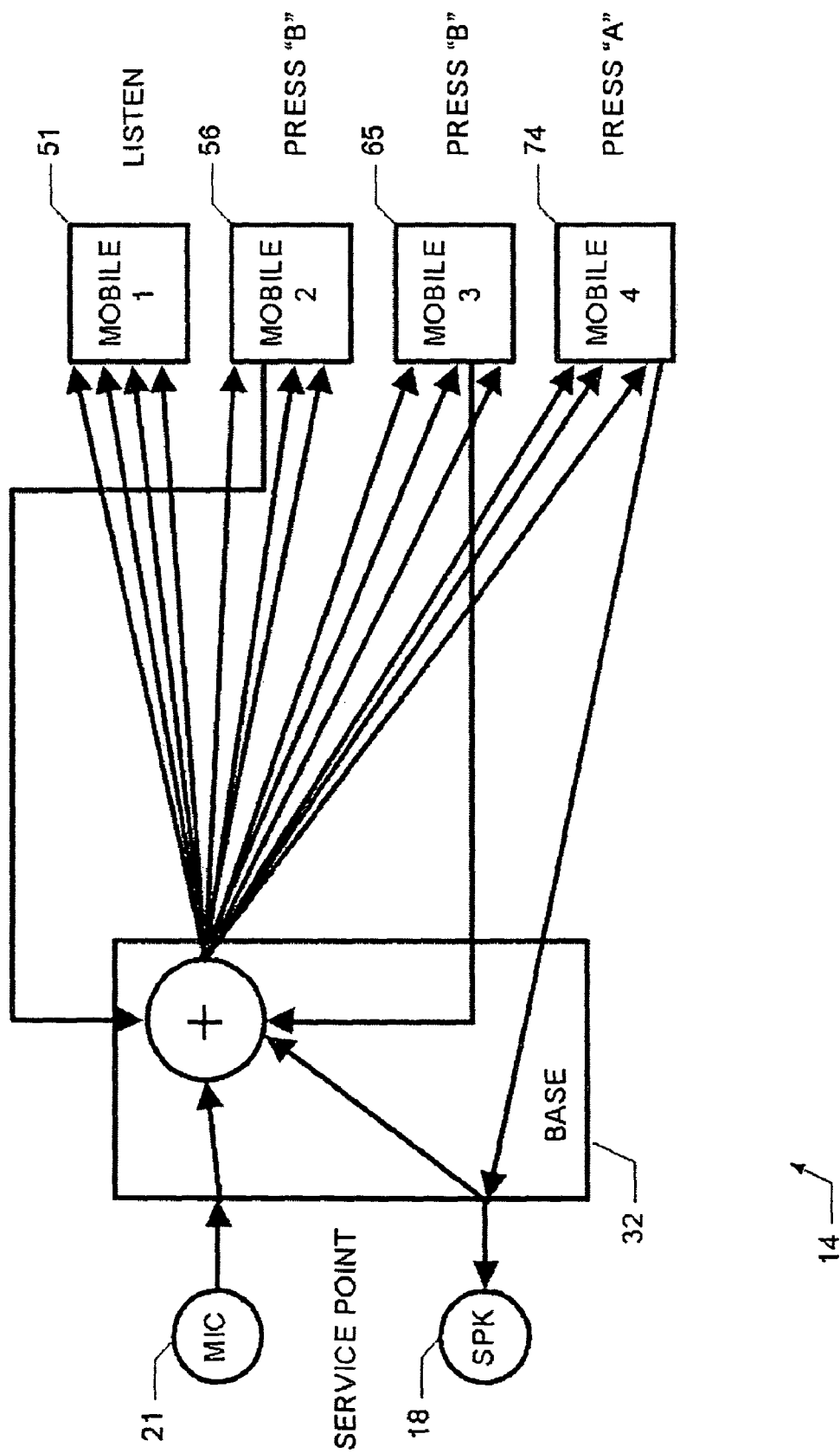

As shown in FIG. 20, the service point 14 is active and mobile transceiver 74 is talking to the service point 14. Two mobile transceivers are also talking on "B." Summing is required for all listening mobiles. Service point 14 does not hear "B" mobiles. All mobiles hear everything.

Figure 21:
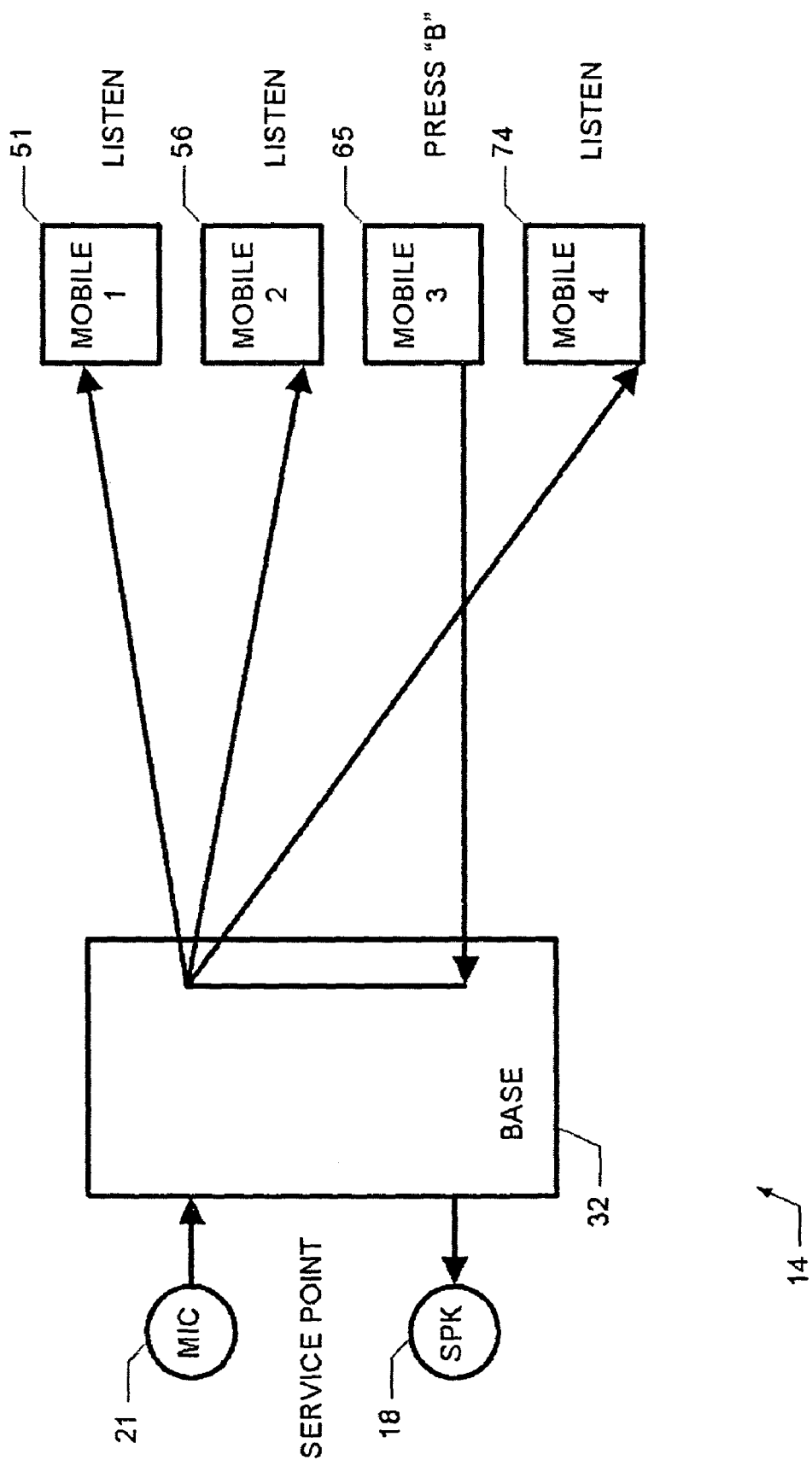

Referring to FIG. 21, the mobile transceiver 65 has its "B" button 87 pressed, to enable a question to be asked. All other mobiles hear mobile transceiver 65. Service point 14 is not active. No audio summation is required.

Figure 22:
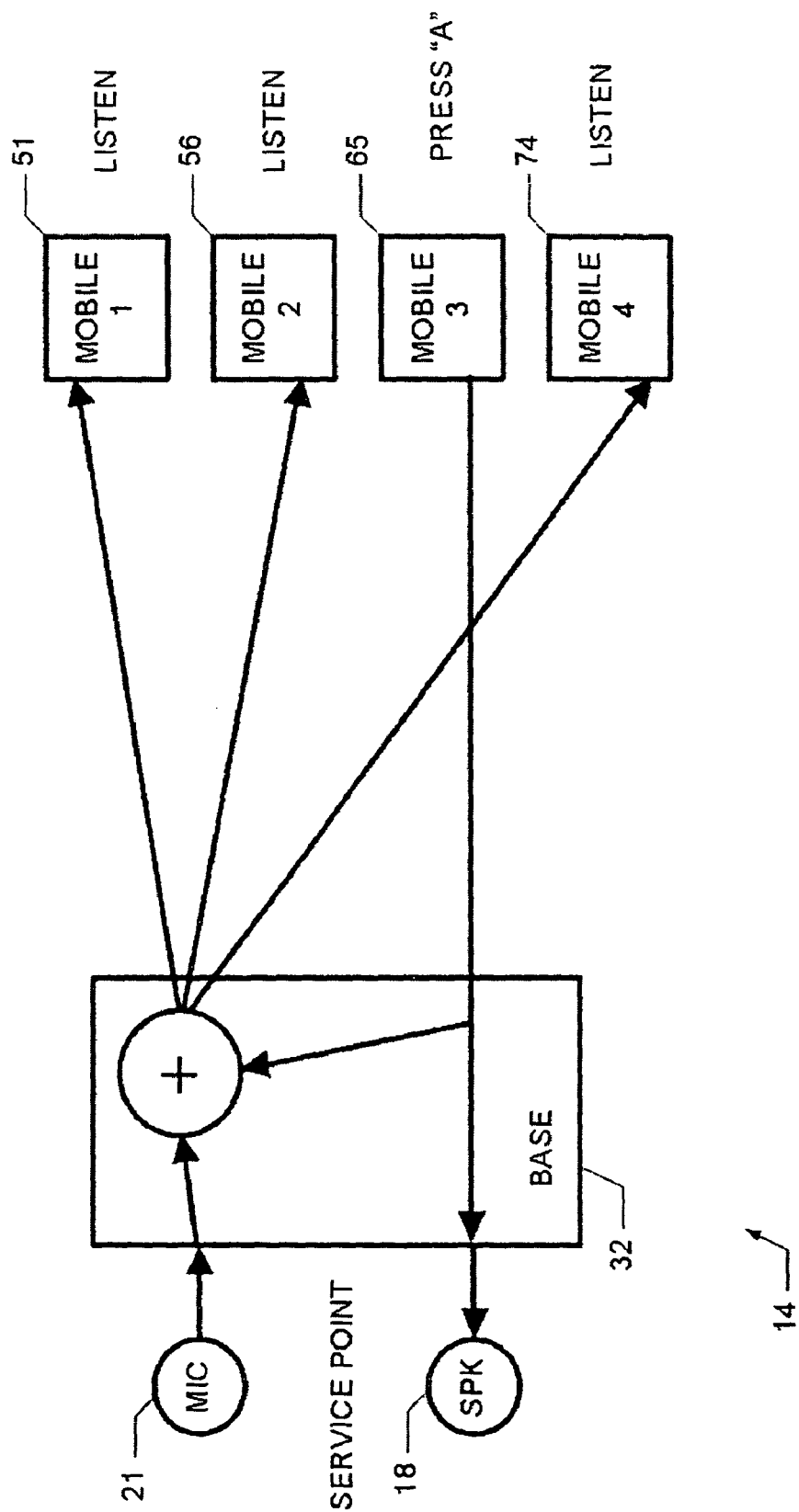

As indicated in FIG. 22, the mobile transceiver 65 has its "A" button pressed for a test. All other mobiles hear mobile transceiver 65 and service point 14 is activated. Any mobile pressing "A" activates the service point 14 as though a car was detected. This may be used as a test mode. An employee at the service point 14 can talk to all mobiles like a customer.

Figure 23:
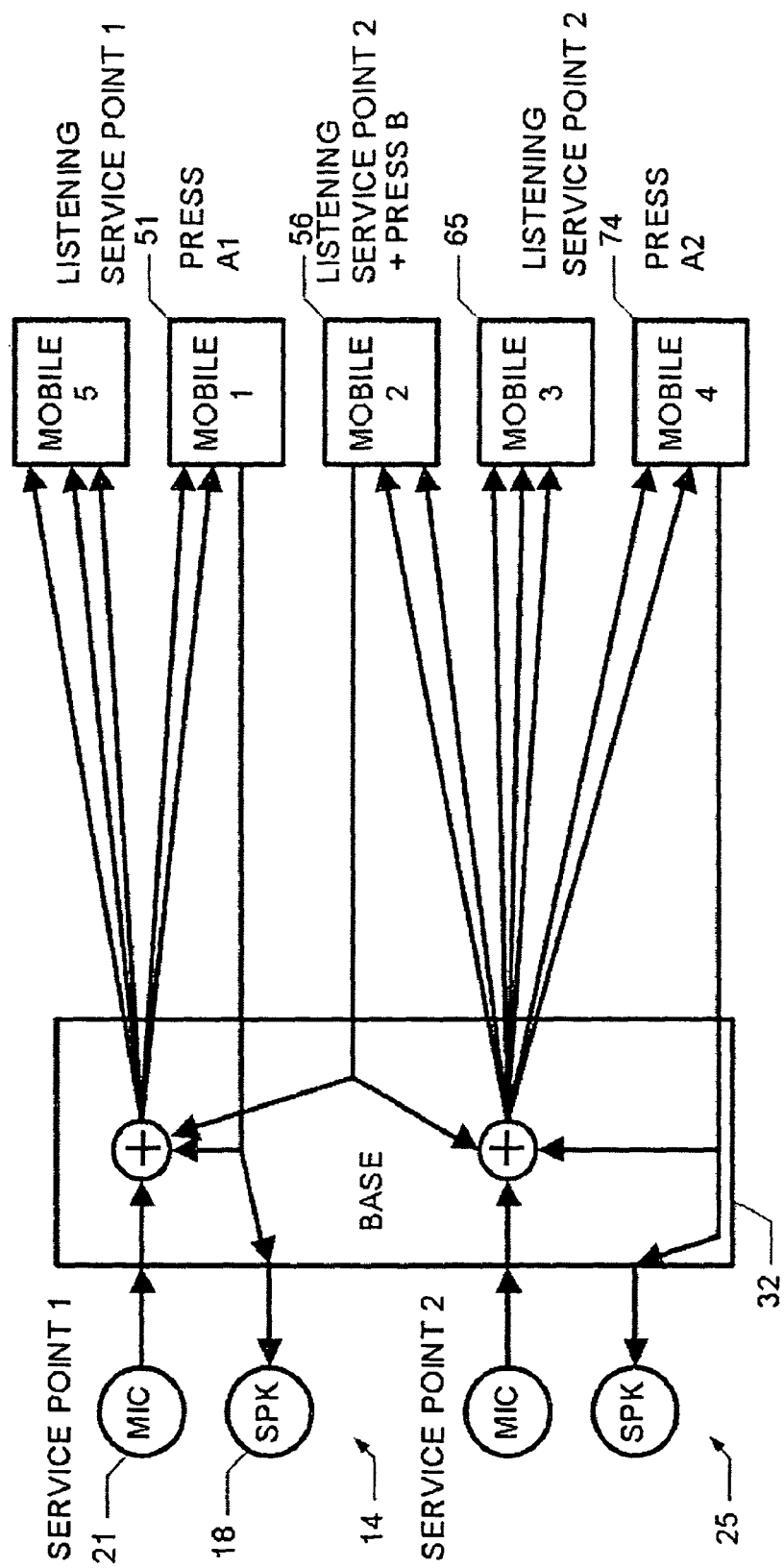

As shown in FIG. 23, in the dual service point mode, the mobile transceiver 51 is talking to service point 14 and mobile transceiver 74 talking to the service point 25. The mobile transceiver 56 is talking on "B" paging to another worker. "B" talk is heard by all mobiles. Service point 14 and service point 25 communications are independent and not heard by the other.

Figure 24:
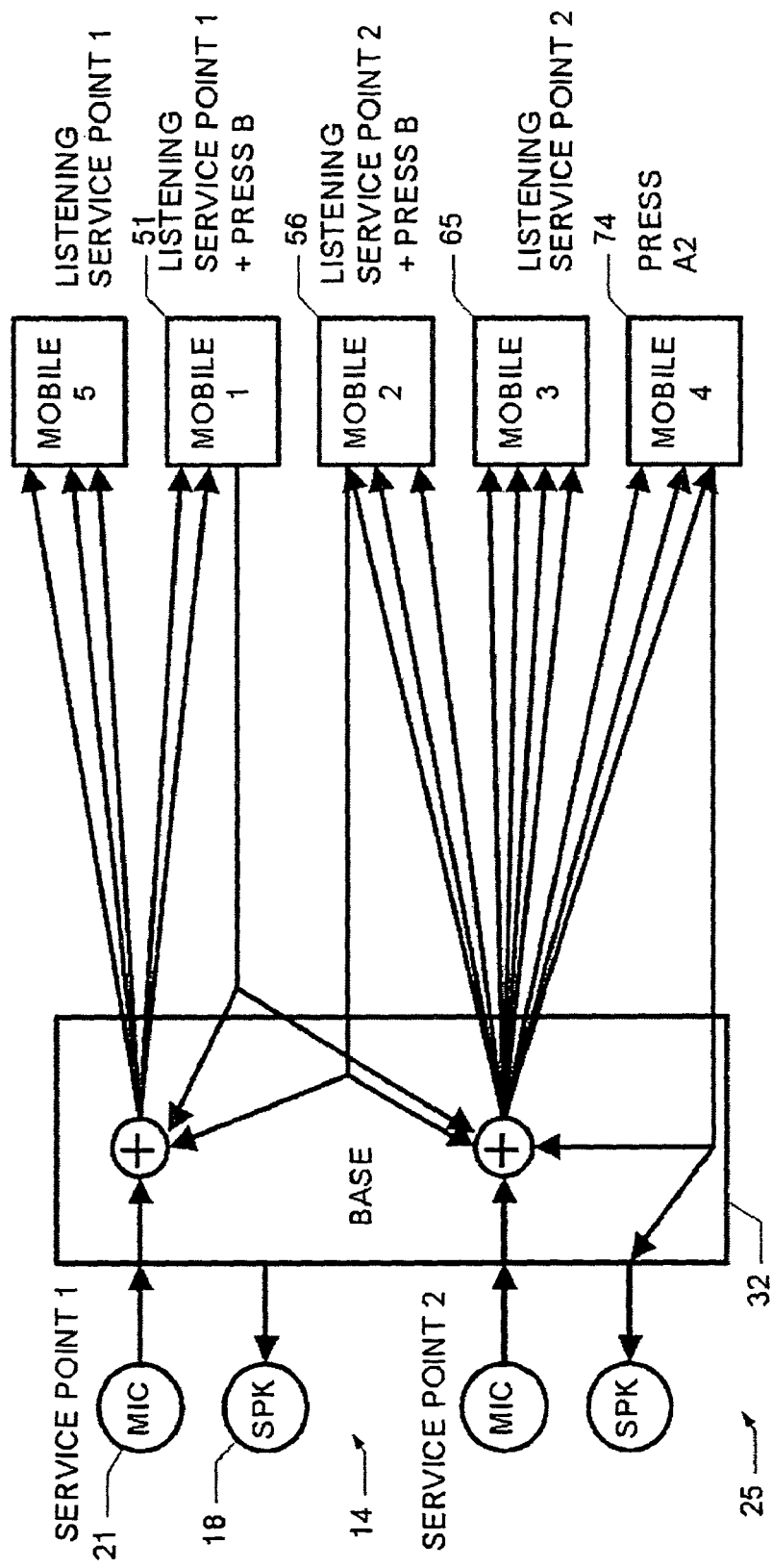

Referring now to FIG. 24, there is shown the dual service point mode, where a mobile transceiver 51 and mobile transceiver 56 are talking on the "B" page channel. "B" talk is heard by all mobiles. The mobile transceiver 74 is talking to service point 25. Service point 14 and service point 25 communications are independent and not heard by the other.

Figure 25:
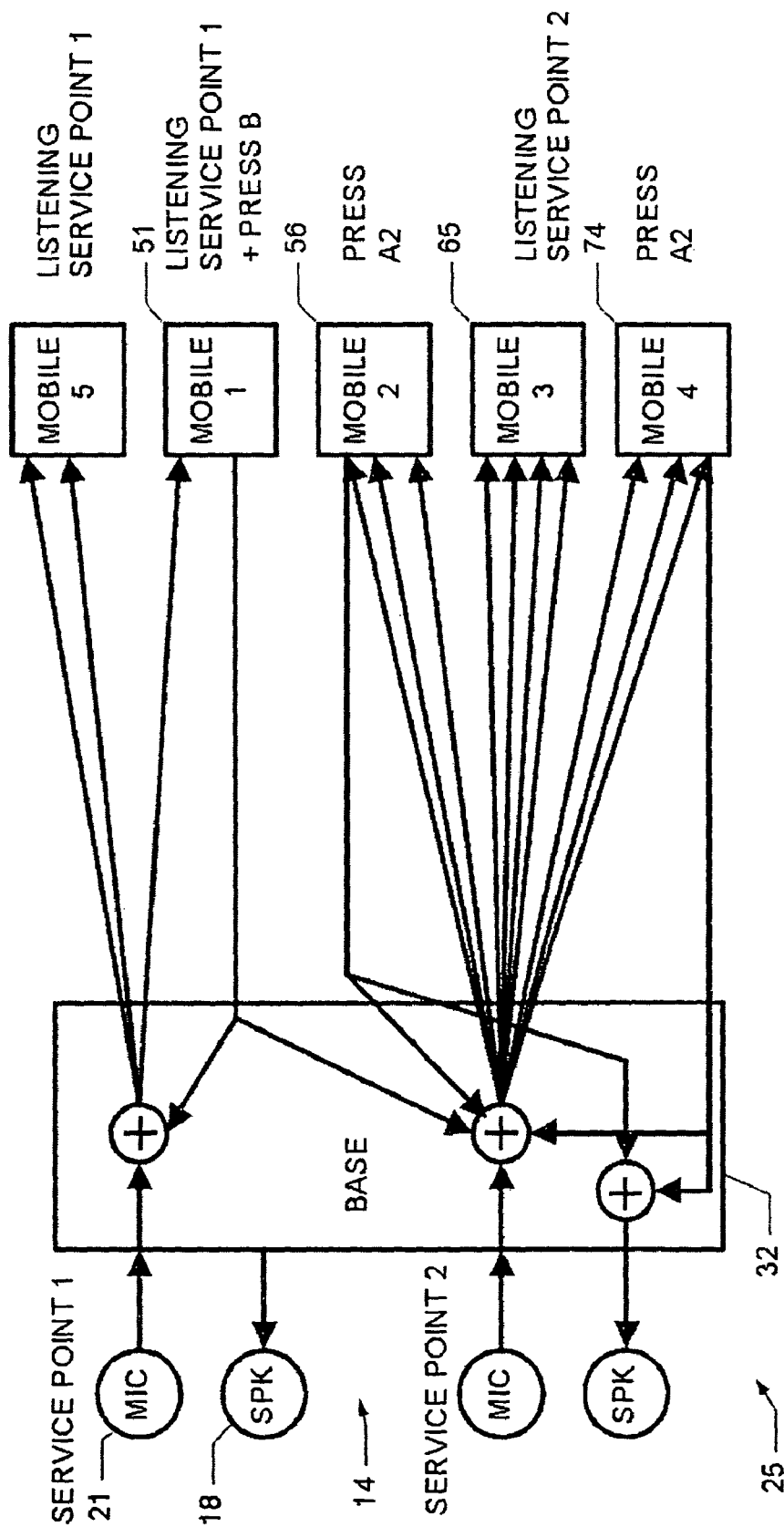

Referring now to FIG. 25, there is shown the dual service point mode. where the mobile transceiver 56 and the mobile transceiver 74 are talking on the "A2" channel to service point 25. Mobile transceiver 51 is talking on "B" channel." "B" talk is heard by all mobiles. Service point 14 and service point 25 communications are independent and not heard by the other.

Figure 26:
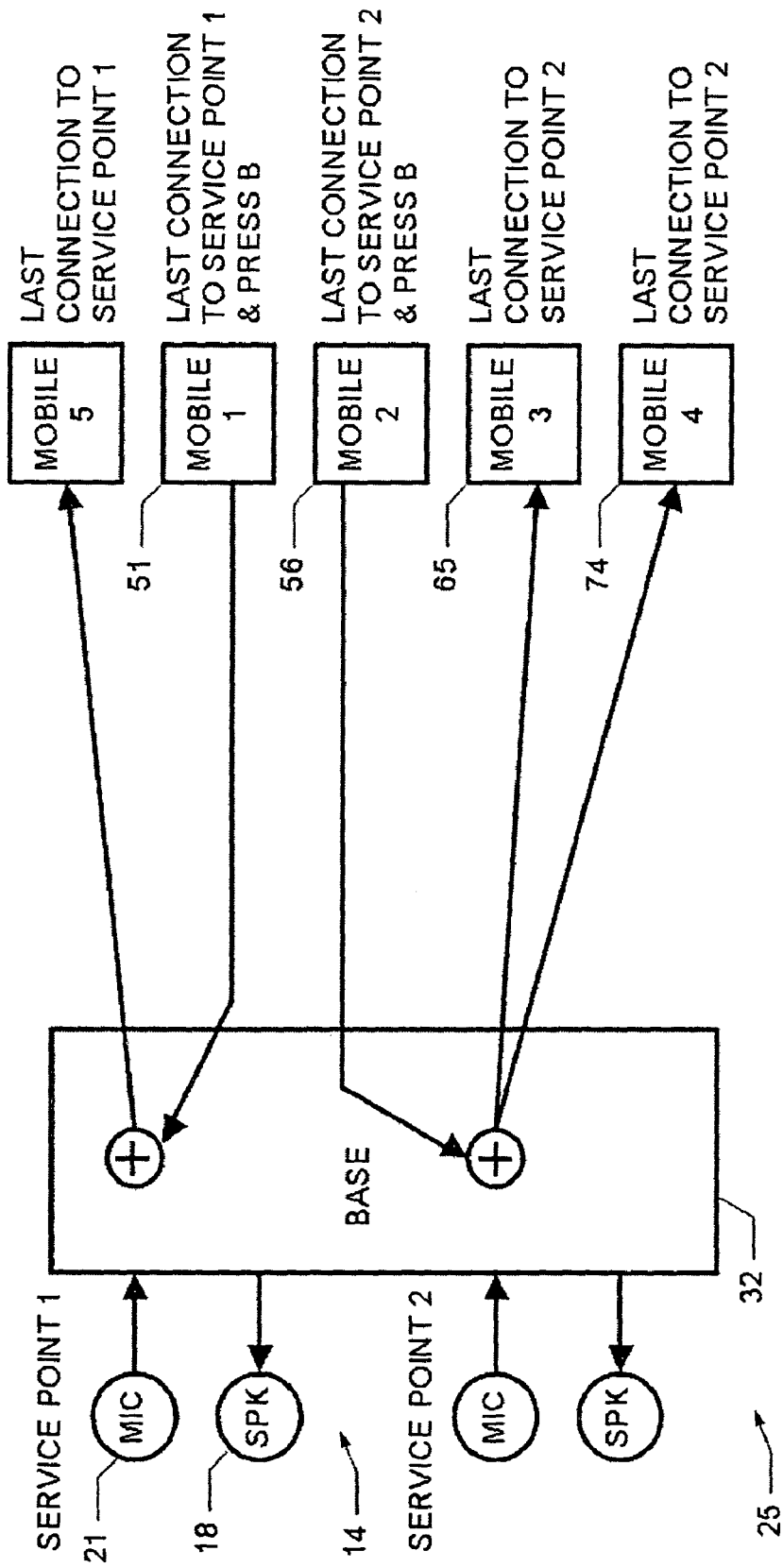

Referring now to FIG. 26, there is shown the dual service point mode, but without service point activity. The mobile transceiver 51 and the mobile transceiver 56 are talking on the "B" page channel. "B" talk is heard by all mobiles that were last connected to particular service point. B sum is disabled splitting the B channel between service points.

Figure 27:
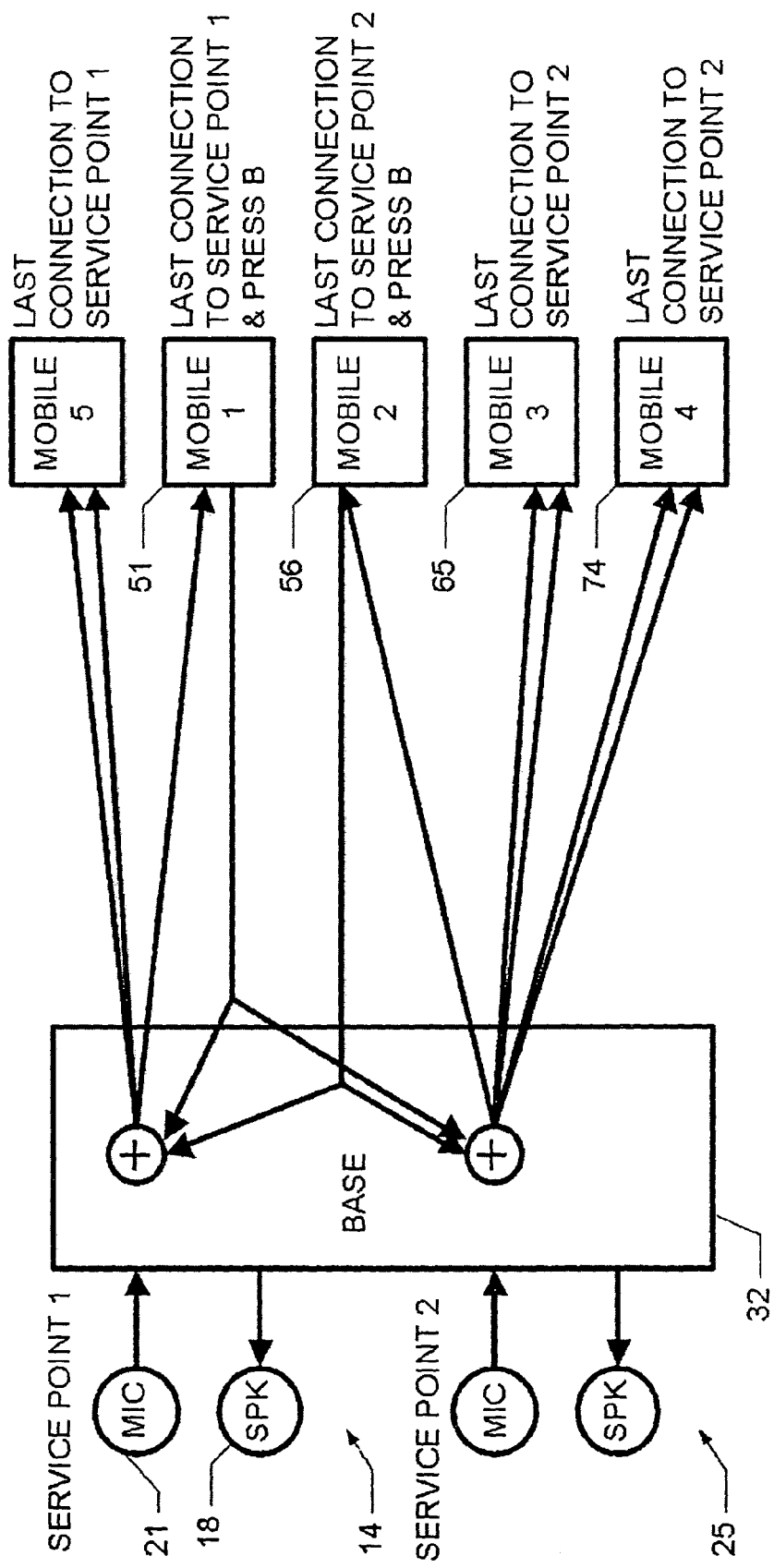

Referring now to FIG. 27, in a dual service point mode without service point activity. The mobile transceiver 51 and the mobile transceiver 56 are talking on the "B" page channel.

"B" talk is heard by all mobiles. B sum is enabled combining both service point mobiles in the conversation.

The base transceiver firmware may provide priority to "A1" or "A2" connections (or both). When the transceiver determines one or both car detect signals go true and all slots are full, it may terminate lower priority connections to make room for an "A1" or "A2" connection as required (or both). Connection priority may be as follows:
1) Service point connection
2) Manager mobile transceiver connection
3) Serial data communication
4) B connection For example, a manager connection may have higher priority than a serial data communication connection and an service point connection may have higher priority than both B and serial data communication.

To ensure that a prioritized connection may always be made, the base may reserve at least one available connection on the air interface when the appropriate condition is detected. Refer to the following table for the most common conditions and their effect on the number of available connections. This is an example assuming only 4 total connections are possible. There could be more or less total connections available in a system.

Serial Data Channel

The radio link protocol may support a low bit rate data channel on top of or in conjunction with the voice transmission.

The data from the serial data channel may be packed with the voice data using the tail bits in a portion of the voice packet. A separate electrical data input and output may be provided at the mobile and base end of the link. This is a bi-directional channel with an uplink and downlink.

The traffic flow cases for the data channel may be as follows.

1. Data input to the base transceiver may be sent to a specific mobile transceiver ID over a full duplex channel.

2. Data input to a mobile transceiver is sent over a full duplex channel to the base.

3. Data exchange between two mobile transceivers may or may not be supported as well as the broadcasting functionality.

Data to be sent over the data channel may be packetized by the user's external hardware and have a length and format to match the defined requirements of the data channel.

Figure 28:
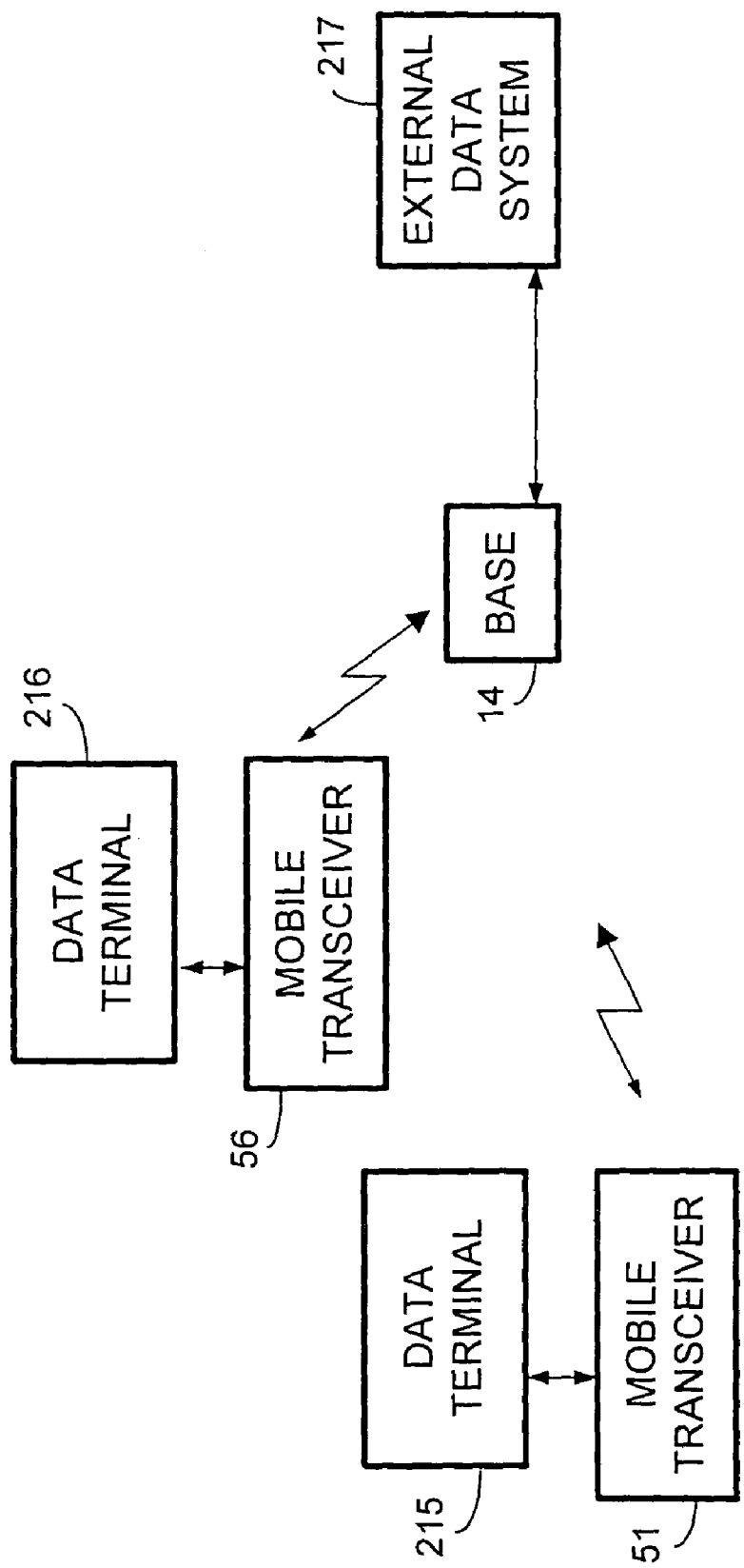
FIG. 28 is a block diagram of the system of FIG. 1, illustrating it in an alternate mode of operation.

As shown in FIG. 28, a data terminal such as terminals 215 and 216 may be coupled to a mobile transceiver such as the respective transceivers 51 and 56, capable of sending and

| Lane Configuration | Car 1 True | Car 2 True | Both Car 1 & Car 2 True |
|---|---|---|---|
| SINGLE Total of 4 available connections. | Reserve 1 connection. Remaining connections = 3 | Not Applicable | Not Applicable |
| DUAL Total of 3 available connections. | Reserve one connection for service point 1. Remaining connections = 2. | Reserve one connection for service point 2. Remaining connections = 2. | Reserve two connections for simultaneous hookup to both service point 1 & service point 2. Remaining connections = 1. Manager connection not possible for this condition. But "B" half-duplex OK. |

Air Link Protocol and Speech Codec

In the disclosed embodiment, the protocol may support at least 10 synchronous TDMA time slots for uplink and 10 synchronous TDMA time slots for downlink providing at least four simultaneous air interface connections and two audio broadcast channels, which transmits to the listening mobile transceivers.

This protocol may be capable of dual slot diversity during poor signal conditions or heavy interference. The protocol firmware may have the means to automatically use dual slot diversity when required.

The link protocol may contain the means for a mobile to disconnect from service point 1 and reconnect to service point 2 in a minimum amount of time. To go from one service point to another may be controlled by the mobile service person, by pressing either the "A1" button or the "A2" button to toggle the connection. A mobile transceiver uplink may be automatically established when a car is detected and a mobile transceiver is set for this function. All other transceivers function as usual.

The speech CODEC may use ADPCM, 32 Kbps compression. The protocol may support a one on one connection between a manager transceiver and any other transceiver in the network.

receiving data to and from another system, referred to as the external data system. The external data system 217 could be any system capable of sending and receiving data. For example, such system may include a sales system, an inventory system and others.

Packet routing will now be described with reference to FIG. 28. In order to target a unique device (mobile transceiver or the external data system 217) all devices may have a unique identifier (ID). When sending a packet from one device to another, both the destination ID and source ID may be sent as part of the payload. This way the receiving device is able to respond to the sending device.

The mobile transceiver ID may be used as the identifier for the attached terminal.

Considering now the protocol used in the system, the protocol is a protocol suitable for serial communication. The protocol supports communication between devices such as a terminal or sale system, a computer system, as well as communication between a device and a task/application within the attached mobile transceiver or the base station.

Data Flow Control

Data flow control may be implemented in the upper layer protocols/applications, located in the attached devices, to ensure reliable data flow i.e. the flow control may be implemented at the data terminal and external data system.

Since voice (A1, A2) has priority over the serial data link, it may be released by the base if a higher priority activity emerges. However, an existing voice link may carry serial data in conjunction with voice and the link may remain active if the voice terminates (mute mic) before data transmission is complete. The converse is true if a data connection is active and voice is desired.

There may be four commands: request connection, release connection, connection open, connection closed.

Figure 29:
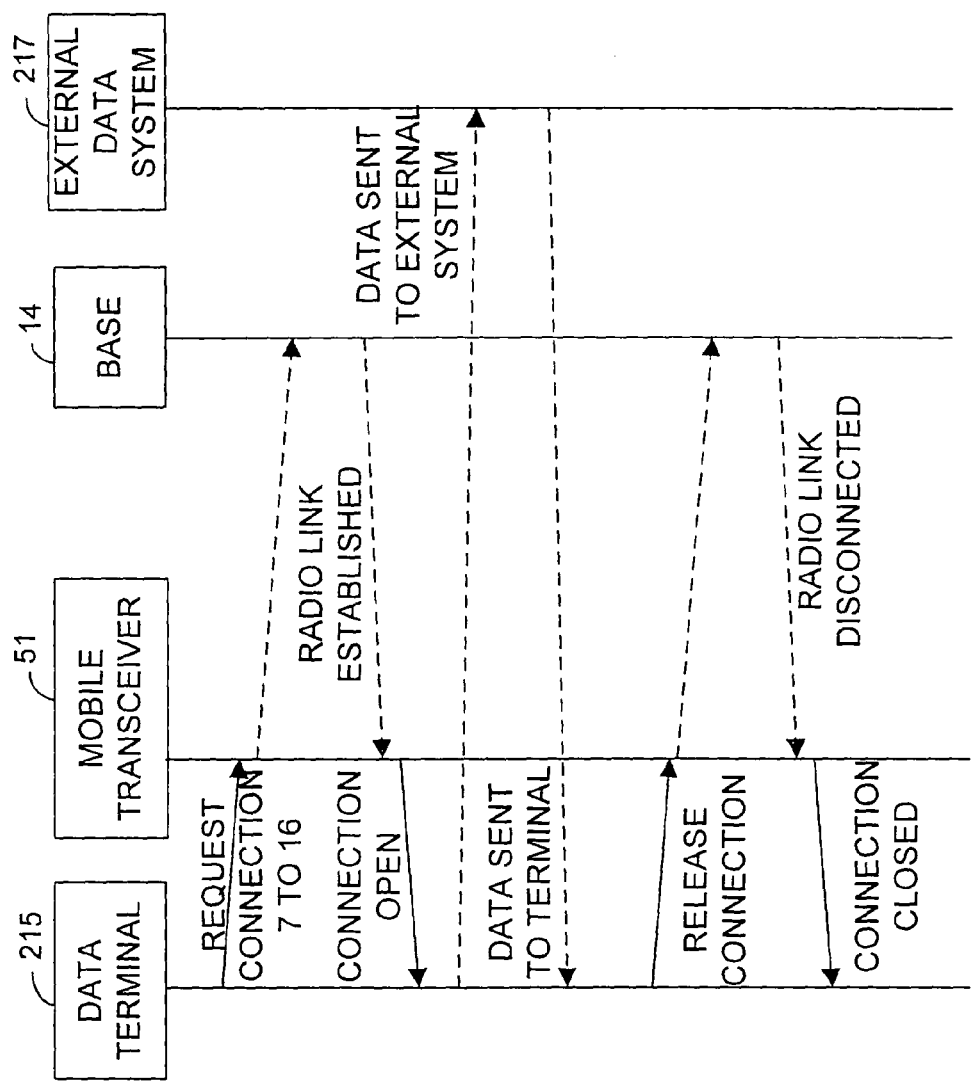
FIGS. 29, 30 and 31 are sequence charts illustrating various communication connection establishments for the alternate mode of operation of FIG. 28.

As shown in FIG. 29, the sequence chart illustrates connection establishment and release initiated by the data terminal connected to the mobile transceiver #51.

FIG. 29 illustrates the series of communication paths or links that may be established between the external data system 217 and the data terminal 215 via the mobile 51 and base station 14.

Figure 30:
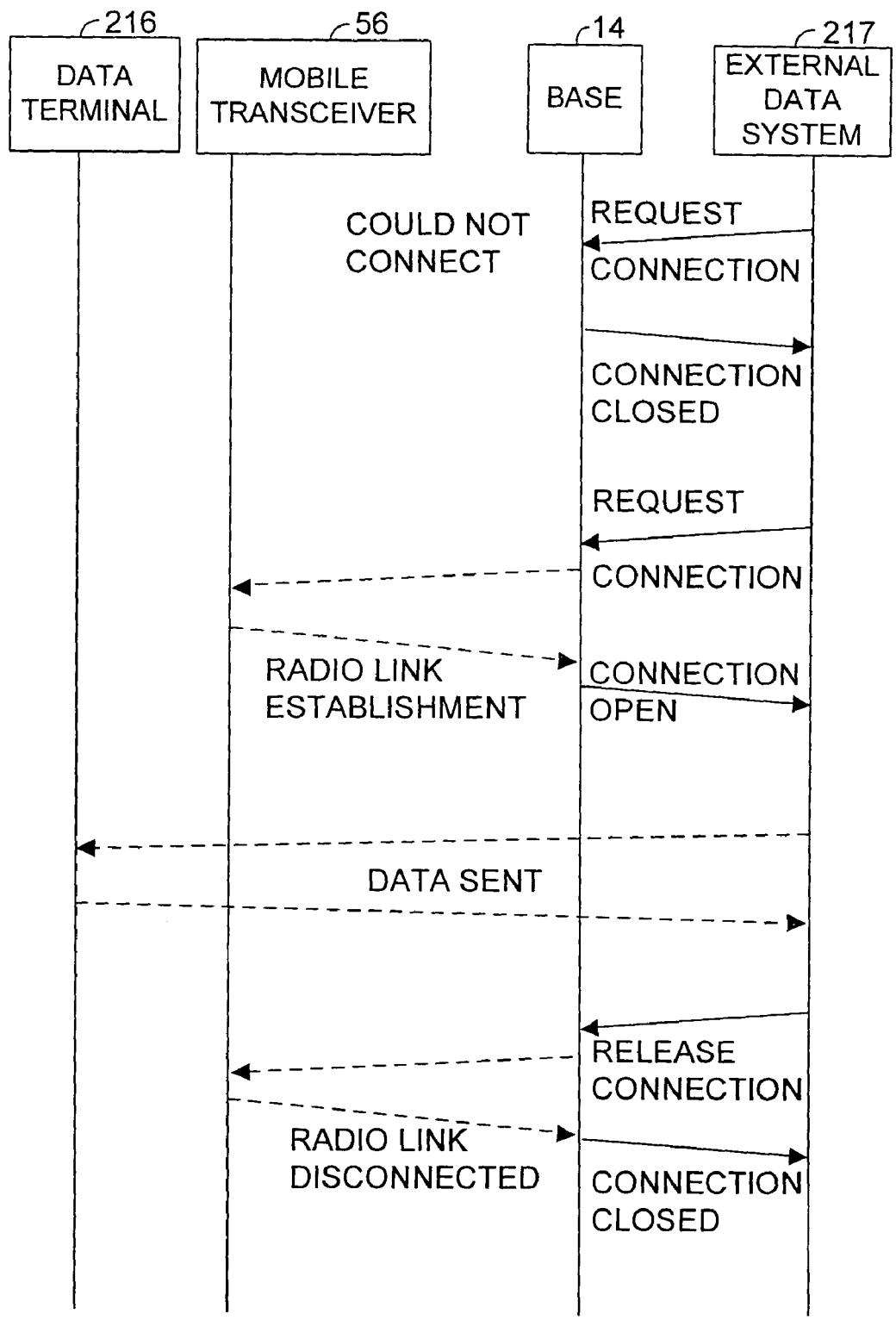

As shown in FIG. 30, the sequence chart illustrates connection establishment initiated by the external data system 217. The target mobile transceiver is transceiver 56.

Figure 31:
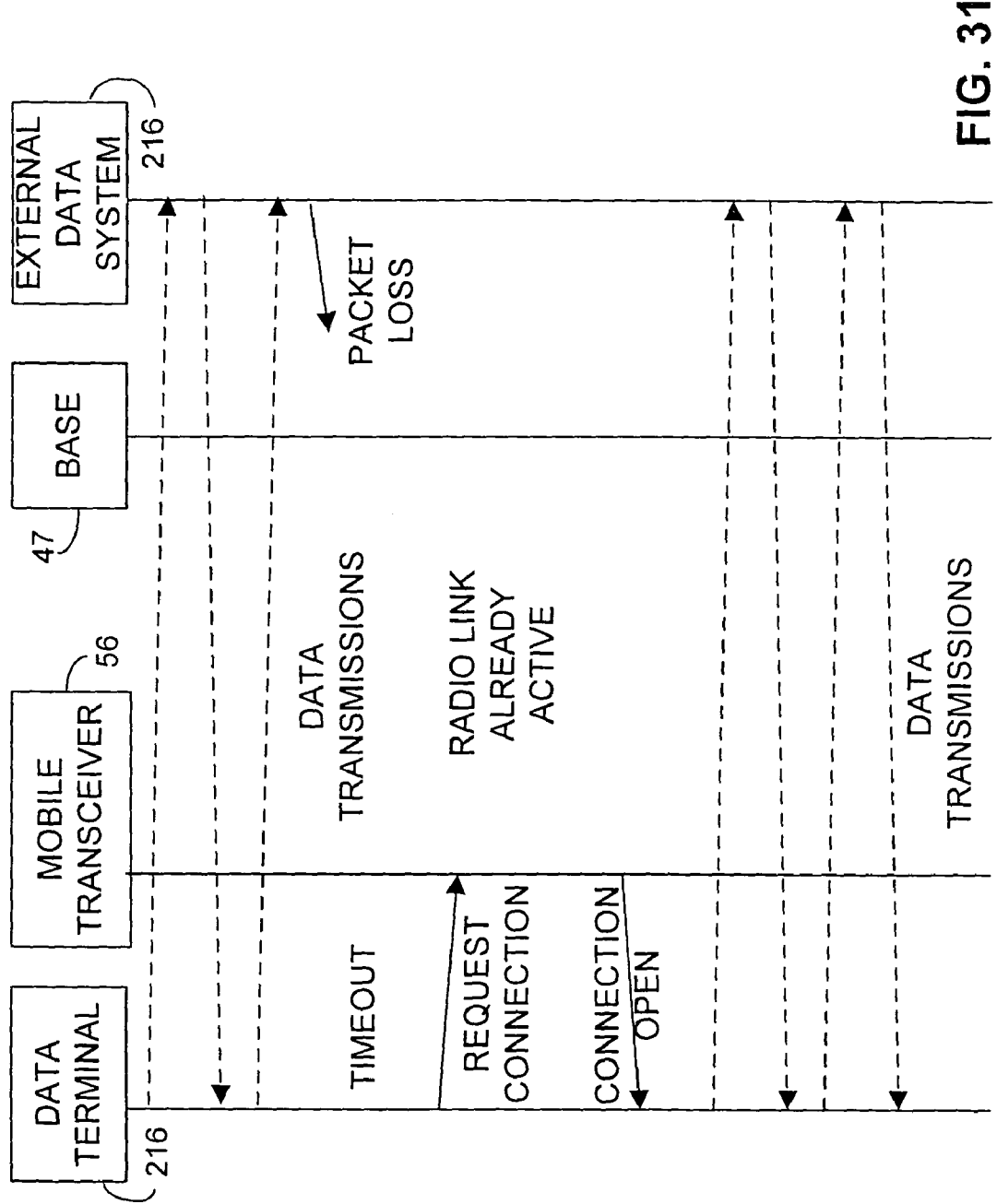

As shown in FIG. 31, the sequence chart illustrates connection timeout and reestablishment.

Base And Mobile Registration

The base and mobile transceiver firmware may contain the means to register and maintain information in memory about connections to be used. Both the mobile transceiver and base may provide the means to perform registration using the RF interface.

The registration is initiated by pressing the registration button on the base then the mobile transceiver may use a previously described button sequence at power up to initiate the registration request. Registration may prevent unauthorized connections to the base. System retries several times before fail. Base displays a fail character if registration fails. For example, it may be a character different than any ID number. There are a certain number of ID numbers. If all IDs are used, and the user wishes to replace a mobile transceiver in the system, the user may clear the registration data from the base by pressing clear and reset simultaneously and re-register all mobile transceivers including the replacement. Trying to register a mobile transceiver that was previously done may only cause the base to display the ID and close registration. No other action may be taken. The base may be able to perform all normal functions while simultaneously registering a mobile transceiver. Once a mobile transceiver has been registered to a base, it may connect to that base every time it is powered up and then proceed with normal operation without any action by the service person. The mobile transceiver and base may be able to store registration data even with power off. The access code used to identify units allowed to register may be stored in memory of the mobile transceiver and base transceiver 44.

Lane 1 Customer Beep

Lane #1 could be a single lane operation as opposed to the double lane operation as shown in FIG. 1. The customer beep complies with the following parameters with regard to Normal operation.

If selected, the customer present beep may be sent to the ceiling speaker. If de-selected, the customer present beep may not be sent to the ceiling speaker.

If selected, the early warning beep may be sent to the ceiling speaker. If de-selected, the early warning beep may not be sent to the ceiling speaker.

If de-selected, the customer present beep may play only once. If selected, the beep may be set to repeat at periodic intervals until the belt-pac "A" button has been pushed.

If selected, the customer present beep may be enabled to play. If de-selected, the customer present beep may not be enabled to play.

If de-selected, then when the customer is present, the unit may generate the primary customer present beep and send the beep to the mobile transceiver earpiece. If selected, then when the customer is present, the unit may generate the secondary customer present beep and send the beep to the mobile transceiver earpiece. The duration of the customer present beep may be 1 second. When the customer present beep is finished playing, the inbound audio channel to the mobile transceiver earpiece is opened.

Lane 2 Customer Beep

Typically Lane #2 is only used if there is a dual lane application. The customer beep may comply with the following parameters with regard to Normal operation.

A customer present output may be generated, and sent to a second base station for dual lane applications. This output may be active upon customer arrival, and inactive when an A Talk is detected.

If selected, the customer present beep may be sent to the ceiling speaker. If de-selected, the customer present beep may not be sent to the ceiling speaker.

If selected, the early warning beep may be sent to the ceiling speaker. If de-selected, the early warning beep may not be sent to the ceiling speaker.

If de-selected, the customer present beep may play only once. If selected, the beep may be set to repeat at periodic intervals until the mobile transceiver "A" button has been pushed. A customer at the opposite base station may generate the customer beep of the opposite pitch in the first base station, which may repeat, for example, at periodic intervals until the A button is pressed for the opposite system. This beep may be summed in with any audio currently being routed in the first base station 16.

If selected, the customer present beep may be enabled to play. If de-selected, the customer present beep may not be enabled to play.

If de-selected, then when the customer is present, the unit may generate the primary customer present beep and send the beep to the mobile transceiver earpiece. If selected, then when the customer is present, the unit may generate the secondary customer present beep and send the beep to the mobile transceiver earpiece. The duration of the customer present beep may, for example, be 1 second. When the customer present beep is finished playing, the inbound audio channel to the mobile unit earpiece is opened. Each base station may have a distinctly different customer present beep (high/low pitch or/and single/double beep).

In single or dual service point operations, either communication button "A1 or A2" is actuated for communication with the customer, and button "B" may be used for communication with other service persons utilizing mobile transceivers.

Considering full duplex mobile transceiver operation, the base transceiver complies with the following parameters with regard to Full-Duplex operation.

The A Talk signal from the base transceiver may cause the customer to hear the service person's voice and service person hears the customer's voice (two-way conversation). Everyone using a mobile transceiver hears the communication.

The B Talk signal from the base transceiver may cause other personnel using mobile transceivers to hear the voice in their head sets (not shown) only.

Considering now half duplex communicator operation, the base transceiver may comply with the following parameters with regard to half-duplex operation.

The A Talk signal from the base transceiver may cause the customer to hear the service person's voice. Everyone wearing or carrying mobile transceiver hears the communication for a one way conversation.

The A Talk signal from the base transceiver may cause the customer's voice to be heard in head sets of everyone wearing or carrying a mobile transceiver.

The B Talk signal from the transceiver may cause other personnel using mobile transceivers to hear a service person's voice in their head sets in conjunction with "A" audio if present.

Dual Lane

The base station does not recognize the difference between single lane and dual lane. The dual lane configuration generally comprises two base stations, one for each lane. Each base station may be configured for its own A talk. For example, lane #1 base station uses A1 talk and lane #2 base station uses A2 talk. B talk may also split between base stations as B1 and B2 talk. For dual lane "B" audio may be split between bases or summed for a system wide page by means of a setting on the transceiver board.

A1 talk signal from the transceiver may cause the main base station 32 to operate as described above (Full-Duplex/Half-Duplex). The base station 38 may not respond.

The B1 Talk signal from the transceiver may cause base station 32 to operate as described above (Full-Duplex/Half-Duplex). The base station 38 may not respond.

An optional mode switch may be used to prevent the customer present signal being sent between bases in dual lane configuration—dual operators. Service person on lane 1 may not hear customer present tone from lane 2. The converse may also be true.

Customer Detect

The customer detect operation may comply with the following parameters with regard to normal operation. The base station may contain up to two customer detectors. The detect signals are connected to the base CPU. One of these signals may be used to detect the presences of a customer at the service point and is processed by the CPU. The second customer detector may only have a relay output for external connection. The items described below are related only to the primary customer detector.

On the arrival of a customer, the customer detect signal may be sent to the transceiver. On the departure of a customer, the customer detect signal may be discontinued from the transceiver.

Message Repeater

The message repeater may comply with the following parameters with regard to normal operation. If the message switch is set to ON, and a customer arrives, depending on the switch arrangement, one of the two messages could be played, as outlined in "PLAY MESSAGE".

If the message repeater is playing a message at a service point, triggered by customer arrival and the customer departs, the message may stop playing. If the message repeater is playing a message to speakers other than a service point, such as the speaker 18 and a new signal for a message to be played at the service point occurs then the current message may stop playing and the new message may begin playing.

Speed Team Operation

Speed-team operation is used during high-volume times. A service person using the mobile transceiver 51 may relay orders from outside into the merchant building 12 using the "B" button on the mobile unit. Placing the SPEED TEAM switch in the ON (in) position may disable the customer beep and inbound/outbound audio.

The base station enters the speed team operation if selected by the user.

The A1 button may not activate the outside speaker audio channel regardless of the condition of the customer present line. Thus the speaker and microphone in the service point such as a speaker post or a menu board may not be enabled.

The customer present beeps may be disabled.

The means to connect an optional remote ON/OFF switch that can be located away from the base enclosure for easy access may be provided. It operates in parallel with the on-board switch located on the base enclosure.

In customer processing, the customer arrival beep may be ignored. In single or dual service point operations, mobile unit button "A" may be ignored. Mobile unit button "B" is for communication with other service people using mobile transceivers.

Considering full duplex mobile transceiver operation, the mobile unit may comply with the following parameters with regard to full-duplex operation.

The A talk signal from the transceiver may be ignored, while in speed team mode. The B talk signal from the transceiver may cause other personnel using mobile transceivers to hear voice in their head sets.

Considering half duplex mobile transceiver operation, the mobile unit may comply with the following parameters with regard to half-duplex operation. The A talk signal from the transceiver may be ignored, while in the speed team mode. The B talk signal from the transceiver causes other personnel using mobile transceivers to hear voice in their head sets.

Dual Lane

The base station may not recognize the difference between single lane and dual lane. The A1 Talk and A2 Talk signals from the transceiver may be ignored, while in speed team mode.

The B Talk signal from the transceiver may cause the base station to operate as described above (Full-Duplex/Half-Duplex). The other base station may not respond.

The message repeater may comply with the following parameters with regard to speed team operation. Messages may not be played at outside speaker while in speed team mode.

Messages may be able to be played at transceiver headset and grill speaker while in the speed team mode (trigger message from alert signal).

The built in message repeater may be used to issue a consistent message to the outside customer, grill speaker or mobile transceiver earpiece. The message repeater may store up to two different messages. A message may first be recorded using the B channel from the mobile transceiver microphone. The message repeater Idle state for record is the same message repeater Idle state for play messages.

The message repeater may comply with the following parameters with regard to the base. Each message may be able to be enabled/disabled externally by user. Refer to FIG. 34

Each message may be able to be routed to the service point, Grill speaker and the mobile transceiver.

Two messages may be able to be played sequentially. The service point takes priority over the other locations.

Messages may be able to be recorded from the mobile transceiver "B" channel.

When a message has completed, the base station may provide a short tone to notify the service person. Inbound audio may not be muted when tone is played. An ON/OFF control that can be changed by the manager may be provided for the end-of-message tone Each message may have a separate trigger input. Activation of both messages may be possible from a single trigger.

Pressing the "A" button after customer detection may terminate the message repeater output to the service point.

The base station may have a connection that allows a remote record button to be located away from the base enclosure for easy access. It may operate in parallel with the on-board record button located on the base enclosure.

Recording Messages

Recording Messages may comply with the following parameters with regard to the base station. The message repeater may be enabled when either the red message or green message switches are ON and Record is pressed and released (FIGS. 34 and 35).

In the record messages idle mode, the RECORD LED may be OFF. If Record is pressed and released, system settings may be initialized for recording messages, then the ready for red message mode may be entered.

In ready for red message mode and pre-ready for green message mode, the RED LED may be ON. If B Talk is received from a mobile transceiver, system enters record red message mode. If Record is pressed and released again, system may enter the ready for green message mode. If (A Talk is received from mobile transceiver, or time in this mode is beyond MAX_TIME) system may enter Idle mode.

In recording red message mode, the RED RECORD LED may blink. If the message duration is exceeded during record, the RECORD light may stay on solid from the end of the message time, until the B button is released. If (A Talk is received from Communicator) system may enter Idle mode. When no longer receiving B Talk from a mobile transceiver, the system may save the voice message and enter Idle mode.

In ready for green message mode and pre-record presses mode. The GRN LED may be ON. If B Talk is received from mobile transceiver, the system 10 may enter Record green message Mode. If Record is pressed again (third time), enter Wait Before Exit mode. If (A_Talk is received from Communicator, or time in this mode is beyond MAX_TIME) system may enter Idle mode.

Recording green message mode. the GRN RECORD LED may blink. If the message duration is exceeded during record, the RECORD light may stay on solid from the end of the message time, until the B button is released. If (A_Talk is received from a mobile transceiver) system may enter the Idle mode. When no longer receiving B_Talk from a mobile transceiver, the system may save the voice message and enter Idle mode.

In wait before exit mode, the Record button may have been pressed 3 times, for example: The LED may now be OFF. After the release of the RECORD button, the Idle mode.

Play Message

Playing Messages may comply with the following parameters and state diagram in FIGS. 33 and 34 with regard to the base station.

The message repeater may be enabled to play one of two messages when either the red message or green message switches are ON, and a customer present or alert signal event triggers the system 10 into play mode. The description of the states is found in the play state diagram of FIGS. 33 and 34.

Red message control switch (1-4) may specify which gates may be enabled during the playing of red message. If routing switches are all OFF, then red message may be disabled. Green message control switch (1-4) specifies which gates may be enabled during the playing of green message. If routing switches are all OFF, then green message may be disabled.

The message repeater may play a message due to a "customer arrival" and red message enabled for "customer arrival" or green message enabled for "customer arrival". If both red message and green message are enabled for "customer arrival", then message playback may be toggled between red message and green message. The message repeater may play a message due to an "alert signal" and red message enabled for "alert signal" or green message enabled for "alert signal." If both red message and green message are enabled for "alert signal", then message playback may be toggled between red message and green message.

A message to the service point may have the highest priority. If a message is playing and not going to the service point, and another message arrives which is going to the service point, the first message may stop and start the message to the service point.

If selected the system 10 may allow inbound audio during the red message.

If selected, red message may be played to the mobile transceiver earpiece.

If selected, red message may be played to the service point.

If selected, red message may be played to the ceiling speaker.

If selected, red message may be activated by the customer present signal.

If selected, red message may be activated by the alert signal.

If selected the system 10 may allow inbound audio during the green message.

If selected, green message may be played to the mobile transceiver earpiece.

If selected, green message may be played to the service point.

If selected, green message may be played to the ceiling speaker.

If selected, green message may be activated by the customer present signal.

If selected, green message may be activated by the alert signal.

After a new message has been recorded, or after the base station has lost and regained power, the message may always be heard in the mobile transceiver head set the first three times the message plays.

Voice Activated Attenuator

The audio board incorporates a voice activated attenuator (VAA). The VAA may comply with the following parameters with regard to the base station.

If selected, the VAA may sample the service point speaker volume and reduce the inbound audio volume to help prevent or at least to reduce feedback and outbound audio from over driving the inbound audio amplifiers.

Automatic Volume Control

The audio board incorporates an automatic volume control (AVC). The AVC may comply with the following parameters with regard to the base station. The AVC may provide the automatic volume control of outbound audio to the service point speaker to aide in noise abatement.

AVC internal ON/OFF control may be provided. Noise cancellation may be incorporated on the audio board.

If selected, the noise cancellation may be on. The base station may provide the ability to physically bypass the canceller.

The selection switches in combination may provide the ability to change the noise reduction level from maximum to minimum.

Base Audio Main Board Indicators

The light emitting diodes (LED) may comply with the following parameters with regard to the audio board. An LED may be provided for the 12 VDC. An LED may be in the on state when power is on.

An LED may be provided for main 22VDC. The LED may be on when the base power is on. An LED for the "A" Talk may be provided and may be on when the A Talk signal is output from the base transceiver board.

An LED may be provided for the "B" Talk and may be on when the B Talk signal is output from the base transceiver board. An LED may be provided for the customer present and may be on when an optional internal or external customer detector signal is present.

An LED may be provided for the message record and may be normally OFF. When the unit is ready to record red message, the LED may be on with the color RED in the steady state. When the unit is recording red message, the LED may be flashing RED. When the unit is ready to record green message, the LED may be on with the color GREEN in the steady state. When the unit is recording green message, the LED may be flashing GREEN.

An LED may be provided for the heartbeat. The LED may blink about twice every second.

An LED may be provided for the 5 VDC. The LED may be in the on state when power is on.

An LED may be provided for the 5 V transceiver voltage. The LED may be in the on state when power is on.

Configuration

The base main audio board user switches may comply with the following parameters with regard to the audio board.

A switch is provided to enable the voice activated attenuator (VAA). When the switch is in the ON position, VAA may be on. When the switch is in the OFF position, VAA may be off.

A switch may be provided to enable noise cancellation. When the switch is in the ON position, the noise cancellation may be on. When the switch is in the OFF position, the noise cancellation may be off.

A switch or switches may be provided to select the amount of noise cancellation.

A switch may be provided to enable full duplex. When the switch is in the ON position, the unit may be in full duplex. When the switch is OFF, the unit may be in half duplex.

A switch may be provided to enable "A" at the ceiling speaker. When switch is ON audio is conducted to the ceiling speaker.

A switch may be provided to enable "B" at the ceiling speaker. When switch is ON audio is conducted to the ceiling speaker. Another switch enables Inbound at the ceiling speaker. When switch is ON audio is conducted to the ceiling speaker.

A switch may be provided to enable customer present beep at the ceiling speaker. If ON, the customer present beep may be sent to the ceiling speaker. If OFF, the customer present beep may not be sent to the ceiling speaker.

A switch may be provided to enable early warning at the ceiling speaker. If ON, the early warning beep may be sent to the ceiling speaker. If OFF, the early warning beep may not be sent to the ceiling speaker.

A switch may be provided to enable reminder beep. If OFF, the customer present beep may play only once. If ON the beep may repeat at periodic intervals until the mobile transceiver "A" button has been pushed. A customer at the opposite base station may generate the customer beep of the opposite pitch in the first base station, which may repeat at periodic intervals until the A button is pressed for the opposite system. This beep may be summed in with any audio currently being routed in the base station 32.

A switch may be provided to enable customer present beep. If ON, the customer present beep may be enabled to play. If OFF, the customer present beep may not be enabled to play.

A switch may be provided to enable inbound audio while red message is playing. When enabled, the inbound audio may be allowed during red message playback. Alternatively, if OFF the inbound audio may not be allowed during red message playback.

A switch may be provided to enable red message transmission to transceiver. If ON, then red message may transmit to mobile transceiver when playing. If OFF, then red message may not sent to transceiver when playing.

A switch may be provided to enable red message transmission to service point speaker. If ON, then red message may transmit to service point speaker, such as speaker 18 when playing. If OFF, then red message may not play to service point speaker when playing.

A switch may be provided to enable red message transmission to ceiling speaker. If ON, then red message may transmit to Ceiling Speaker when playing. If OFF, then red message may not transmit to Ceiling Speaker when playing.

A switch may be provided to select the event that would trigger the playing of red message. If ON, then the alert signal may activate red message. If OFF, then the customer present may activate red message. For a complete description of the requirements, which trigger red message, refer to MESSAGE REPEATER.

A switch may be provided to enable inbound audio while green message is playing. When enabled the inbound audio may be allowed during green message playback. Alternatively, the inbound audio may not be allowed during green message playback.

A switch may be provided to enable green message to be sent to transceiver. If ON, then green message may be sent to transceiver when playing. If OFF, then green message may not be sent to when playing.

A switch may be provided to enable green message transmission to service point speaker. If ON, then green message may transmit to service point speaker when playing. If OFF, then green message may not transmit to service point speaker when playing.

A switch may be provided to enable green message transmission to ceiling speaker. If ON, then green message may transmit to ceiling speaker when playing. If OFF, then green message may not transmit to ceiling speaker when playing.

A switch may be provided to select the event that would trigger the playing of green message. If ON, then the alert signal may activate green message. If OFF, then the customer present may activate green message.

A switch may be provided to delay playing messages. If ON, then there may be a pre-defined delay before playing red message and before playing green message. If OFF, then a different pre-defined delay may be used before playing red message and green message.

A switch may be provided to enable beep swap. If OFF, then when the customer is present, the unit may generate the primary customer present beep and send the beep to the transceiver. If ON, then when the customer is present, the unit may generate the secondary customer present beep and send the beep to the transceiver. The duration of the customer present beep may be 1 second. When the customer present beep is finished playing, the inbound audio channel to the transceiver is opened.

Each base station may have a distinctly different customer present beep (high/low pitch or/and single/double beep).

Base Transceiver Board

The switches may comply with the following parameters with regard to the base transceiver board. A push-button momentary switch may be provided for reset. If the switch is pressed the unit may read any switches and re-establish connections.

A switch may be provided to select single or dual lane mode. A switch may be provided to select B1/B2 split mode or combine mode. A switch may be provided to select whether Auto uplink override is enabled. A switch may be provided to Start Registration and another to Clear All Registration.

Figure 8:
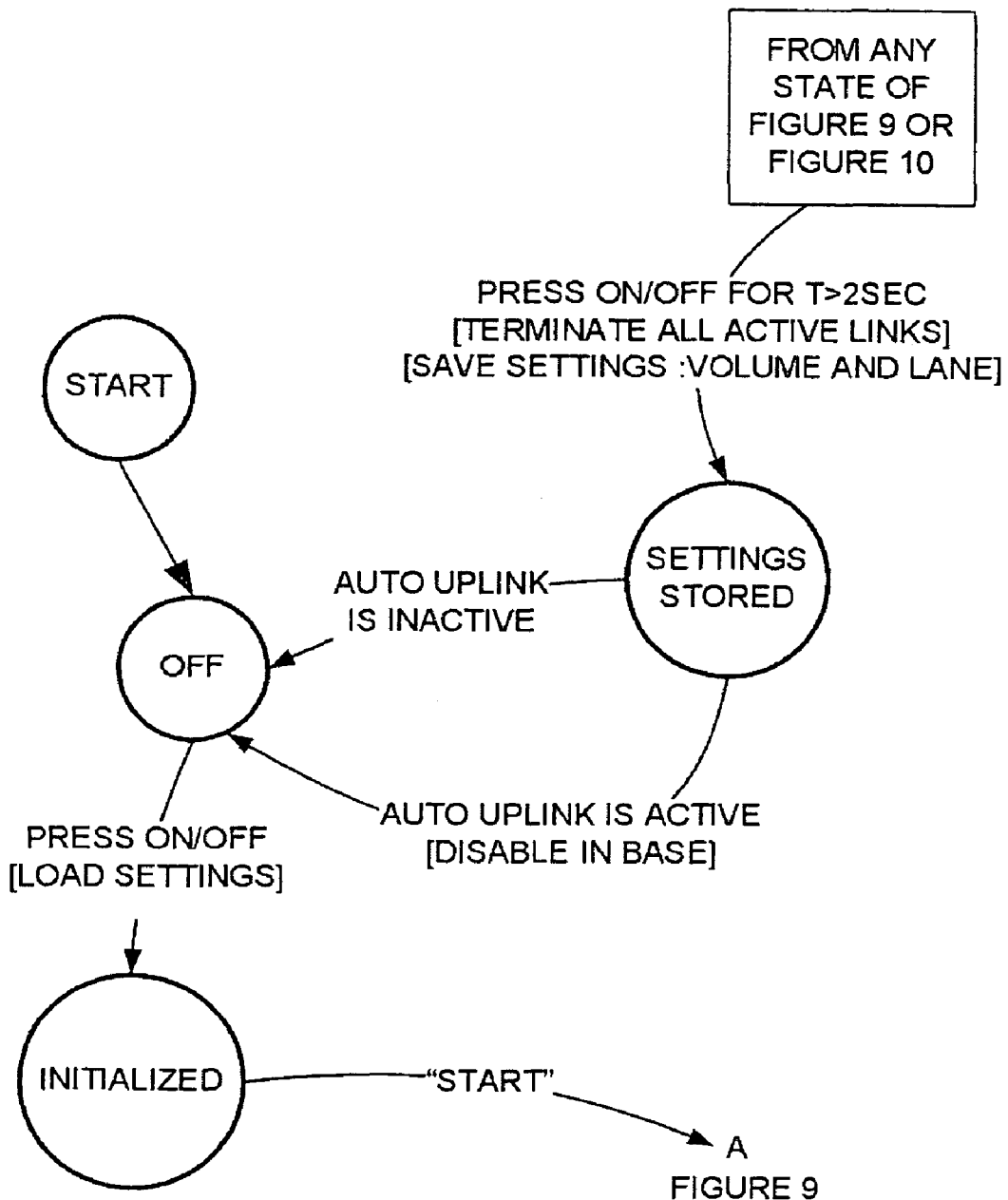
FIGS. 8, 9 and 10 are state diagrams illustrating various operations of the mobile transceivers of FIG. 4 in dual lane mode.
Figure 9:
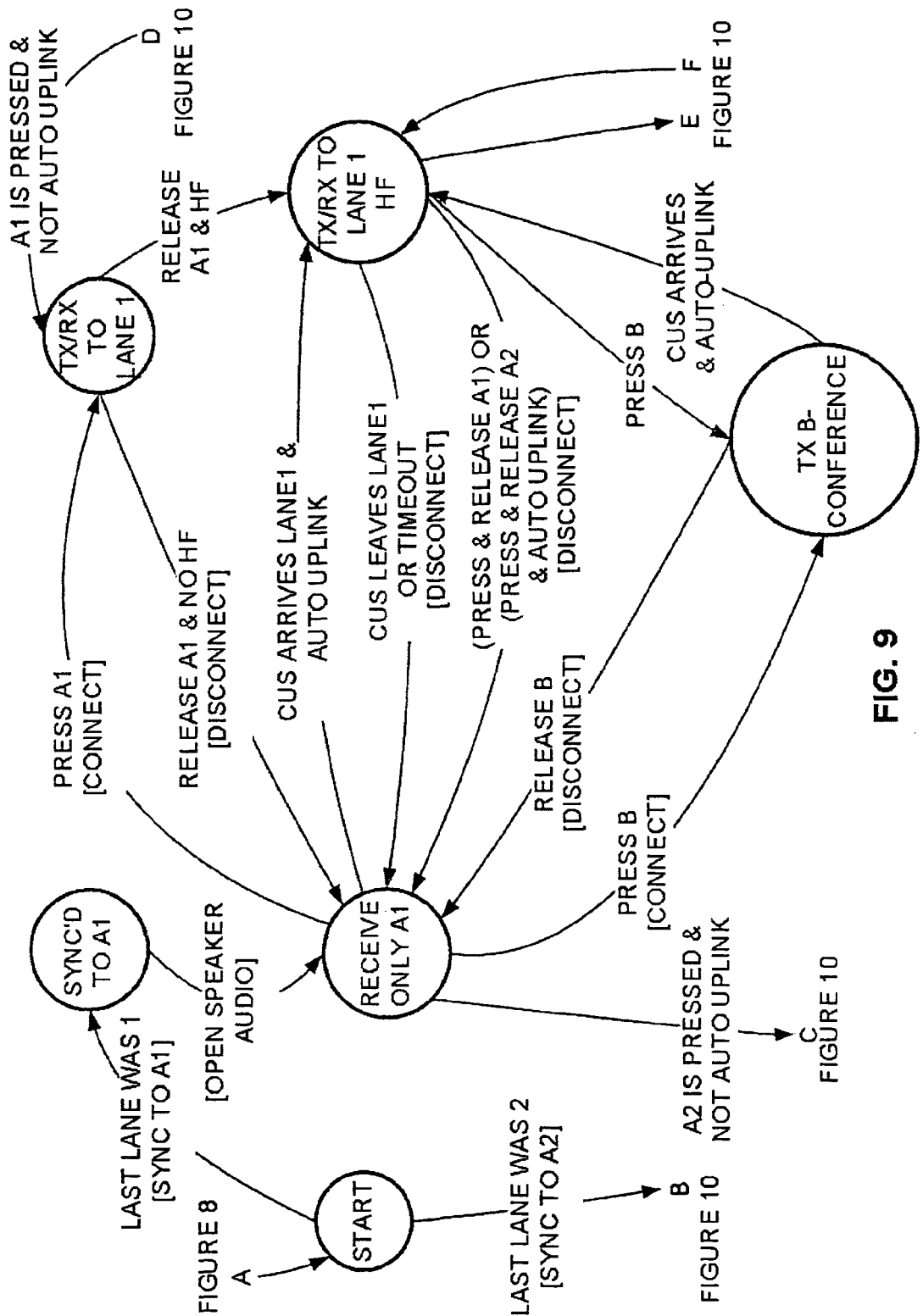
Figure 10:
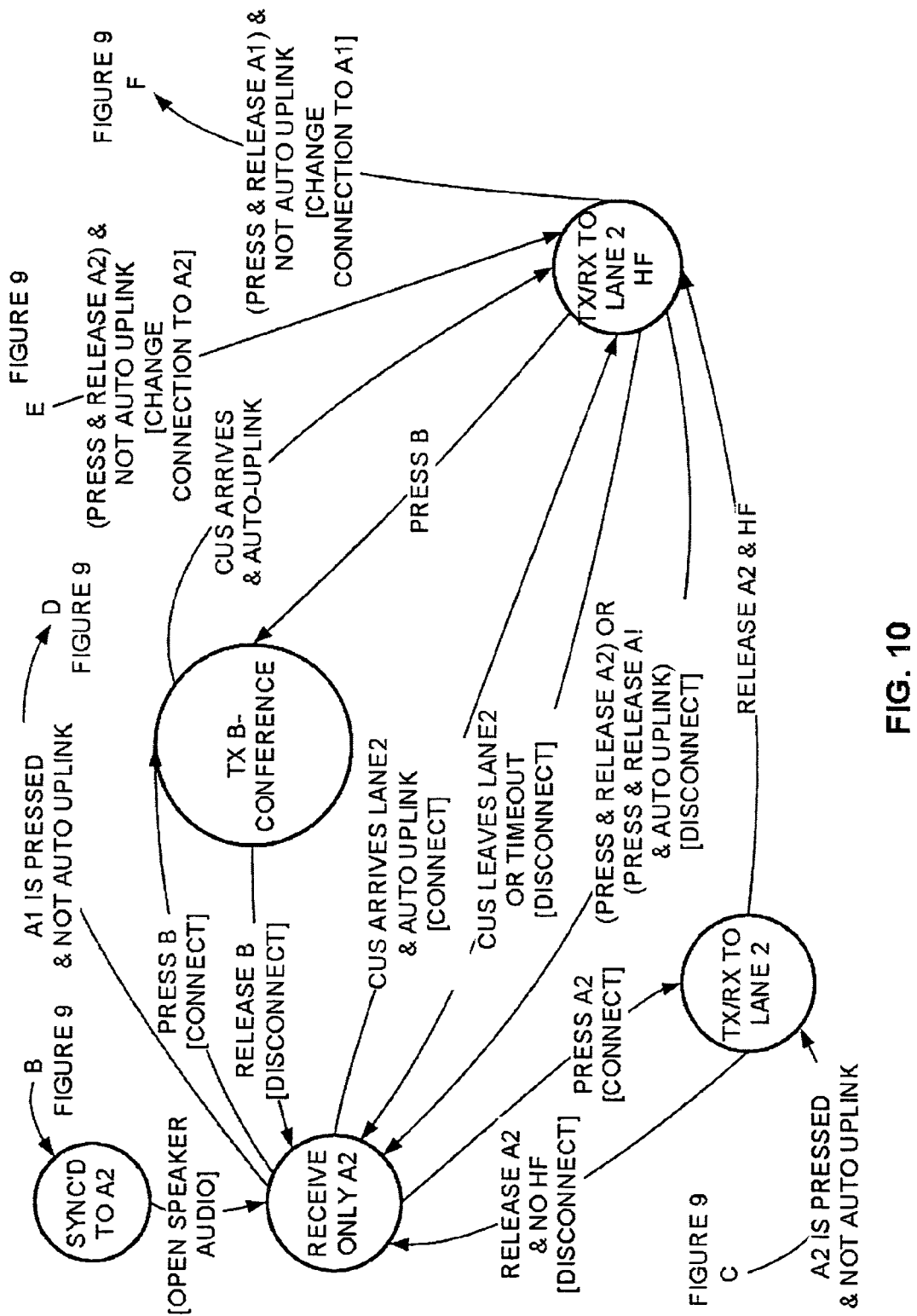
Figure 36:
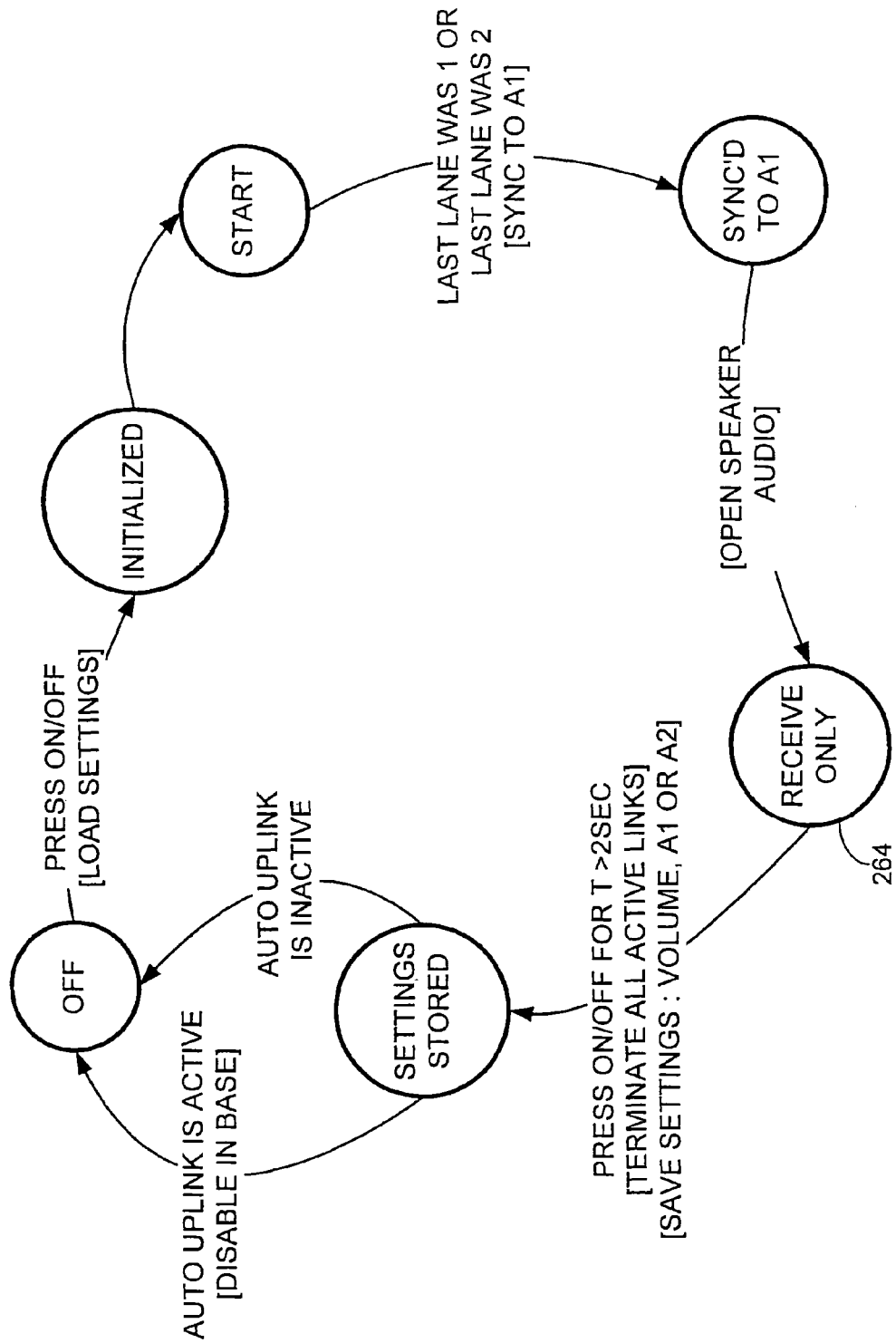
FIGS. 36 and 37 are state diagrams illustrating various operations of the mobile transceivers in single lane mode.
Figure 37:
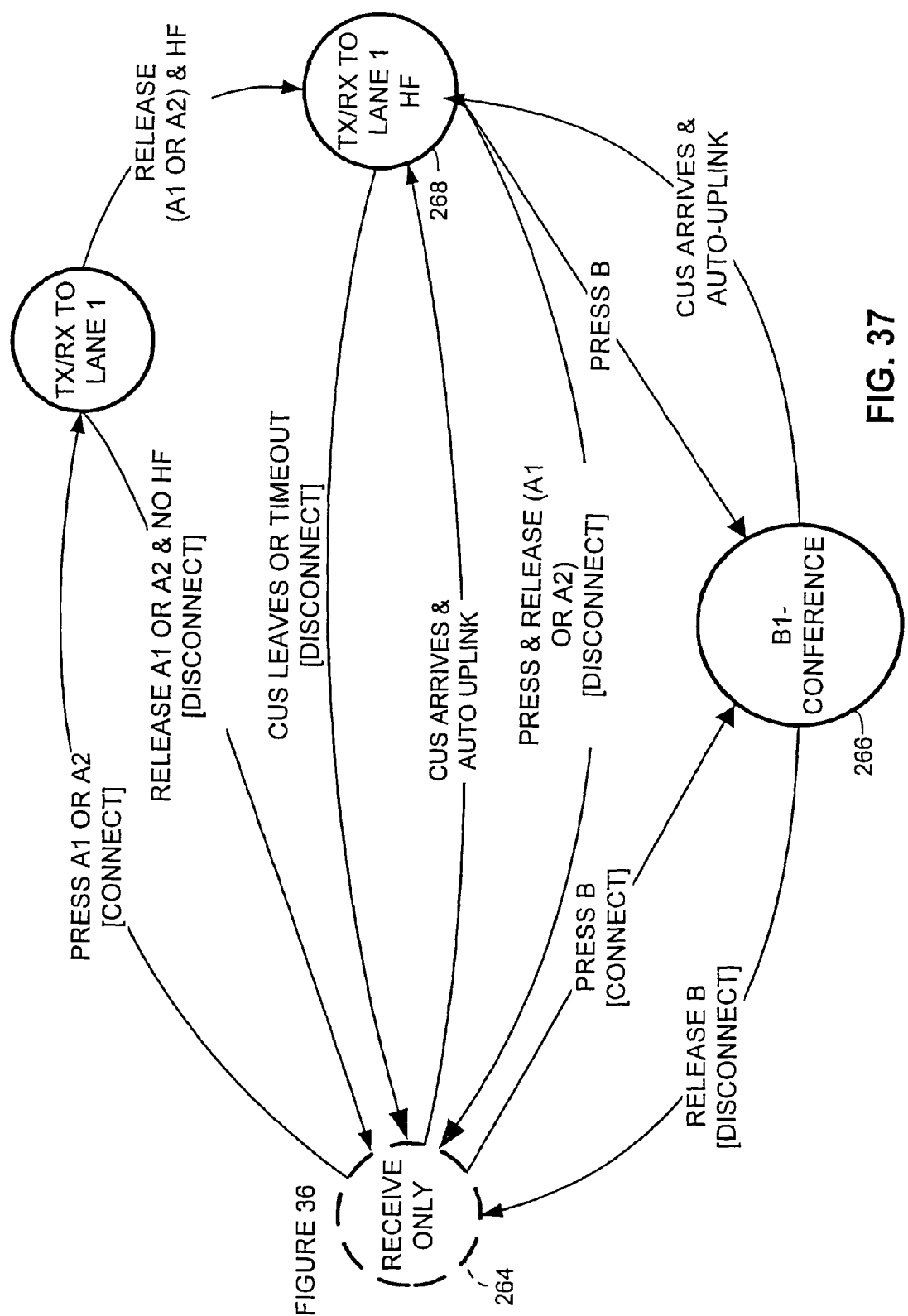

Referring now to FIGS. 36 and 37, there is shown a single lane mobile transceiver operation state diagram, which is similar to the state diagram of FIGS. 8, 9 and 10 for a dual lane mobile transceiver operation. These diagrams of FIGS. 36 and 37 illustrate various operations of mobile transceivers for a single lane system, with the base station operating in a single lane mode of operation.

From a receive only state 264, a series of states are entered in FIG. 36 in response to pressing the ON/OFF button of a mobile transceiver. Alternatively, from the state 264, a series of states are transitioned to in FIG. 37 in response to pressing button A1, A2 or B.

In FIG. 37, a transition occurs when pressing B. At state 266 (FIG. 37), a conference on the B1 channel may take place. When car arrives at the service point and an auto uplink is established, a transition to a state 268 occurs where transmitting and receiving audio occurs. When the B button is released while in state 266, a transition occurs to the receive only state 264.

While in the transmit/receive state 268, a transition can occur to the receive only state 264 when a customer leaves the service point or otherwise a time out occurs.

While the present embodiments of the invention is disclosed herein have been particularly shown and described with reference to particular embodiments thereof, it will be understood by those skilled in the art that various changes and forms and details may be made therein without departing from the true spirit and scope of the present invention.

What is claimed is:

1. A drive-up quick service establishment communication system for use by a merchant facility having a building and an external adjacent service lane outside of the building to provide communication among a customer located at the service lane and at least four service personnel located within the building, at least one of the service personnel can be an order taker, comprising:

a single base station disposed within the building;

at least four mobile transceivers disposed within the building for use by the service personnel, sharing a single radio link with the base station to simultaneously communicate in a wireless, digital, full-duplex voice communication manner with each other and with the customer in the service lane;

a service point disposed at the service lane and coupled to the base station for communicating with the mobile transceivers to enable audio communication between the customer in the service lane and the service personnel in the building;

the base station including a single transceiver for providing full-duplex voice communication with the mobile transceivers in a simultaneous full duplex mode of operation using TDMA and a number of transmit/receive time slots;

wherein the base station manages the time slots and routes and combines voice messages to provide a full-duplex party line intercom or full-duplex private line communications or both with the mobile transceivers or between mobile transceivers;

at least one mobile transceiver being capable of initiating a voice transmission during a time slot assigned by the base station upon request of the at least one mobile transceiver on a transmit time to the base station transceiver on a single frequency shared with all mobile transceivers;

wherein the base station routes and combines the voice signal from the at least one mobile transceiver for retransmission to all other mobile transceivers or a specific transceiver selectively;

one or more of the mobile transceivers used for order taking purposes being capable of full-duplex voice communication with the customer and with the other mobile transceivers;

each of the mobile transceivers of the service personnel being capable of serving as an order taking transceiver to communicate with the customer via the service point, and alternatively being capable of receiving voice messages only for listening in full-duplex to the voice communication between order taking transceivers and the service point;

wherein the radio link is a full-duplex time division duplex arrangement; and whereby the base station provides selectively a first full-duplex channel of pa line communication between the service the mobile transceivers and a second full-duplex channel of party line communication between the mobile transceivers only to the exclusion of the service point.

2. The system of claim 1, wherein a time slot of the TDMA arrangement is allocated for broadcast of mixed audio information obtained from all transmitting mobile transceivers.

3. The system of claim 1, wherein the same information is transmitted during two separate TDMA time slots, and at two different frequencies and received and a determination made as to the most reliable information of the two time slots.

4. The system of claim 1, wherein the radio link arrangement is frequency hopping spread-spectrum and TDD communication between the base station and the mobile transceivers.

5. The system of claim 1, wherein the base station causes a selection of a mobile transceiver and causes the making of a full duplex connection with any one other mobile transceiver to establish a private communication isolated from other communication sinks.

6. The system of claim 5, wherein the initiating mobile transceiver controls the communication link such that the initiating mobile transceiver can disconnect the communication link at any time.

7. The system of claim 5, wherein either the initiating mobile transceiver or the selected mobile transceiver can disconnect the communication link at any time.

8. The system of claim 1, wherein the base station causes routing of audio from any mobile transceiver to a secondary speaker at a remote location and electrically coupled to the base station.

9. The system of claim 1, further including an external device coupled to the base station for generating audio messages and transmitting said audio messages to the base station; and further including means for audio routing and control functions transacted between said external device and the base station for use within the base station and transmission to the mobile transceivers; and means for receiving controls and status from mobile transceivers transacted between the base station and the external device.

10. The system of claim 1, wherein analog voice signals or digital data or both are communicated between the base station and at least one mobile transceiver.

11. The system of claim 9, wherein the external device, is a computer for providing said digital data.

12. The system of claim 9, further including means for providing said digital data.

13. The system of claim 1, wherein at least one mobile transceiver is connected as receive only to the base station and receives all other communications as a group broadcast.

14. The system of claim 13, wherein said at least one mobile transceiver can also connect full duplex for transmission to the base station or to other mobile transceiver or both.

15. The system of claim 1, wherein all communications are encrypted to prevent unauthorized communications.

16. The system of claim 1, wherein the mobile transceivers provide audible voice messages to give status to a mobile transceiver service person.

17. The system of claim 1, wherein the base station includes at least two antennas mounted apart for purposes of receiving and transmitting and wherein the base station makes a decision as to which antenna to use based on signal strength at the beginning a receive time slot.

18. The system of claim 1, wherein the mobile transceivers include at least two antennas for purposes of receiving and transmitting that are mounted apart from one another wherein the mobile transceiver decides which antenna to use based on signal strength at the beginning a receive time slot.

19. A drive-up quick service establishment communication system for use by a merchant facility having a building and an external adjacent service lane outside of the building to provide communication among a customer located at the service lane and service personnel located within the building, at least one of the service personnel can be an order taker, comprising:
  a single base station disposed within the building;
  a service point disposed at the service lane and coupled to the base station;
  a group of mobile transceivers disposed within the building for use by the service personnel, sharing a single radio link with the base station to simultaneously communicate in a wireless, digital, full-duplex voice communication manner with each other;
  the base station including a single transceiver for providing voice communication with the group of mobile transceivers in a simultaneous full duplex mode of operation using TDMA and a number of transmit/receive time slots;
  wherein the base station manages the time slots and routes and combines voice messages to provide a party line intercom or private line communications or both with the group of mobile transceivers or between mobile transceivers;
  one or more mobile transceiver being capable of initiating a voice transmission during a time slot assigned by the base station upon request of the at least one mobile transceiver on a transmit time to the base station transceiver on a single frequency shared with all mobile transceivers;
  wherein the base station routes and combines the voice signal from the at least one mobile transceiver for retransmission to all other mobile transceivers or a specific transceiver selectively;
  at least one of the mobile transceivers used for order taking purposes being capable of full-duplex voice communication with the customer and with the other mobile transceivers;
  each of the mobile transceivers of the service personnel being capable of serving as an order taking transceiver to enable full-duplex audio communication with the customer via the service point, and alternatively being capable of receiving full-duplex voice messages only for listening to the voice communication between order taking transceivers and the service point; and
  wherein the service point includes a speaker and a microphone disposed physically at a remote location and connected to the base station for purposes of communicating with the customer; and
  whereby the base station provides selectively a first full-duplex channel of line communication between the service point and the mobile transceivers and a second full-duplex channel of party line communication between the mobile transceivers only to the exclusion of the service point.

20. The system of claim 19, wherein a time slot of said TDMA method is allocated for broadcast of mixed audio information obtained from the remote microphone location and all transmitting mobile transceivers.

21. The system of claim 19, wherein the radio link is frequency hopping spread-spectrum and TDD communication between the base station and the group of mobile transceivers.

22. The system of claim 19, wherein the base station routes communication between a mobile transceiver, all other mobile transceivers, and the speaker and microphone coupled to the base station.

23. The system of claim 19, wherein the base station causes communication to be routed between a mobile transceiver and all other mobile transceivers in the second channel while excluding the speaker and microphone coupled to the base station.

24. The system of claim 19, further including a secondary speaker, and wherein the base station causes the audio to be routed from the microphone coupled to the base station and/or audio received from any mobile transceiver to a secondary speaker at a remote location and electrically coupled to the base station.

25. The system of claim 19, further including a secondary speaker, and wherein the base station causes the presence of a customer to be detected at a service point so that when detected, the base station opens a broadcast communication connection and routes audio to the mobile transceivers and a secondary speaker or both, when appropriately enabled.

26. The system of claim 25, wherein communication between the service point speaker and microphone has priority over other communications, and the base station terminates other mobile transceiver communications as necessary to allow communication with at least one mobile transceiver.

27. The system of claim 25, wherein in response to customer presence detection, communication between the service point speaker and microphone can be routed by the base station to at least one mobile transceiver without the need for the service person at the mobile transceiver to take any physical action in order to respond; and, when the customer is no longer detected, the connection to the mobile transceiver automatically returns to the standby "listen" condition without any physical intervention of the mobile transceiver service person.

28. The system of claim 25, wherein the customer presence detection generates a logic signal that is available to be used for other unspecified purposes external to the base station.

29. A drive-up quick service establishment communication system for use by a merchant facility having a building and at least two external adjacent service lanes outside of the building to provide communication among customers located at the service lanes and service personnel located within the building, at least one of the service personnel can be an order taker, comprising:
- a single base station disposed within the building;
- a first service point disposed at one of the service lanes and coupled to the base station to enable full-duplex audio communication between a customer in the one of the service lanes and the service personnel in the building;
- a second service point disposed at another of the service lanes and coupled to the base station to enable full-duplex audio communication between another customer in the another of the service lanes and the service personnel in the building;
- a group of mobile transceivers disposed within the building for use by the service personnel, sharing a single radio link with the base station to simultaneously communicate in a wireless, digital, full-duplex voice communication manner with each other;
- the base station including a single transceiver for providing voice communication with the group of mobile transceivers in a simultaneous full duplex mode of operation using TDMA and a number of transmit/receive time slots;
- wherein the base station manages the time slots and routes and combines full-duplex voice messages to provide a party line intercom or private line communications or both with the group of mobile transceivers or between mobile transceivers;
- at least one mobile transceiver being capable of initiating a full-duplex voice transmission during a time slot assigned by the base station upon request of the at least one mobile transceiver on a transmit time to the base station transceiver on a single frequency shared with all mobile transceivers;
- wherein the base station routes and combines the full-duplex voice signal from the at least one mobile transceiver for retransmission to all other mobile transceivers or a specific transceiver selectively;
- at least one of the mobile transceivers used for order taking purposes being capable of full-duplex voice communication with at least one of the customers and with the other mobile transceivers;
- each of the mobile transceivers of the service personnel being capable of serving as an order taking transceiver to communicate with the customers at the services points, and alternatively being capable of receiving voice messages only for listening to the full-duplex voice communication between order taking transceivers and the service points; and
- wherein the first service point includes a first speaker and a first microphone disposed physically at a remote location and connected to the base station for purposes of communicating with the first service point;
- wherein the second service point includes a second speaker and a second microphone disposed physically at another remote location and connected to the base station for purposes of communicating with the second service point; and
- whereby the base station provides selectively a first full-duplex channel of party line communication between the service point and the mobile transceivers and a second full-duplex channel of party line communication between the mobile transceivers only to the exclusion of the service point.

30. The system of claim 29, wherein a time slot of said TDMA method is allocated for broadcast of mixed audio information obtained from the first remote microphone location and all transmitting mobile transceivers, and a second time slot of said TDMA method is allocated for broadcast of mixed audio information obtained from the second remote microphone location and all transmitting mobile transceivers.

31. The system of claim 29, wherein the radio link is frequency hopping spread-spectrum and TDD communication between the base station and the group of mobile transceivers.

32. The system of claim 29, wherein the base station causes the detection of the presence of a customer at the first service point so that when detected, the base station opens a first broadcast communication connection and routes audio from the first service point to the mobile transceivers assigned;
- and wherein the base station causes the detection of the presence of a customer at the second service point so that when detected, the base station connects a second broadcast communication link and routes audio from the second service point to the mobile transceivers assigned to the second service point.

33. The system of claim 32, further including first and second speakers, and wherein the base station routes audio from the first and second service points to the mobile transceivers assigned and respective first and second speakers, or both of them, when enabled.

34. The system of claim 32, further including a slave base station.

35. The system of claim 32, wherein communication between the speaker and microphone from each service point has priority over other communications and the base station terminates other mobile transceiver communications as necessary to allow communication of each service point with at least one mobile transceiver.

36. The system of claim 32, wherein in response to customer presence detection at the first service point, communication between the first speaker and first microphone can be routed by the base station to at least one mobile transceiver without the need for the service person at the mobile transceiver to take any physical action in order to respond; and, when the customer is no longer detected, the connection to the mobile transceiver automatically returns to the standby "listen" condition without any physical intervention of the mobile transceiver service person.

37. The system and method of claim 32, wherein the customer presence detection from either or both service points generates a logic signal that is available to be used for other unspecified purposes external to the base station.

38. The system and method of claim 32, wherein in response to a customer presence detection at the second service point, communication between the second service point speaker and microphone can be routed by the base station to at least one mobile transceiver without the need for the service person at the mobile transceiver to take any physical action in order to respond;
- and, when the customer is no longer detected, the connection to the mobile transceiver automatically returns to the standby "listen" condition without any physical intervention of the portable terminal user.

39. The system and method of claim 29, wherein mobile transceiver service persons communicating with the first service point are isolated from mobile transceivers communicating with the second service point.

40. The system of claim 29, wherein mobile transceivers enable a mobile transceiver service person to connect with either one of the two service points, and to switch between the two different service point connection communication links.

41. The system of claim 34, wherein the first mentioned base station causes communications to be routed between a mobile transceiver communicating with the first service point and all other mobile transceivers excluding the first service point; and, the slave base station causes communications to be routed between a mobile transceiver communicating with the second service point and all other mobile transceivers excluding the second service point.

42. The system of claim 34, wherein the first mentioned base station causes communications to be routed between a mobile transceiver communicating with the first service point and only the other mobile transceivers that are in communication with the first mentioned base station and excluding the first service point; and, the slave base station causes communications to be routed between a mobile transceiver communicating with the second service point and only the other mobile transceivers that are in communication with the slave base station and excluding the second service point.

43. The system of claim 34 wherein the first mentioned and slave base stations provide communication links to the respective first and second service points.

44. The system of claim 29, wherein the radio is direct-sequence spread-spectrum and TDD communication between the base station and the group of mobile transceivers.

45. The system of claim 19, wherein the radio link is a direct-sequence spread-spectrum and TDD communication between the base station and the group of mobile transceivers.

46. The system of claim 29, wherein the radio link is a direct-sequence spread-spectrum and TDD communication between the base station and the group of mobile transceivers.

47. The system of claim 29, further including a slave base station, and wherein the first-mentioned and the slave base stations share the single transceiver for communicating with the mobile transceivers.

48. A drive-up quick service establishment communication method for use by a merchant facility having a building and an external adjacent service lane outside of the building to provide communication among a customer located at the service lane and service personnel located within the building, at least one of the service personnel can be an order taker, comprising:

establishing a service point communication link between a service point disposed at the service lane and a single base station disposed within the building;

establishing a wireless communication link between the base station and a service person using a mobile transceiver to link with the service point communication link to enable the service point and the service person to communicate in an audio full-duplex manner for initiating a transaction;

establishing a wireless full-duplex communication link between the base station and another service person using another mobile transceiver to link with the communication link between the service point and the other service person so that both service people and the service point can communicate in an audio manner with one another simultaneously, wherein the base station includes a single transceiver for providing voice communication with the mobile transceivers in a simultaneous full-duplex mode of operation using TDMA and a number of transmit/receive time slots;

wherein the base station manages the time slots and routes and combines voice messages to provide a party line intercom or private line communications or both with the group of mobile transceivers or between mobile transceivers;

wherein at least one mobile transceiver is capable of initiating a full-duplex voice transmission during a time slot assigned by the base station upon request of the at least one mobile transceiver on a transmit time to the base station transceiver on a single frequency shared with all mobile transceivers;

wherein the base station routes and combines the full-duplex voice signal from the at least one mobile transceiver for retransmission to all other mobile transceivers or a specific transceiver selectively;

at least one of the mobile transceivers used for order taking purposes being capable of full-duplex voice communication with the customer and with the other mobile transceivers;

each of the mobile transceivers of the service personnel being capable of serving as an order taking transceiver to communicate in full-duplex with the customer via the service point, and alternatively being capable of receiving voice messages only in full-duplex for listening to the voice communication between order taking transceivers and the service point;

wherein the radio link is a time division duplex arrangement; and whereby the base station provides selectively a first full-duplex channel of party line communication between the service point and the mobile transceivers, and a second full-duplex channel of party line communication between the mobile transceivers only to the exclusion of the service point.

49. A drive-up quick service establishment communication method for use by a merchant facility having a building and an external adjacent service lane outside the building to provide communication among a customer located at the service lane and service personnel located within the building, at least one of the service personnel can be an order taker, comprising:

establishing an service point full-duplex communication link between a service point disposed at the service lane and a single base station disposed within the building;

establishing a wireless full-duplex communication link between the base station and a service person using a mobile transceiver to link with the service point communication link to enable the service point and the service person to communicate in an audio manner for initiating a transaction;

establishing a full-duplex wireless communication link between the base station and another service person using another mobile transceiver to enable said another service person to broadcast an audio communication to other service persons independently of the communication between the service point and the service person;

establishing full-duplex broadcast communication links between the base station and other service person mobile transceivers to enable said other service person to communicate in an audio manner simultaneously with the other service persons, wherein the base station includes a single transceiver for providing voice communication with the mobile transceivers in a simultaneous full duplex mode of operation using TDMA and a number of transmit/receive time slots;

wherein the base station manages the time slots and routes and combines full-duplex voice messages to provide a party line intercom or private line communications or both with the group of mobile transceivers or between mobile transceivers;

wherein at least one mobile transceiver is capable of initiating a full-duplex voice transmission during a time slot assigned by the base station upon request of the at least one mobile transceiver on a transmit time to the base station transceiver on a single frequency shared with all mobile transceivers;

wherein the base station routes and combines the full-duplex voice signal from the at least one mobile transceiver for retransmission to all other mobile transceivers or a specific transceiver selectively;

at least one of the mobile transceivers used for order taking purposes being capable of full-duplex, voice communication with the customer and with the other mobile transceivers;

each of the mobile transceivers of the service personnel being capable of serving as an order taking transceiver to communicate in full-duplex with the customer via the service point, and alternatively being capable of receiving voice messages only for listening to the full-duplex voice communication between order taking transceivers and the service point;

wherein the radio link is a time division duplex arrangement; and whereby the base station provides selectively a first full-duplex channel of party between the service point and the mobile transceivers, and a second full-duplex channel of party line communication between the mobile transceivers only to the exclusion of the service point.

50. A drive-up quick service establishment communication method for use by a merchant facility having a building and an external adjacent service lane outside of the building to provide communication among a customer located at the service lane and service personnel located within the building, at least one of the service personnel can be an order taker, comprising:

establishing a service point full-duplex communication link between a service point disposed at the service lane and a single base station disposed within the building;

establishing a wireless full-duplex communication link between the base station and a service person using a mobile transceiver to link with the service point communication link to enable the service point and the service person to communicate in an audio full-duplex manner for initiating a transaction; and establishing a wireless independent full-duplex communication link between at least two other service persons using other mobile transceivers to enable said other service persons to communicate in an audio manner with one another independently of the communication between the service person and the service point user, wherein the base station includes a single transceiver for providing voice communication with the mobile transceivers in a simultaneous full duplex mode of operation using TDMA and a number of transmit/receive time slots;

wherein the base station manages the time slots and routes and combines full-duplex voice messages to provide a party line intercom or private line communications or both with the group of mobile transceivers or between mobile transceivers;

at least one mobile transceiver being capable of initiating a full-duplex voice transmission during a time slot assigned by the base station upon request of the at least one mobile transceiver on a transmit time to the base station transceiver on a single frequency shared with all mobile transceivers;

wherein the base station routes and combines the full-duplex voice signal from the at least one mobile transceiver for retransmission to all other mobile transceivers or a specific transceiver selectively;

at least one of the mobile transceivers used for order taking purposes being capable of full-duplex voice communication with the customer and with the other mobile transceivers;

each of the mobile transceivers of the service personnel being capable of serving as an order taking transceiver to communicate in full-duplex with the customer via the service point, and alternatively being capable of receiving voice messages only for listening in full-duplex to the voice communication between order taking transceivers and the service point; and whereby the base station provides selectively a first full-duplex channel of party line communication between the service point and the mobile transceivers, and a second full-duplex channel of party line communication between the mobile transceivers only to the exclusion of the service point.

51. A method of claim 50, wherein the establishing of the communication links includes communicating analog voice signals or digital data or both.

52. A method of claim 51, further including providing audible voice messages at the mobile transceivers to provide status or instructions to the service person.

53. A method of claim 50, further including deciding which one of a plurality of antennas to use based on signal strength at the beginning of the receive time slot.

54. A method of claim 50, where the communication link is frequency hopping spread spectrum and TDD communication.

55. A method of claim 50, further including routing communication between a mobile transceiver, all other mobile transceivers, and the service point.

56. A method of claim 50, wherein the base station causes communication to be routed between a mobile transceiver and all other mobile transceivers while excluding the speaker and microphone coupled to the base station.

57. A method of claim 50, further including causing the presence of a customer to be detected, and establishing a broadcast communication link to be established in response to the customer being detected.

58. A method of claim 57, wherein in response to customer presence detection, communication between the service point speaker and microphone can be routed by the base station to at least one mobile transceiver without the need for the service person at the mobile transceiver to take any physical action in order to respond; and, when the customer is no longer detected, the connection to the mobile transceiver automatically returns to the standby "listen" condition without any physical intervention of the mobile transceiver service person.

59. A method of claim 50, wherein the establishing of the links includes a data channel.

60. A method of claim 59, further including controlling data on the data channel.

61. A method of claim 59, further including establishing a link to an external data system.

62. A method of claim 50, further including repeating messages to the service point or other speakers when a customer is present.

63. A method of claim 50, further including initiating a speed team mode of operation.

64. A method of claim 50, further including registering a mobile transceiver with the base station.

65. A method of claim 50, further including generating a customer-present signal when a customer is present at the service point.

66. A method of claim 50, further including a second service point, establishing communication links between a mobile transceiver and either one of the service points selectively.

67. A method of claim 50, further including reducing inbound audio signals to the base station to help reduce feedback by using voice activated attenuation.

68. A method of claim 50, further including providing automatic volume control and noise cancellation.

69. A drive-up quick service establishment communication system for use by a merchant facility having a building and an external adjacent service lane outside the building to provide communication among a customer located at the service lane and service personnel located within the building, at least one of the service personnel can be an order taker, comprising:
a single base station disposed within the building;
a group of mobile transceivers disposed within the building for the service personnel;
a service point disposed at the service lane and coupled to the base station for communicating in an audio full-duplex manner with the customer;
the base station including a single transceiver for providing full-duplex voice communication with the mobile transceivers;
at least one of the mobile transceivers used for order taking purposes being capable of full-duplex voice communication with the customer and with the other mobile transceivers;
each of the mobile transceivers of the service personnel being capable of receiving full-duplex voice messages only for listening to the voice communication between the order taking transceiver and the service point and being capable of voice communication with the other mobile transceivers; and
wherein at least two of the mobile transceivers are each capable of initiating full-duplex voice communication simultaneously with the other mobile transceivers; and
whereby the base station provides selectively a first full-duplex channel of party line communication between the service point and the mobile transceivers and a second full-duplex channel of party line communication between the mobile transceivers only to the exclusion of the service point.

70. A drive-up quick service establishment communication system for use by a merchant facility having a building and an external adjacent service lane outside of the building to provide communication among a customer located at the service lane and service personnel located within the building, at least one of the service personnel can be an order taker, comprising:
a single base station disposed within the building;
a group mobile transceivers disposed within the building for the service personnel;
a service point disposed at the service lane and coupled to the base station for full-duplex communicating in an audio manner with the customer;
the base station including a single transceiver for providing full-duplex voice communication with the mobile transceivers;
at least one of the mobile transceivers used for order taking purposes being capable of full-duplex voice communication with the customer and with the other mobile transceivers;
each of the mobile transceivers of the service personnel being capable of receiving full-duplex voice messages only for listening to the voice communication between the order taking transceiver and the service point and being capable of voice communication with the other mobile transceivers; and
at least one of the mobile transceivers being capable of initiating a private voice communication with one of the other mobile transceivers; and
whereby the base station provides selectively a first full-duplex channel of party line communication between the service point and the mobile transceivers and a second full-duplex channel of party line communication between the mobile transceivers only to the exclusion of the service point.

71. The system of claim 1, wherein at least two of the mobile transceivers being capable of initiating voice communication simultaneously with the other mobile transceivers.

72. The system of claim 1, wherein at least one of the mobile transceivers being capable of initiating a private voice communication with one of the other mobile transceivers.

73. The system of claim 1, further including
a second group of mobile transceivers for a second set of service personnel, and
a second service point coupled to the base station for communicating with at least the second group of mobile transceivers to enable communication between a second customer and at least the second set of service personnel.

74. The system of claim 73, wherein the at least one of the second group mobile transceivers used for order taking purposes with the second customer being capable of voice communication with the second customer and with all of the other mobile transceivers.

75. The system of claim 74, wherein each of the mobile transceivers of the second set of service personnel being capable of receiving voice messages only for listening to the voice communication between the second order taking transceiver and the second service point and being, capable of voice communication with all of the other mobile transceivers.

* * * * *

UNITED STATES PATENT AND TRADEMARK OFFICE
CERTIFICATE OF CORRECTION

PATENT NO. : 7,920,539 B2
APPLICATION NO. : 10/928476
DATED : April 5, 2011
INVENTOR(S) : Thomas Stanford and Scott Hoeptner Page 1 of 1

It is certified that error appears in the above-identified patent and that said Letters Patent is hereby corrected as shown below:

Column 36, line 33, delete "pa line" and insert -- party line --;

Column 36, line 34, after "service" insert -- point and --;

Column 38, line 19, after "of" insert -- party --;

Column 43, line 34, after "party" insert -- line communication --.

Signed and Sealed this
Twenty-third Day of August, 2011

David J. Kappos
*Director of the United States Patent and Trademark Office*